(12) United States Patent
Kim et al.

(10) Patent No.: US 8,761,075 B2
(45) Date of Patent: *Jun. 24, 2014

(54) METHOD FOR TRANSMITTING CONTROL SIGNAL TO RELAY NODE AT BASE STATION IN MIMO WIRELESS COMMUNICATION SYSTEM AND APPARATUS THEREFOR

(75) Inventors: Hakseong Kim, Anyang-si (KR); Daewon Lee, Anyang-si (KR); Hanbyul Seo, Anyang-si (KR); Youngseob Choi, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/235,312

(22) Filed: Sep. 16, 2011

(65) Prior Publication Data
US 2012/0057519 A1 Mar. 8, 2012

Related U.S. Application Data

(63) Continuation of application No. 13/256,625, filed as application No. PCT/KR2011/000614 on Jan. 28, 2011.

(60) Provisional application No. 61/392,923, filed on Oct. 13, 2010, provisional application No. 61/356,028, filed on Jun. 17, 2010, provisional application No. 61/353,199, filed on Jun. 9, 2010, provisional application No. 61/352,376, filed on Jun. 7, 2010, provisional application No. 61/349,796, filed on May 28, 2010, provisional application No. 61/300,820, filed on Feb. 2, 2010, provisional application No. 61/299,325, filed on Jan. 28, 2010.

(30) Foreign Application Priority Data

Jan. 14, 2011 (KR) ........................ 10-2011-0004024

(51) Int. Cl.
| | | |
|---|---|---|
| H04B 7/14 | (2006.01) | |
| H04B 7/212 | (2006.01) | |
| H04W 4/00 | (2009.01) | |
| H04J 1/10 | (2006.01) | |
| H04J 3/08 | (2006.01) | |
| H04H 20/67 | (2008.01) | |

(52) U.S. Cl.
USPC ........... 370/315; 370/322; 370/329; 370/334; 370/339; 370/341

(58) Field of Classification Search
USPC .......................... 370/322, 329, 334, 339, 341
See application file for complete search history.

(56) References Cited

U.S. PATENT DOCUMENTS

2006/0225722 A1* 10/2006 Markley et al. ............ 125/13.01
2009/0161612 A1   6/2009 Liu et al.

(Continued)

FOREIGN PATENT DOCUMENTS

| CN | WO 2009/059517 | * 5/2009 | ............ H04L 29/08 |
|---|---|---|---|
| EP | 1804442 | 7/2007 | |

(Continued)

OTHER PUBLICATIONS

United States Patent and Trademark Office U.S. Appl. No. 13/256,625, Office Action dated Nov. 6, 2012.

(Continued)

*Primary Examiner* — Noel Beharry
*Assistant Examiner* — Kodzovi Acolatse
(74) *Attorney, Agent, or Firm* — Lee, Hong, Degerman, Kang & Waimey

(57) ABSTRACT

A method for transmitting a control signal to a relay node at a base station in a multi-input multi-output (MIMO) wireless communication system is disclosed. The method comprises configuring relay-resource element groups (R-REGs) in a unit of four resource elements (REs) contiguous in the ascending order of subcarrier indexes, except for resource elements for a reference signal (RS); allocating transmission resources to the control signal in a unit of the relay-resource element group; and transmitting the control signal to the relay node by using the allocated transmission resources, wherein the resource elements for the reference signal include resource elements for channel state information-RS (CSI-RS), which include resource elements for a channel state information RS to which a transmission power of 0 is allocated.

4 Claims, 65 Drawing Sheets

(56) References Cited

U.S. PATENT DOCUMENTS

| | | | |
|---|---|---|---|
| 2009/0197624 | A1 | 8/2009 | Kwak et al. |
| 2010/0008317 | A1 | 1/2010 | Bhattad et al. |
| 2010/0035600 | A1* | 2/2010 | Hou et al. .................. 455/422.1 |
| 2010/0035620 | A1 | 2/2010 | Naden et al. |
| 2010/0246376 | A1* | 9/2010 | Nam et al. .................... 370/208 |
| 2010/0275083 | A1* | 10/2010 | Nam et al. .................... 714/748 |
| 2010/0279628 | A1 | 11/2010 | Love et al. |
| 2010/0281323 | A1 | 11/2010 | Wang et al. |
| 2011/0038302 | A1* | 2/2011 | Papasakellariou et al. ... 370/315 |
| 2011/0103295 | A1* | 5/2011 | Khandekar et al. ........... 370/315 |
| 2011/0228729 | A1* | 9/2011 | Dai et al. ..................... 370/329 |
| 2011/0244877 | A1* | 10/2011 | Farajidana et al. ........ 455/452.2 |
| 2012/0020230 | A1 | 1/2012 | Chen et al. |

FOREIGN PATENT DOCUMENTS

| | | |
|---|---|---|
| EP | 2494834 | 9/2012 |
| KR | 1020090005782 | 1/2009 |
| KR | 100921330 B1 | 10/2009 |
| WO | 2005/067173 | 7/2005 |

OTHER PUBLICATIONS

United States Patent and Trademark Office U.S. Appl. No. 13/256,625, Final Office Action dated Feb. 28, 2013, 12 pages.
LG Electronics Inc., "R-PDCCH RE mapping," TSG-RAN WG1 Meeting #62bis, R1-105349, Oct. 2010, 3 pages.
Panasonic, "Mapping of physical resources to R-PDCCH," 3GPP TSG-RAN WG1 Meeting #62bis, R1-105500, Oct. 2010, 7 pages.
Panasonic, "R-PDCCH interleaving details," 3GPP TSG-RAN WG1 Meeting #62, R1-104908, Aug. 2010, 6 pages.
3rd Generation Partnership Project (3GPP); "Presentation of Specification to TSG RAN WG1; TR 36.814 V1.5.2; Further Advancements for E-UTRA Physical Layer Apects," 3GPP TSG RAN WG1 Meeting #59bis, R1-100292, Jan. 2010, 79 pages.
LG Electronics, "RE muting design and considerations," TSG-RAN WG1 Meeting #62, R1-104649, Aug. 2010, 6 pages.
LG Electronics, "Muting aspects and Intercell CSI-RS design,"TSG-RAN WG1 Meeting #61bis, R1-103733, Jun. 2010, 6 pages.
LG Electronics Inc., "R-PDCCH REG mapping," 3GPP TSG RAN WG1 Meeting #63, R1-106136, Nov. 2010, 4 pages, 4 pages.
United States Patent and Trademark Office U.S. Appl. No. 13/256,625, Office Action dated Jul. 17, 2013, 13 pages.
Nokia, et al., "On the need of interleaving of R-PDCCH," 3GPP TSG RAN WG1 Meeting #59, R1-094667, XP050389072, Nov. 2009, 3 pages.
Email discussion Rapporteur, "Summary of Relay email discussion [59-12-LTE-A]: R-PDCCH," 3GPP TSG RAN WG1 Meeting #59bis, R1-100380, XP050418415, Jan. 2010, 20 (relevant portion: p. 6).
Zte, "Further considerations on Control Channel for Backhaul Link," TSG-RAN WG1 #59, R1-094745, XP050389142, Nov. 2009, 3 pages.
LG-Nortel, "Control Channel Design for Relay Backhaul Link in FDM+TDM Scheme," 3GPP TSG RAN WG1 #59, R1-094453, XP050388879, Nov. 2009, 6 pages.
European Patent Office Application Serial No. 11737310.0, Search Report dated Jun. 20, 2013, 11 pages.

* cited by examiner

FIG. 2
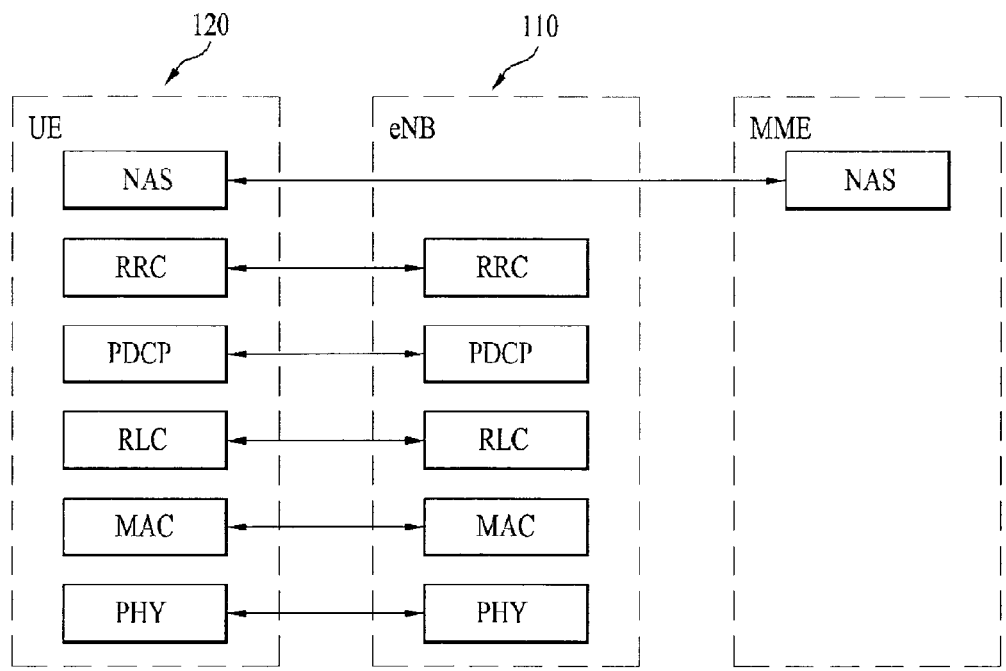
(a) control-plane protocol stack
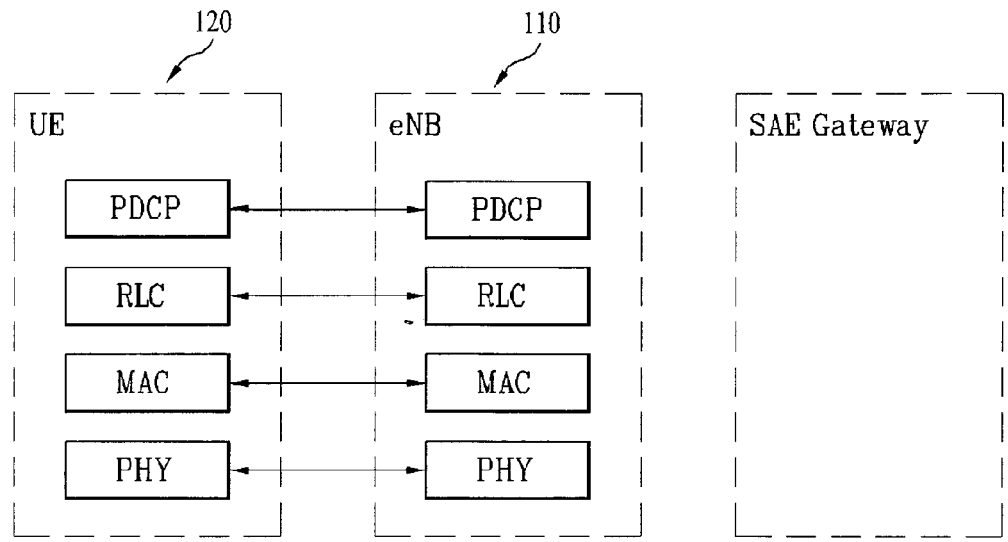
(b) user-plane protocol stack

FIG. 8

FIG. 11
(a)
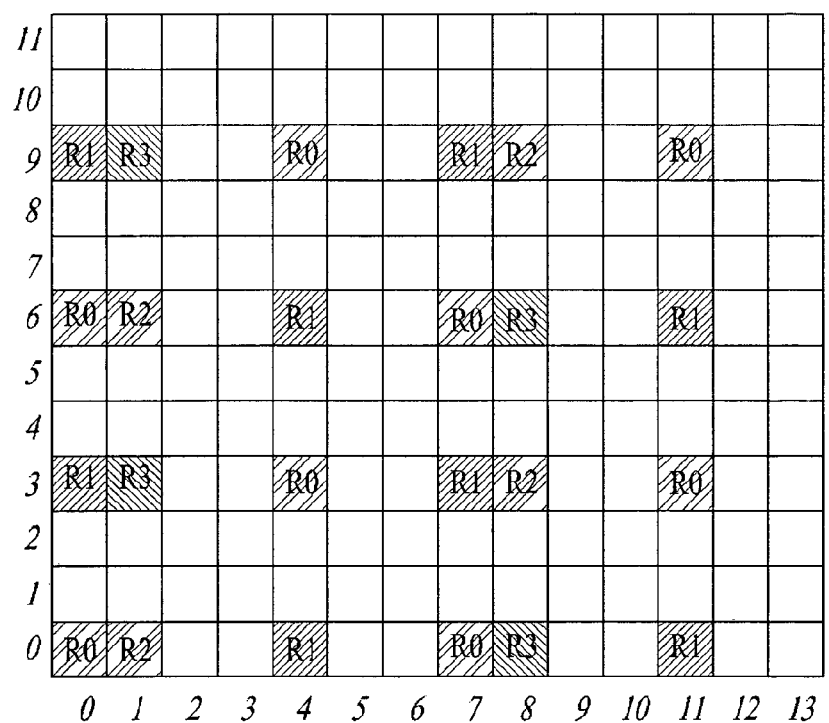
(b)
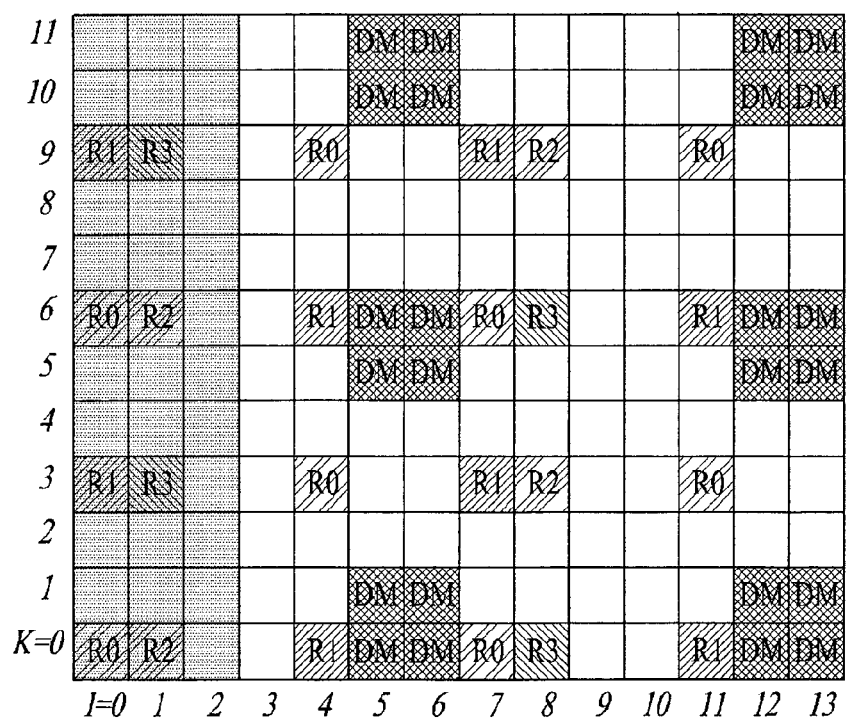

| | I=0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 11 | | | | 4 | 4 | DM | DM | | | | | | DM | DM |
| 10 | | | | 4 | 4 | (9) | (9) | | | | | | | |
| 9 | R1 | R3 | | 3 | R0 | 8 | 8 | R1 | R2 | | | R0 | | |
| 8 | | | | 3 | 3 | 8 | 8 | | | | | | | |
| 7 | | | | 2 | 3 | 7 | 7 | | | | | | | |
| 6 | R0 | R2 | | 2 | R1 | DM | DM | R0 | R3 | | | R1 | DM | DM |
| 5 | | | | 2 | 2 | 7 | 7 | | | | | | | |
| 4 | | | | 1 | 1 | 6 | 6 | | | | | | | |
| 3 | R1 | R3 | | 1 | R0 | 6 | 6 | R1 | R2 | | | R0 | | |
| 2 | | | | 0 | 1 | 5 | 5 | | | | | | | |
| 1 | | | | 0 | 0 | DM | DM | | | | | | DM | DM |
| K=0 | R0 | R2 | | 0 | R1 | 5 | 5 | R0 | R3 | | | R1 | | |

FIG. 13C

| | I=0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 11 | | | | 4 | 4 | DM | DM | | | | | | DM | DM |
| 10 | | | | 4 | 4 | DM | DM | | | | | | DM | DM |
| 9 | R1 | R3 | | 3 | R0 | 7 | 7 | R1 | R2 | | | R0 | | |
| 8 | | | | 3 | 3 | 7 | 7 | | | | | | | |
| 7 | | | | 2 | 3 | 6 | 6 | | | | | | | |
| 6 | R0 | R2 | | 2 | R1 | DM | DM | R0 | R3 | | | R1 | DM | DM |
| 5 | | | | 2 | 2 | DM | DM | | | | | | DM | DM |
| 4 | | | | 1 | 1 | 6 | 6 | | | | | | | |
| 3 | R1 | R3 | | 1 | R0 | 5 | 5 | R1 | R2 | | | R0 | | |
| 2 | | | | 1 | 0 | 5 | 5 | | | | | | | |
| 1 | | | | 0 | 0 | DM | DM | | | | | | DM | DM |
| K=0 | R0 | R2 | | 0 | R1 | DM | DM | R0 | R3 | | | R1 | DM | DM |

FIG. 13D

| | I=0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 11 | | | | 4 | 4 | DM | DM | | | | | | DM | DM |
| 10 | | | | 4 | 4 | (9) | (9) | | | | | | | |
| 9 | R1 | R3 | | 3 | R0 | 8 | 8 | R1 | R2 | | | R0 | | |
| 8 | | | | 3 | 3 | 8 | 8 | | | | | | | |
| 7 | | | | 2 | 3 | 7 | 7 | | | | | | | |
| 6 | R0 | R2 | | 2 | R1 | DM | DM | R0 | R3 | | | R1 | DM | DM |
| 5 | | | | 2 | 2 | 7 | 7 | | | | | | | |
| 4 | | | | 1 | 1 | 6 | 6 | | | | | | | |
| 3 | R1 | R3 | | 1 | R0 | 6 | 6 | R1 | R2 | | | R0 | | |
| 2 | | | | 1 | 0 | 5 | 5 | | | | | | | |
| 1 | | | | 0 | 0 | DM | DM | | | | | | DM | DM |
| K=0 | R0 | R2 | | 0 | R1 | 5 | 5 | R0 | R3 | | | R1 | | |

| K | I=0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 11 |  |  |  | 5 | 9 | DM | DM |  |  |  |  |  | DM | DM |
| 10 |  |  |  | 5 | 9 | 18 | 18 |  |  |  |  |  |  |  |
| 9 | R1 | R3 |  | 5 | R0 | 18 | 18 | R1 | R2 |  |  | R0 |  |  |
| 8 |  |  |  | 5 | 9 | 17 | 17 |  |  |  |  |  |  |  |
| 7 |  |  |  | 4 | 9 | 17 | 17 |  |  |  |  |  |  |  |
| 6 | R0 | R2 |  | 4 | R1 | DM | DM | R0 | R3 |  |  | R1 | DM | DM |
| 5 |  |  |  | 4 | 8 | 16 | 16 |  |  |  |  |  |  |  |
| 4 |  |  |  | 4 | 8 | 16 | 16 |  |  |  |  |  |  |  |
| 3 | R1 | R3 |  | 3 | R0 | 15 | 15 | R1 | R2 |  |  | R0 |  |  |
| 2 |  |  |  | 3 | 8 | 15 | 15 |  |  |  |  |  |  |  |
| 1 |  |  |  | 3 | 8 | DM | DM |  |  |  |  |  | DM | DM |
| K=0 | R0 | R2 |  | 3 | R1 | 14 | 14 | R0 | R3 |  |  | R1 |  |  |
| 11 |  |  |  | 2 | 7 | DM | DM |  |  |  |  |  | DM | DM |
| 10 |  |  |  | 2 | 7 | 14 | 14 |  |  |  |  |  |  |  |
| 9 | R1 | R3 |  | 2 | R0 | 13 | 13 | R1 | R2 |  |  | R0 |  |  |
| 8 |  |  |  | 2 | 7 | 13 | 13 |  |  |  |  |  |  |  |
| 7 |  |  |  | 1 | 7 | 12 | 12 |  |  |  |  |  |  |  |
| 6 | R0 | R2 |  | 1 | R1 | DM | DM | R0 | R3 |  |  | R1 | DM | DM |
| 5 |  |  |  | 1 | 6 | 12 | 12 |  |  |  |  |  |  |  |
| 4 |  |  |  | 1 | 6 | 11 | 11 |  |  |  |  |  |  |  |
| 3 | R1 | R3 |  | 0 | R0 | 11 | 11 | R1 | R2 |  |  | R0 |  |  |
| 2 |  |  |  | 0 | 6 | 10 | 10 |  |  |  |  |  |  |  |
| 1 |  |  |  | 0 | 6 | DM | DM |  |  |  |  |  | DM | DM |
| K=0 | R0 | R2 |  | 0 | R1 | 10 | 10 | R0 | R3 |  |  | R1 |  |  |

| | | | | | | | | | | | |
|---|---|---|---|---|---|---|---|---|---|---|---|
| 11 | | | | 6 | 5 | DM | DM | 9 | 10 | 12 | 13 | 11 | DM | DM |
| 10 | | | | 6 | 5 | DM | DM | 9 | 10 | 12 | 13 | 11 | DM | DM |
| 9 | R1 | R3 | | 6 | R0 | 7 | 7 | R1 | R2 | 12 | 13 | R0 | 14 | 14 |
| 8 | | | | 6 | 5 | 7 | 7 | 9 | 10 | 12 | 13 | 11 | 14 | 14 |
| 7 | | | | 4 | 5 | 2 | 3 | 9 | 10 | 7 | 8 | 11 | 5 | 6 |
| 6 | R0 | R2 | | 4 | R1 | DM | DM | R0 | R3 | 7 | 8 | R1 | DM | DM |
| 5 | | | | 4 | 1 | DM | DM | 0 | 1 | 7 | 8 | 4 | DM | DM |
| 4 | | | | 4 | 1 | 2 | 3 | 0 | 1 | 7 | 8 | 4 | 5 | 6 |
| 3 | R1 | R3 | | 0 | R0 | 2 | 3 | R1 | R2 | 2 | 3 | R0 | 5 | 6 |
| 2 | | | | 0 | 1 | 2 | 3 | 0 | 1 | 2 | 3 | 4 | 5 | 6 |
| 1 | | | | 0 | 1 | DM | DM | 0 | 1 | 2 | 3 | 4 | DM | DM |
| K=0 | R0 | R2 | | 0 | R1 | DM | DM | R0 | R3 | 2 | 3 | R1 | DM | DM |

FIG. 19B

| | I=0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 11 | | | | 8 | 7 | 9 | 10 | 11 | 12 | 14 | 15 | 13 | 16 | 17 |
| 10 | | | | 8 | 7 | 9 | 10 | 11 | 12 | 14 | 15 | 13 | 16 | 17 |
| 9 | R1 | R3 | | 8 | R0 | 9 | 10 | R1 | R2 | 14 | 15 | R0 | 16 | 17 |
| 8 | | | | 8 | 7 | 9 | 10 | 11 | 12 | 14 | 15 | 13 | 16 | 17 |
| 7 | | | | 4 | 7 | 5 | 6 | 11 | 12 | 7 | 8 | 13 | 9 | 10 |
| 6 | R0 | R2 | | 4 | R1 | 5 | 6 | R0 | R3 | 7 | 8 | R1 | 9 | 10 |
| 5 | | | | 4 | 1 | 5 | 6 | 0 | 1 | 7 | 8 | 4 | 9 | 10 |
| 4 | | | | 4 | 1 | 5 | 6 | 0 | 1 | 7 | 8 | 4 | 9 | 10 |
| 3 | R1 | R3 | | 0 | R0 | 2 | 3 | R1 | R2 | 2 | 3 | R0 | 5 | 6 |
| 2 | | | | 0 | 1 | 2 | 3 | 0 | 1 | 2 | 3 | 4 | 5 | 6 |
| 1 | | | | 0 | 1 | 2 | 3 | 0 | 1 | 2 | 3 | 4 | 5 | 6 |
| K=0 | R0 | R2 | | 0 | R1 | 2 | 3 | R0 | R3 | 2 | 3 | R1 | 5 | 6 |

FIG. 19C

| | | | | | | | | | | | |
|---|---|---|---|---|---|---|---|---|---|---|---|
| 11 | | | | 15 | 14 | DM | DM | 24 | 25 | 28 | 29 | 26 | DM | DM |
| 10 | | | | 15 | 14 | DM | DM | 24 | 25 | 28 | 29 | 26 | DM | DM |
| 9 | R1 | R3 | | 12 | R0 | 13 | 13 | R1 | R2 | 22 | 23 | R0 | 27 | 27 |
| 8 | | | | 12 | 11 | 8 | 9 | 17 | 18 | 22 | 23 | 21 | 15 | 16 |
| 7 | | | | 10 | 11 | 8 | 9 | 17 | 18 | 19 | 20 | 21 | 15 | 16 |
| 6 | R0 | R2 | | 10 | R1 | DM | DM | R0 | R3 | 19 | 20 | R1 | DM | DM |
| 5 | | | | 6 | 5 | DM | DM | 9 | 10 | 12 | 13 | 11 | DM | DM |
| 4 | | | | 6 | 5 | 7 | 7 | 9 | 10 | 12 | 13 | 11 | 14 | 14 |
| 3 | R1 | R3 | | 4 | R0 | 2 | 3 | R1 | R2 | 7 | 8 | R0 | 5 | 6 |
| 2 | | | | 4 | 1 | 2 | 3 | 0 | 1 | 7 | 8 | 4 | 5 | 6 |
| 1 | | | | 0 | 1 | DM | DM | 0 | 1 | 2 | 3 | 4 | DM | DM |
| K=0 | R0 | R2 | | 0 | R1 | DM | DM | R0 | R3 | 2 | 3 | R1 | DM | DM |

FIG. 19D

| | | | | | | | | | | | | | | |
|---|---|---|---|---|---|---|---|---|---|---|---|---|---|---|
| 11 | | | | 19 | 18 | 20 | 21 | 29 | 30 | 32 | 33 | 31 | 34 | 35 |
| 10 | | | | 19 | 18 | 20 | 21 | 29 | 30 | 32 | 33 | 31 | 34 | 35 |
| 9 | R1 | R3 | | 15 | R0 | 16 | 17 | R1 | R2 | 25 | 26 | R0 | 27 | 28 |
| 8 | | | | 15 | 12 | 16 | 17 | 18 | 19 | 25 | 26 | 22 | 27 | 28 |
| 7 | | | | 11 | 12 | 13 | 14 | 18 | 19 | 20 | 21 | 22 | 23 | 24 |
| 6 | R0 | R2 | | 11 | R1 | 13 | 14 | R0 | R3 | 20 | 21 | R1 | 23 | 24 |
| 5 | | | | 8 | 7 | 9 | 10 | 11 | 12 | 14 | 15 | 13 | 16 | 17 |
| 4 | | | | 8 | 7 | 9 | 10 | 11 | 12 | 14 | 15 | 13 | 16 | 17 |
| 3 | R1 | R3 | | 4 | R0 | 5 | 6 | R1 | R2 | 7 | 8 | R0 | 9 | 10 |
| 2 | | | | 4 | 1 | 5 | 6 | 0 | 1 | 7 | 8 | 4 | 9 | 10 |
| 1 | | | | 0 | 1 | 2 | 3 | 0 | 1 | 2 | 3 | 4 | 5 | 6 |
| K=0 | R0 | R2 | | 0 | R1 | 2 | 3 | R0 | R3 | 2 | 3 | R1 | 5 | 6 |
| | I=0 | 1 | 2 | 3 | 4 | 5 | 6 | 7 | 8 | 9 | 10 | 11 | 12 | 13 |

FIG. 19E

| | | | | | | | | | | | |
|---|---|---|---|---|---|---|---|---|---|---|---|
| 11 | | | 6 | 5 | DM | DM | 9 | 10 | 14 | 15 | 11 | DM | DM |
| 10 | | | 6 | 5 | DM | DM | 9 | 10 | 14 | 15 | 11 | 12 | 13 |
| 9 | R1 | R3 | 6 | R0 | 7 | 7 | R1 | R2 | 14 | 15 | R0 | 12 | 13 |
| 8 | | | 6 | 5 | 7 | 7 | 9 | 10 | 14 | 15 | 11 | 12 | 13 |
| 7 | | | 4 | 5 | 2 | 3 | 9 | 10 | 7 | 8 | 11 | 12 | 13 |
| 6 | R0 | R2 | 4 | R1 | DM | DM | R0 | R3 | 7 | 8 | R1 | DM | DM |
| 5 | | | 4 | 1 | DM | DM | 0 | 1 | 7 | 8 | 4 | 5 | 6 |
| 4 | | | 4 | 1 | 2 | 3 | 0 | 1 | 7 | 8 | 4 | 5 | 6 |
| 3 | R1 | R3 | 0 | R0 | 2 | 3 | R1 | R2 | 2 | 3 | R0 | 5 | 6 |
| 2 | | | 0 | 1 | 2 | 3 | 0 | 1 | 2 | 3 | 4 | 5 | 6 |
| 1 | | | 0 | 1 | DM | DM | 0 | 1 | 2 | 3 | 4 | DM | DM |
| K=0 | R0 | R2 | 0 | R1 | DM | DM | R0 | R3 | 2 | 3 | R1 | x | x |

FIG. 19F

| | | | | | | | | | | | | | |
|---|---|---|---|---|---|---|---|---|---|---|---|---|---|
| 11 | | | | 6 | 5 | DM | DM | 9 | 10 | 14 | 15 | 11 | DM | DM |
| 10 | | | | 6 | 5 | DM | DM | 9 | 10 | 14 | 15 | 11 | x | x |
| 9 | R1 | R3 | | 6 | R0 | 7 | 7 | R1 | R2 | 14 | 15 | R0 | 12 | 13 |
| 8 | | | | 6 | 5 | 7 | 7 | 9 | 10 | 14 | 15 | 11 | 12 | 13 |
| 7 | | | | 4 | 5 | 2 | 3 | 9 | 10 | 7 | 8 | 11 | 12 | 13 |
| 6 | R0 | R2 | | 4 | R1 | DM | DM | R0 | R3 | 7 | 8 | R1 | DM | DM |
| 5 | | | | 4 | 1 | DM | DM | 0 | 1 | 7 | 8 | 4 | 12 | 13 |
| 4 | | | | 4 | 1 | 2 | 3 | 0 | 1 | 7 | 8 | 4 | 5 | 6 |
| 3 | R1 | R3 | | 0 | R0 | 2 | 3 | R1 | R2 | 2 | 3 | R0 | 5 | 6 |
| 2 | | | | 0 | 1 | 2 | 3 | 0 | 1 | 2 | 3 | 4 | 5 | 6 |
| 1 | | | | 0 | 1 | DM | DM | 0 | 1 | 2 | 3 | 4 | DM | DM |
| K=0 | R0 | R2 | | 0 | R1 | DM | DM | R0 | R3 | 2 | 3 | R1 | 5 | 6 |
| | I=0 | 1 | 2 | 3 | 4 | 5 | 6 | 7 | 8 | 9 | 10 | 11 | 12 | 13 |

FIG. 19G

| | | | | | | | | | | | | |
|---|---|---|---|---|---|---|---|---|---|---|---|---|
| 11 | | | 15 | 14 | DM | DM | 26 | 27 | 31 | 32 | 28 | DM | DM |
| 10 | | | 15 | 14 | DM | DM | 26 | 27 | 31 | 32 | 28 | 29 | 30 |
| 9 | R1 | R3 | 12 | R0 | 13 | 13 | R1 | R2 | 24 | 25 | R0 | 29 | 30 |
| 8 | | | 12 | 11 | 8 | 9 | 17 | 18 | 24 | 25 | 21 | 22 | 23 |
| 7 | | | 10 | 11 | 8 | 9 | 17 | 18 | 19 | 20 | 21 | 22 | 23 |
| 6 | R0 | R2 | 10 | R1 | DM | DM | R0 | R3 | 19 | 20 | R1 | DM | DM |
| 5 | | | 6 | 5 | DM | DM | 10 | 11 | 13 | 14 | 12 | 15 | 16 |
| 4 | | | 6 | 5 | 7 | 7 | 10 | 11 | 13 | 14 | 12 | 15 | 16 |
| 3 | R1 | R3 | 4 | R0 | 2 | 3 | R1 | R2 | 8 | 9 | R0 | 6 | 7 |
| 2 | | | 4 | 1 | 2 | 3 | 0 | 1 | 8 | 9 | 4 | 6 | 7 |
| 1 | | | 0 | 1 | DM | DM | 0 | 1 | 2 | 3 | 4 | DM | DM |
| K=0 | R0 | R2 | 0 | R1 | DM | DM | R0 | R3 | 2 | 3 | R1 | 5 | 5 |

FIG. 20A

| | I=0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 11 | | | | 8 | 5 | DM | DM | 10 | 14 | 15 | 16 | 11 | DM | DM |
| 10 | | | | 8 | 5 | 6 | 7 | 10 | 14 | 15 | 16 | 11 | 12 | 13 |
| 9 | R1 | | | 8 | R0 | 6 | 7 | R1 | 14 | 15 | 16 | R0 | 12 | 13 |
| 8 | | | | 8 | 5 | 6 | 7 | 10 | 14 | 15 | 16 | 11 | 12 | 13 |
| 7 | | | | 4 | 5 | 6 | 7 | 10 | 7 | 8 | 9 | 11 | 12 | 13 |
| 6 | R0 | | | 4 | R1 | DM | DM | R0 | 7 | 8 | 9 | R1 | DM | DM |
| 5 | | | | 4 | 1 | 2 | 3 | 0 | 7 | 8 | 9 | 4 | 5 | 6 |
| 4 | | | | 4 | 1 | 2 | 3 | 0 | 7 | 8 | 9 | 4 | 5 | 6 |
| 3 | R1 | | | 0 | R0 | 2 | 3 | R1 | 1 | 2 | 3 | R0 | 5 | 6 |
| 2 | | | | 0 | 1 | 2 | 3 | 0 | 1 | 2 | 3 | 4 | 5 | 6 |
| 1 | | | | 0 | 1 | DM | DM | 0 | 1 | 2 | 3 | 4 | DM | DM |
| K=0 | R0 | | | 0 | R1 | x | x | R0 | 1 | 2 | 3 | R1 | x | x |

FIG. 20B

| | I=0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 11 | | | | 8 | 7 | DM | DM | 12 | 14 | 15 | 16 | 13 | DM | DM |
| 10 | | | | 8 | 7 | x | x | 12 | 14 | 15 | 16 | 13 | x | x |
| 9 | R1 | | | 8 | R0 | 5 | 6 | R1 | 14 | 15 | 16 | R0 | 10 | 11 |
| 8 | | | | 8 | 7 | 5 | 6 | 12 | 14 | 15 | 16 | 13 | 10 | 11 |
| 7 | | | | 4 | 7 | 6 | 6 | 12 | 7 | 8 | 9 | 13 | 10 | 11 |
| 6 | R0 | | | 4 | R1 | DM | DM | R0 | 7 | 8 | 9 | R1 | DM | DM |
| 5 | | | | 4 | 1 | 6 | 6 | 0 | 7 | 8 | 9 | 4 | 10 | 11 |
| 4 | | | | 4 | 1 | 2 | 3 | 0 | 7 | 8 | 9 | 4 | 5 | 6 |
| 3 | R1 | | | 0 | R0 | 2 | 3 | R1 | 1 | 2 | 3 | R0 | 5 | 6 |
| 2 | | | | 0 | 1 | 2 | 3 | 0 | 1 | 2 | 3 | 4 | 5 | 6 |
| 1 | | | | 0 | 1 | DM | DM | 0 | 1 | 2 | 3 | 4 | DM | DM |
| K=0 | R0 | | | 0 | R1 | 2 | 3 | R0 | 1 | 2 | 3 | R1 | 5 | 6 |

FIG. 20C

| K\I | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 11 | | | | 8 | 7 | 9 | 10 | 12 | 14 | 15 | 16 | 13 | 17 | 18 |
| 10 | | | | 8 | 7 | 9 | 10 | 12 | 14 | 15 | 16 | 13 | 17 | 18 |
| 9 | R1 | | | 8 | R0 | 9 | 10 | R1 | 14 | 15 | 16 | R0 | 17 | 18 |
| 8 | | | | 8 | 7 | 9 | 10 | 12 | 14 | 15 | 16 | 13 | 17 | 18 |
| 7 | | | | 4 | 7 | 5 | 6 | 12 | 7 | 8 | 9 | 13 | 10 | 11 |
| 6 | R0 | | | 4 | R1 | 5 | 6 | R0 | 7 | 8 | 9 | R1 | 10 | 11 |
| 5 | | | | 4 | 1 | 5 | 6 | 0 | 7 | 8 | 9 | 4 | 10 | 11 |
| 4 | | | | 4 | 1 | 5 | 6 | 0 | 7 | 8 | 9 | 4 | 10 | 11 |
| 3 | R1 | | | 0 | R0 | 2 | 3 | R1 | 1 | 2 | 3 | R0 | 5 | 6 |
| 2 | | | | 0 | 1 | 2 | 3 | 0 | 1 | 2 | 3 | 4 | 5 | 6 |
| 1 | | | | 0 | 1 | 2 | 3 | 0 | 1 | 2 | 3 | 4 | 5 | 6 |
| K=0 | R0 | | | 0 | R1 | 2 | 3 | R0 | 1 | 2 | 3 | R1 | 5 | 6 |

FIG. 20D

| | | | | | | | | | | | | | |
|---|---|---|---|---|---|---|---|---|---|---|---|---|---|
| 11 | | | | 18 | 15 | DM | DM | 28 | 32 | 33 | 34 | 29 | DM | DM |
| 10 | | | | 18 | 15 | 16 | 17 | 28 | 32 | 33 | 34 | 29 | 30 | 31 |
| 9 | R1 | | | 14 | R0 | 16 | 17 | R1 | 25 | 26 | 27 | R0 | 30 | 31 |
| 8 | | | | 14 | 11 | 12 | 13 | 18 | 25 | 26 | 27 | 22 | 23 | 24 |
| 7 | | | | 10 | 11 | 12 | 13 | 18 | 19 | 20 | 21 | 22 | 23 | 24 |
| 6 | R0 | | | 10 | R1 | DM | DM | R0 | 19 | 20 | 21 | R1 | DM | DM |
| 5 | | | | 7 | 6 | 8 | 9 | 11 | 13 | 14 | 15 | 12 | 16 | 17 |
| 4 | | | | 7 | 6 | 8 | 9 | 11 | 13 | 14 | 15 | 12 | 16 | 17 |
| 3 | R1 | | | 5 | R0 | 3 | 4 | R1 | 8 | 9 | 10 | R0 | 6 | 7 |
| 2 | | | | 5 | 1 | 3 | 4 | 0 | 8 | 9 | 10 | 4 | 6 | 7 |
| 1 | | | | 0 | 1 | DM | DM | 0 | 1 | 2 | 3 | 4 | DM | DM |
| K=0 | R0 | | | 0 | R1 | 2 | 2 | R0 | 1 | 2 | 3 | R1 | 5 | 5 |
| | I=0 | 1 | 2 | 3 | 4 | 5 | 6 | 7 | 8 | 9 | 10 | 11 | 12 | 13 |

FIG. 20E

| 11 | | | | 19 | 18 | 20 | 21 | 31 | 33 | 34 | 35 | 32 | 36 | 37 |
|---|---|---|---|---|---|---|---|---|---|---|---|---|---|---|
| 10 | | | | 19 | 18 | 20 | 21 | 31 | 33 | 34 | 35 | 32 | 36 | 37 |
| 9 | R1 | | | 15 | R0 | 16 | 17 | R1 | 26 | 27 | 28 | R0 | 29 | 30 |
| 8 | | | | 15 | 12 | 16 | 17 | 12 | 26 | 27 | 28 | 23 | 29 | 30 |
| 7 | | | | 11 | 12 | 13 | 14 | 12 | 20 | 21 | 22 | 23 | 24 | 25 |
| 6 | R0 | | | 11 | R1 | 13 | 14 | R0 | 20 | 21 | 22 | R1 | 24 | 25 |
| 5 | | | | | 7 | 9 | 10 | 12 | 14 | 15 | 16 | 13 | 17 | 18 |
| 4 | | | | | 7 | 9 | 10 | 12 | 14 | 15 | 16 | 13 | 17 | 18 |
| 3 | R1 | | | 4 | R0 | 5 | 6 | R1 | 7 | 8 | 9 | R0 | 10 | 11 |
| 2 | | | | 4 | 1 | 5 | 6 | 0 | 7 | 8 | 9 | 4 | 10 | 11 |
| 1 | | | | 0 | 1 | 2 | 3 | 0 | 1 | 2 | 3 | 4 | 5 | 6 |
| K=0 | R0 | | | 0 | R1 | 2 | 3 | R0 | 1 | 2 | 3 | R1 | 5 | 6 |
| | I=0 | 1 | 2 | 3 | 4 | 5 | 6 | 7 | 8 | 9 | 10 | 11 | 12 | 13 |

| | | | | | | | | | | | | | |
|---|---|---|---|---|---|---|---|---|---|---|---|---|---|
|11| | | |8|7|9|10|11|12|14|15|13|16|17|
|10| | | |8|7|9|10|11|12|14|15|13|16|17|
|9|R1|R3| |8|R0|9|10|R1|R2|14|15|R0|16|17|
|8| | | |8|7|9|10|11|12|14|15|13|16|17|
|7| | | |4|7|5|6|11|12|7|8|13|9|10|
|6|R0|R2| |4|R1|5|6|R0|R3|7|8|R1|9|10|
|5| | | |4|1|5|6|0|1|7|8|4|9|10|
|4| | | |4|1|5|6|0|1|7|8|4|9|10|
|3|R1|R3| |0|R0|2|3|R1|R2|2|3|R0|5|6|
|2| | | |0|1|2|3|0|1|2|3|4|5|6|
|1| | | |0|1|2|3|0|1|2|3|4|5|6|
|K=0|R0|R2| |0|R1|2|3|R0|R3|2|3|R1|5|6|
| |I=0|1|2|3|4|5|6|7|8|9|10|11|12|13|

FIG. 21C

| | | | | | | | | | | | | | |
|---|---|---|---|---|---|---|---|---|---|---|---|---|---|
| 11 | | | | 8 | 7 | 9 | 10 | 11 | 12 | 14 | 15 | 13 | 16 | 17 |
| 10 | | | | 8 | 7 | 9 | 10 | 11 | 12 | 14 | 15 | 13 | 16 | 17 |
| 9 | R1 | R3 | | 8 | R0 | 9 | 10 | R1 | R2 | 14 | 15 | R0 | 16 | 17 |
| 8 | | | | 8 | 7 | 9 | 10 | 11 | 12 | 14 | 15 | 13 | 16 | 17 |
| 7 | | | | 4 | 7 | 5 | 6 | 11 | 12 | 7 | 8 | 13 | 9 | 10 |
| 6 | R0 | R2 | | 4 | R1 | 5 | 6 | R0 | R3 | 7 | 8 | R1 | 9 | 10 |
| 5 | | | | 4 | 1 | 5 | 6 | 0 | 1 | 7 | 8 | 4 | 9 | 10 |
| 4 | | | | 4 | 1 | 5 | 6 | 0 | 1 | 7 | 8 | 4 | 9 | 10 |
| 3 | R1 | R3 | | 0 | R0 | 2 | 3 | R1 | R2 | 2 | 3 | R0 | 5 | 6 |
| 2 | | | | 0 | 1 | 2 | 3 | 0 | 1 | 2 | 3 | 4 | 5 | 6 |
| 1 | | | | 0 | 1 | 2 | 3 | 0 | 1 | 2 | 3 | 4 | 5 | 6 |
| K=0 | R0 | R2 | | 0 | R1 | 2 | 3 | R0 | R3 | 2 | 3 | R1 | 5 | 6 |
| | I=0 | 1 | 2 | 3 | 4 | 5 | 6 | 7 | 8 | 9 | 10 | 11 | 12 | 13 |

FIG. 21D

| | | | | | | | | | | | | | |
|---|---|---|---|---|---|---|---|---|---|---|---|---|---|
| 11 | | | | 8 | 7 | 9 | 10 | 7 | 8 | | | 9 | 10 | 11 |
| 10 | | | | 8 | 7 | 9 | 10 | 7 | 8 | | | 9 | 10 | 11 |
| 9 | R1 | R3 | | 8 | R0 | 9 | 10 | R1 | R2 | | | R0 | 10 | 11 |
| 8 | | | | 8 | 7 | 9 | 10 | 7 | 8 | | | 9 | 10 | 11 |
| 7 | | | | 4 | 7 | 5 | 6 | 7 | 8 | | | 9 | 5 | 6 |
| 6 | R0 | R2 | | 4 | R1 | 5 | 6 | R0 | R3 | | | R1 | 5 | 6 |
| 5 | | | | 4 | 1 | 5 | 6 | 0 | 1 | | | 2 | 5 | 6 |
| 4 | | | | 4 | 1 | 5 | 6 | 0 | 1 | | | 2 | 5 | 6 |
| 3 | R1 | R3 | | 0 | R0 | 2 | 3 | R1 | R2 | | | R0 | 3 | 4 |
| 2 | | | | 0 | 1 | 2 | 3 | 0 | 1 | | | 2 | 3 | 4 |
| 1 | | | | 0 | 1 | 2 | 3 | 0 | 1 | | | 2 | 3 | 4 |
| K=0 | R0 | R2 | | 0 | R1 | 2 | 3 | R0 | R3 | | | R1 | 3 | 4 |
| | I=0 | 1 | 2 | 3 | 4 | 5 | 6 | 7 | 8 | 9 | 10 | 11 | 12 | 13 |

FIG. 21E

| | I=0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 11 | | | | 8 | 7 | 9 | 10 | 11 | 12 | | | 13 | 16 | 17 |
| 10 | | | | 8 | 7 | 9 | 10 | 11 | 12 | | | 13 | 16 | 17 |
| 9 | R1 | R3 | | 8 | R0 | 9 | 10 | R1 | R2 | | | R0 | 16 | 17 |
| 8 | | | | 8 | 7 | 9 | 10 | 11 | 12 | | | 13 | 16 | 17 |
| 7 | | | | 4 | 7 | 5 | 6 | 11 | 12 | | | 13 | 9 | 10 |
| 6 | R0 | R2 | | 4 | R1 | 5 | 6 | R0 | R3 | | | R1 | 9 | 10 |
| 5 | | | | 4 | 1 | 5 | 6 | 0 | 1 | | | 4 | 9 | 10 |
| 4 | | | | 4 | 1 | 5 | 6 | 0 | 1 | | | 4 | 9 | 10 |
| 3 | R1 | R3 | | 0 | R0 | 2 | 3 | R1 | R2 | | | R0 | 5 | 6 |
| 2 | | | | 0 | 1 | 2 | 3 | 0 | 1 | | | 4 | 5 | 6 |
| 1 | | | | 0 | 1 | 2 | 3 | 0 | 1 | | | 4 | 5 | 6 |
| K=0 | R0 | R2 | | 0 | R1 | 2 | 3 | R0 | R3 | | | R1 | 5 | 6 |

FIG. 22A

| | I=0 | 1 | 2 | 3 | 4 | 5 | 6 | 7 | 8 | 9 | 10 | 11 |
|---|---|---|---|---|---|---|---|---|---|---|---|---|
| 11 | | | | | DM | DM | 7 | 8 | 10 | 9 | DM | DM |
| 10 | | | | | DM | DM | 7 | 8 | 10 | 9 | DM | DM |
| 9 | R1 | R3 | | R0 | | | R1 | R2 | 10 | R0 | 11 | 11 |
| 8 | | | | | | | 7 | 8 | 10 | 9 | 11 | 11 |
| 7 | | | | | | | 7 | 8 | 6 | 9 | 4 | 5 |
| 6 | R0 | R2 | | R1 | DM | DM | R0 | R3 | 6 | R1 | DM | DM |
| 5 | | | | | DM | DM | 0 | 1 | 6 | 3 | DM | DM |
| 4 | | | | | | | 0 | 1 | 6 | 3 | 4 | 5 |
| 3 | R1 | R3 | | R0 | | | R1 | R2 | 2 | R0 | 4 | 5 |
| 2 | | | | | | | 0 | 1 | 2 | 3 | 4 | 5 |
| 1 | | | | | DM | DM | 0 | 1 | 2 | 3 | DM | DM |
| K=0 | R0 | R2 | | R1 | DM | DM | R0 | R3 | 2 | R1 | DM | DM |

FIG. 22B

| | I=0 | 1 | 2 | 3 | 4 | 5 | 6 | 7 | 8 | 9 | 10 | 11 |
|---|---|---|---|---|---|---|---|---|---|---|---|---|
| 11 | | | | | | | 9 | 10 | 12 | 11 | 13 | 14 |
| 10 | | | | | | | 9 | 10 | 12 | 11 | 13 | 14 |
| 9 | R1 | R3 | | R0 | | | R1 | R2 | 12 | R0 | 13 | 14 |
| 8 | | | | | | | 9 | 10 | 12 | 11 | 13 | 14 |
| 7 | | | | | | | 9 | 10 | 6 | 11 | 7 | 8 |
| 6 | R0 | R2 | | R1 | | | R0 | R3 | 6 | R1 | 7 | 8 |
| 5 | | | | | | | 0 | 1 | 6 | 3 | 7 | 8 |
| 4 | | | | | | | 0 | 1 | 6 | 3 | 7 | 8 |
| 3 | R1 | R3 | | R0 | | | R1 | R2 | 2 | R0 | 4 | 5 |
| 2 | | | | | | | 0 | 1 | 2 | 3 | 4 | 5 |
| 1 | | | | | | | 0 | 1 | 2 | 3 | 4 | 5 |
| K=0 | R0 | R2 | | R1 | | | R0 | R3 | 2 | R1 | 4 | 5 |

FIG. 23A

| 11 |  |  |  | 2 | 4 | DM | DM | 1 | 3 | 11 | 14 | 5 | DM | DM |
|---|---|---|---|---|---|---|---|---|---|---|---|---|---|---|
| 10 |  |  |  | 2 | 4 | DM | DM | 1 | 3 | 11 | 14 | 5 | DM | DM |
| 9 | R1 | R3 |  | 2 | R0 | 6 | 7 | R1 | R2 | 11 | 14 | R0 | 7 | 8 |
| 8 |  |  |  | 2 | 4 | 6 | 7 | 1 | 3 | 11 | 14 | 5 | 7 | 8 |
| 7 |  |  |  | 1 | 4 | 5 | 7 | 1 | 3 | 10 | 13 | 5 | 6 | 8 |
| 6 | R0 | R2 |  | 1 | R1 | DM | DM | R0 | R3 | 10 | 13 | R1 | DM | DM |
| 5 |  |  |  | 1 | 3 | DM | DM | 0 | 2 | 10 | 13 | 4 | DM | DM |
| 4 |  |  |  | 1 | 3 | 5 | 7 | 0 | 2 | 10 | 13 | 4 | 6 | 8 |
| 3 | R1 | R3 |  | 0 | R0 | 5 | 6 | R1 | R2 | 9 | 12 | R0 | 6 | 7 |
| 2 |  |  |  | 0 | 3 | 5 | 6 | 0 | 2 | 9 | 12 | 4 | 6 | 7 |
| 1 |  |  |  | 0 | 3 | DM | DM | 0 | 2 | 9 | 12 | 4 | DM | DM |
| K=0 | R0 | R2 |  | 0 | R1 | DM | DM | R0 | R3 | 9 | 12 | R1 | DM | DM |
| | l=0 | 1 | 2 | 3 | 4 | 5 | 6 | 7 | 8 | 9 | 10 | 11 | 12 | 13 |

FIG. 23B

| | | | | | | | | | | | | | |
|---|---|---|---|---|---|---|---|---|---|---|---|---|---|
| 11 | | | 2 | 4 | 7 | 10 | 1 | 3 | 14 | 17 | 5 | 8 | 11 |
| 10 | | | 2 | 4 | 7 | 10 | 1 | 3 | 14 | 17 | 5 | 8 | 11 |
| 9 | R1 | R3 | 2 | R0 | 7 | 10 | R1 | R2 | 14 | 17 | R0 | 8 | 11 |
| 8 | | | 2 | 4 | 7 | 10 | 1 | 3 | 14 | 17 | 5 | 8 | 11 |
| 7 | | | 1 | 4 | 6 | 9 | 1 | 3 | 13 | 16 | 5 | 7 | 10 |
| 6 | R0 | R2 | 1 | R1 | 6 | 9 | R0 | R3 | 13 | 16 | R1 | 7 | 10 |
| 5 | | | 1 | 3 | 6 | 9 | 0 | 2 | 13 | 16 | 4 | 7 | 10 |
| 4 | | | 1 | 3 | 6 | 9 | 0 | 2 | 13 | 16 | 4 | 7 | 10 |
| 3 | R1 | R3 | 0 | R0 | 5 | 8 | R1 | R2 | 12 | 15 | R0 | 6 | 9 |
| 2 | | | 0 | 3 | 5 | 8 | 0 | 2 | 12 | 15 | 4 | 6 | 9 |
| 1 | | | 0 | 3 | 5 | 8 | 0 | 2 | 12 | 15 | 4 | 6 | 9 |
| K=0 | R0 | R2 | 0 | R1 | 5 | 8 | R0 | R3 | 12 | 15 | R1 | 6 | 9 |
| | I=0 | 1 | 2 | 3 | 4 | 5 | 6 | 7 | 8 | 9 | 10 | 11 | 12 | 13 |

FIG. 24A

| | I=0 | 1 | 2 | 3 | 4 | 5 | 6 | 7 | 8 | 9 | 10 | 11 |
|---|---|---|---|---|---|---|---|---|---|---|---|---|
| 11 | | | 6 | 5 | DM | DM | 7 | 8 | 10 | 9 | DM | DM |
| 10 | | | 6 | 5 | DM | DM | 7 | 8 | 10 | 9 | DM | DM |
| 9 | R1 | R3 | 6 | R0 | 7 | 7 | R1 | R2 | 10 | R0 | 11 | 11 |
| 8 | | | 6 | 5 | 7 | 7 | 7 | 8 | 10 | 9 | 11 | 11 |
| 7 | | | 4 | 5 | 2 | 3 | 7 | 8 | 6 | 9 | 4 | 5 |
| 6 | R0 | R2 | 4 | R1 | DM | DM | R0 | R3 | 6 | R1 | DM | DM |
| 5 | | | 4 | 1 | DM | DM | 0 | 1 | 6 | 3 | DM | DM |
| 4 | | | 4 | 1 | 2 | 3 | 0 | 1 | 6 | 3 | 4 | 5 |
| 3 | R1 | R3 | 0 | R0 | 2 | 3 | R1 | R2 | 2 | R0 | 4 | 5 |
| 2 | | | 0 | 1 | 2 | 3 | 0 | 1 | 2 | 3 | 4 | 5 |
| 1 | | | 0 | 1 | DM | DM | 0 | 1 | 2 | 3 | DM | DM |
| K=0 | R0 | R2 | 0 | R1 | DM | DM | R0 | R3 | 2 | R1 | DM | DM |

FIG. 24B

| | | | | | | | | | | | |
|---|---|---|---|---|---|---|---|---|---|---|---|
| 11 | | | 8 | 7 | 9 | 10 | 9 | 10 | 12 | 11 | 13 | 14 |
| 10 | | | 8 | 7 | 9 | 10 | 9 | 10 | 12 | 11 | 13 | 14 |
| 9 | R1 | R3 | 8 | R0 | 9 | 10 | R1 | R2 | 12 | R0 | 13 | 14 |
| 8 | | | 8 | 7 | 9 | 10 | 9 | 10 | 12 | 11 | 13 | 14 |
| 7 | | | 4 | 7 | 5 | 6 | 9 | 10 | 6 | 11 | 7 | 8 |
| 6 | R0 | R2 | 4 | R1 | 5 | 6 | R0 | R3 | 6 | R1 | 7 | 8 |
| 5 | | | 4 | 1 | 5 | 6 | 0 | 1 | 6 | 3 | 7 | 8 |
| 4 | | | 4 | 1 | 5 | 6 | 0 | 1 | 6 | 3 | 7 | 8 |
| 3 | R1 | R3 | 0 | R0 | 2 | 3 | R1 | R2 | 2 | R0 | 4 | 5 |
| 2 | | | 0 | 1 | 2 | 3 | 0 | 1 | 2 | 3 | 4 | 5 |
| 1 | | | 0 | 1 | 2 | 3 | 0 | 1 | 2 | 3 | 4 | 5 |
| K=0 | R0 | R2 | 0 | R1 | 2 | 3 | R0 | R3 | 2 | R1 | 4 | 5 |
| | I=0 | 1 | 2 | 3 | 4 | 5 | 6 | 7 | 8 | 9 | 10 | 11 |

METHOD FOR TRANSMITTING CONTROL SIGNAL TO RELAY NODE AT BASE STATION IN MIMO WIRELESS COMMUNICATION SYSTEM AND APPARATUS THEREFOR

CROSS-REFERENCE TO RELATED APPLICATIONS

This application is a continuation of U.S. application Ser. No. 13/256,625, filed on Sep. 14, 2011, currently pending, which is the national stage filing under 35 U.S.C. 371 of International Application No. PCT/KR2011/000614, filed on Jan. 28, 2011, which claims the benefit of earlier filing date and right of priority to Korean Application No. 10-2011-0004024, filed on Jan. 14, 2011, and also claims the benefit of U.S. Provisional Application Ser. Nos. 61/392,923, filed on Oct. 13, 2010, 61/356,028, filed on Jun. 17, 2010, 61/353,199, filed on Jun. 9, 2010, 61/352,376, filed on Jun. 7, 2010, 61/349,796, filed on May 28, 2010, 61/300,820, filed on Feb. 2, 2010, and 61/299,325, filed on Jan. 28, 2010, the contents of which are all hereby incorporated by reference herein in their entirety.

TECHNICAL FIELD

The present invention relates to a wireless communication system, and more particularly, to a method for transmitting a control signal a relay node at a base station in a MIMO wireless communication system and an apparatus therefor.

BACKGROUND ART

Multiple-Input Multiple-Output (MIMO) means a scheme that uses a plurality of transmitting antennas and a plurality of receiving antennas. Transmission and reception efficiency can be improved by the MIMO scheme. Namely, a transmitting side or receiving side of a wireless communication system can enhance capacity and improve throughput by using a plurality of antennas. Hereinafter, MIMO may be referred to as 'MIMO antenna'.

The MIMO antenna technology does not depend on a signal antenna path to receive a whole message. Instead, in the MIMO antenna technology, data fragments received from a plurality of antennas are incorporated to complete data. If the MIMO antenna technology is used, a data transmission rate can be improved within a specific sized cell region, or system coverage can be enhanced with a specific data transmission rate. Also, the MIMO antenna technology can widely be used for a user equipment for mobile communication and a relay node. According to the MIMO antenna technology, it is possible to overcome limitation of a transmission rate in mobile communication according to the related art where a single antenna is used.

A schematic view of a general MIMO communication system is illustrated in FIG. 1. Referring to FIG. 1, $N_T$ number of transmitting antennas are provided at a transmitting side while $N_R$ number of receiving antennas are provided at a receiving side. If a plurality of antennas are used at both the transmitting side and the receiving side, theoretical channel transmission capacity is more increased than that a plurality of antennas are used at any one of the transmitting side and the receiving side. Increase of the channel transmission capacity is proportional to the number of antennas. Accordingly, the transmission rate is improved, and frequency efficiency is also improved. Supposing that a maximum transmission rate is $R_o$ when a single antenna is used, a transmission rate corresponding to a case where multiple antennas are used can be increased theoretically, as expressed by the following Equation 1, as much as a value obtained by multiplying a maximum transmission rate $R_o$ by a rate increase $R_i$. In this case, $R_i$ corresponds to a smaller value of $N_T$ and $N_R$.

$$R_i = \min(N_T, N_R) \quad \text{[Equation 1]}$$

For example, in a MIMO communication system that uses four transmitting antennas and four receiving antennas, a transmission rate four times greater than that of a single antenna system can be obtained. After such theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate.

In order to describe a communication method in a MIMO system in more detail, mathematical modeling of the communication method can be expressed as follows. As illustrated in FIG. 1, it is assumed that $N_T$ number of transmitting antennas and $N_R$ number of receiving antennas exist. First of all, a transmitting signal will be described. If there exist $N_T$ number of transmitting antennas, since the number of maximum transmission information is $N_T$, the transmission information can be expressed by a vector shown in Equation 2 as follows.

$$s = [s_1, s_2, \ldots, s_{N_T}]^T \quad \text{[Equation 2]}$$

Meanwhile, different kinds of transmission power can be applied to each of the transmission information $s_1, s_2, \ldots, s_{N_T}$. At this time, supposing that each transmission power is $P_1, P_2, \ldots, P_{N_T}$, transmission information of which transmission power is controlled can be expressed by a vector shown in Equation 3 as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{S}$ can be expressed by Equation 4 below using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, it is considered that a weight matrix W is applied to the information vector $\hat{S}$ of which transmission power is controlled, so as to obtain $N_T$ transmitting signals $x_1, x_2, \ldots, x_{N_T}$. In this case, the weight matrix serves to properly distribute the transmission information to each antenna depending on a transmission channel status. Such transmitting signals $x_1, x_2, \ldots, x_{N_T}$ can be expressed by Equation 5 below using a vector X. In this case, $W_{ij}$ means a weight value between the i th transmitting antenna and the j th information.

W may be referred to as a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Equation 5]}$$

$$= W\hat{s} = WPs$$

Generally, a rank in the channel matrix may physically mean the maximum number of rows or columns that can transmit different kinds of information from a given channel. Accordingly, since a rank of the channel matrix is defined by a minimum number of independent rows or columns, it is not greater than the number of rows or columns. For example, a rank H of the channel matrix H is restricted as illustrated in Equation 6 below.

$$\text{rank}(H) \leq \min(N_T, N_R) \quad \text{[Equation 6]}$$

Also, different kinds of information transmitted using the MIMO technology will be defined as 'transport stream' or more simply as 'stream'. This stream may be referred to as a 'layer'. In this case, the number of transport streams cannot be greater than the rank of the channel, which corresponds to the maximum number that can transmit different kinds of information. Accordingly, the channel matrix H can be expressed by the following Equation 7.

$$\text{\# of streams} \leq \text{rank}(H) \leq \min(N_T, N_R) \quad \text{[Equation 7]}$$

In this case, "# of streams" represents the number of streams. Meanwhile, it is to be understood that one stream can be transmitted through one or more antennas.

Various methods for corresponding one or more streams to several antennas can exist. These methods can be described, as follows, depending on the types of the MIMO technology. If one stream is transmitted through several antennas, it may be regarded as a spatial diversity scheme. If several streams are transmitted through several antennas, it may be regarded as a spatial multiplexing scheme. Of course, a hybrid scheme of the spatial diversity scheme and the spatial multiplexing scheme can exist.

DISCLOSURE

Technical Problem

Accordingly, the present invention is directed to a method for transmitting a control signal to a relay node at a base station in a multi-input multi-output (MIMO) wireless communication system and an apparatus therefor, which substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for transmitting a control signal to a relay node at a base station in a multi-input multi-output (MIMO) wireless communication system comprises configuring relay-resource element groups (R-REGs) in a unit of four resource elements (REs) contiguous in the ascending order of subcarrier indexes, except for resource elements for a reference signal (RS); allocating transmission resources to the control signal in a unit of the relay-resource element group; and transmitting the control signal to the relay node by using the allocated transmission resources, wherein the resource elements for the reference signal include resource elements for channel state information-RS (CSI-RS), which include resource elements for a channel state information RS to which a transmission power of 0 is allocated.

Preferably, the method further comprises transmitting resource element pattern information for the channel state information reference signal to the relay node.

In another aspect of the present invention, a base station apparatus in a multi-input multi-output (MIMO) wireless communication system comprises a processor for configuring relay-resource element groups (R-REGs) in a unit of four resource elements (REs) contiguous in the ascending order of subcarrier indexes, except for resource elements for a reference signal (RS), and allocating transmission resources to the control signal in a unit of the relay-resource element group; and a transmitting module for transmitting the control signal to the relay node by using the allocated transmission resources, wherein the resource elements for a reference signal include resource elements for channel state information-RS (CSI-RS), which include resource elements for a channel state information RS to which a transmission power of 0 is allocated.

Preferably, the transmitting module is configured to transmit resource element pattern information for the channel state information reference signal to the relay node.

In this case, the channel state information reference signal to which a transmission power of 0 is allocated is a channel state information reference signal of one or more neighboring base stations.

Also, indexing of the relay-resource element groups performs in accordance with a time-first mode, per a slot unit. Further, the channel state information reference signal is defined by using 8 logical antenna ports.

Advantageous Effects

According to the embodiment of the present invention, a base station can effectively transmit a control signal to a relay node in a MIMO wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 2 is a diagram illustrating structures of a control plane and a user plane of a radio interface protocol between one user equipment and E-UTRAN based on the 3GPP radio access network standard;

FIG. 8 is a diagram illustrating a structure of a reference signal in an LTE system that supports downlink transmission based on four antennas;

FIG. 11(a) is a diagram illustrating a reference signal pattern in a 3GPP release 8 system;

FIG. 11(b) is a diagram illustrating a reference signal pattern in a 3GPP release 9 system or 3GPP release 10 system;

FIG. 13 is a diagram illustrating an example of R-REG indexing for R-PDCCH in accordance with the embodiment of the present invention;

FIG. 14 is a diagram the embodiment of the present invention;

FIG. 15 is a diagram illustrating an example of R-PDCCH transmission for application of 4TX SFBC;

FIG. 16 is a diagram illustrating another example of R-PDCCH transmission for application of 4TX SFBC;

Figure 18A:
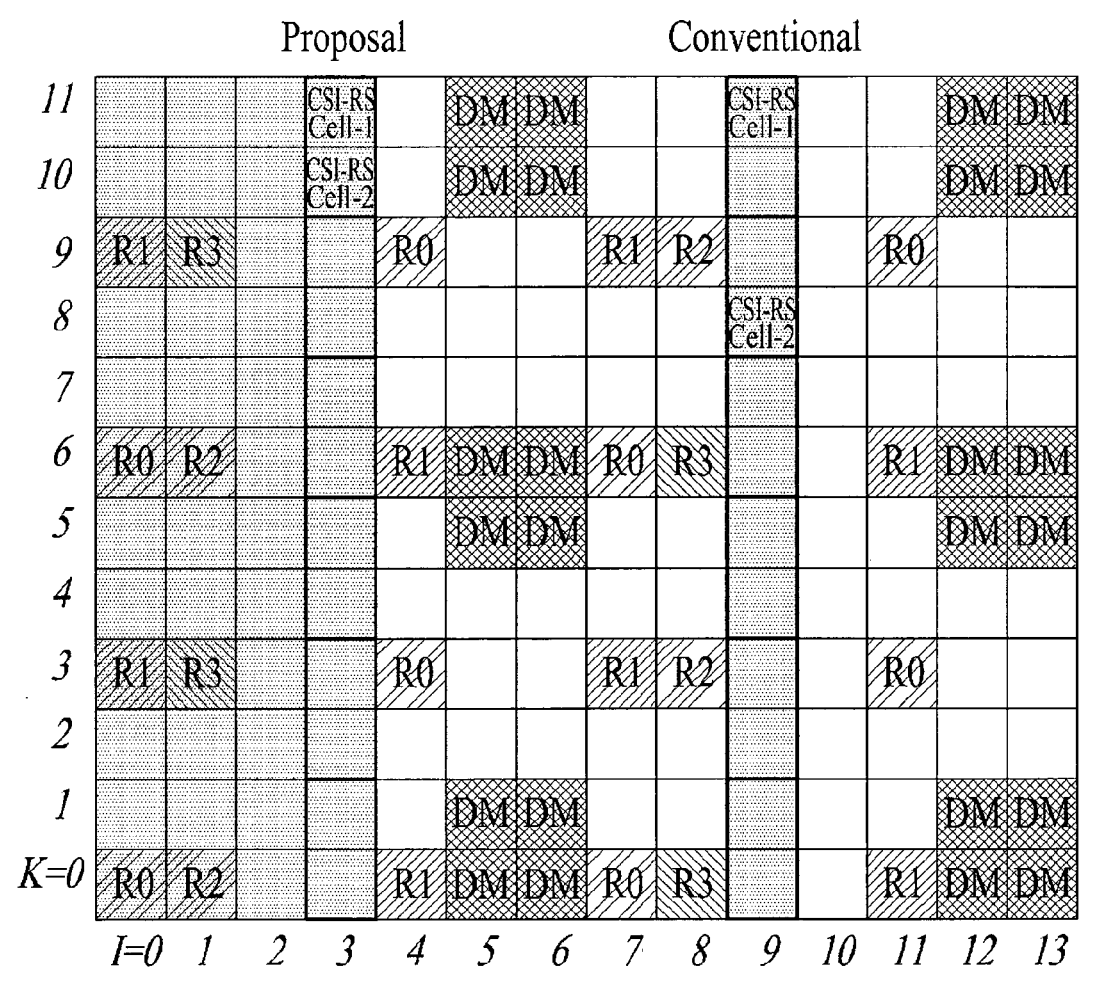
Figure 18B:
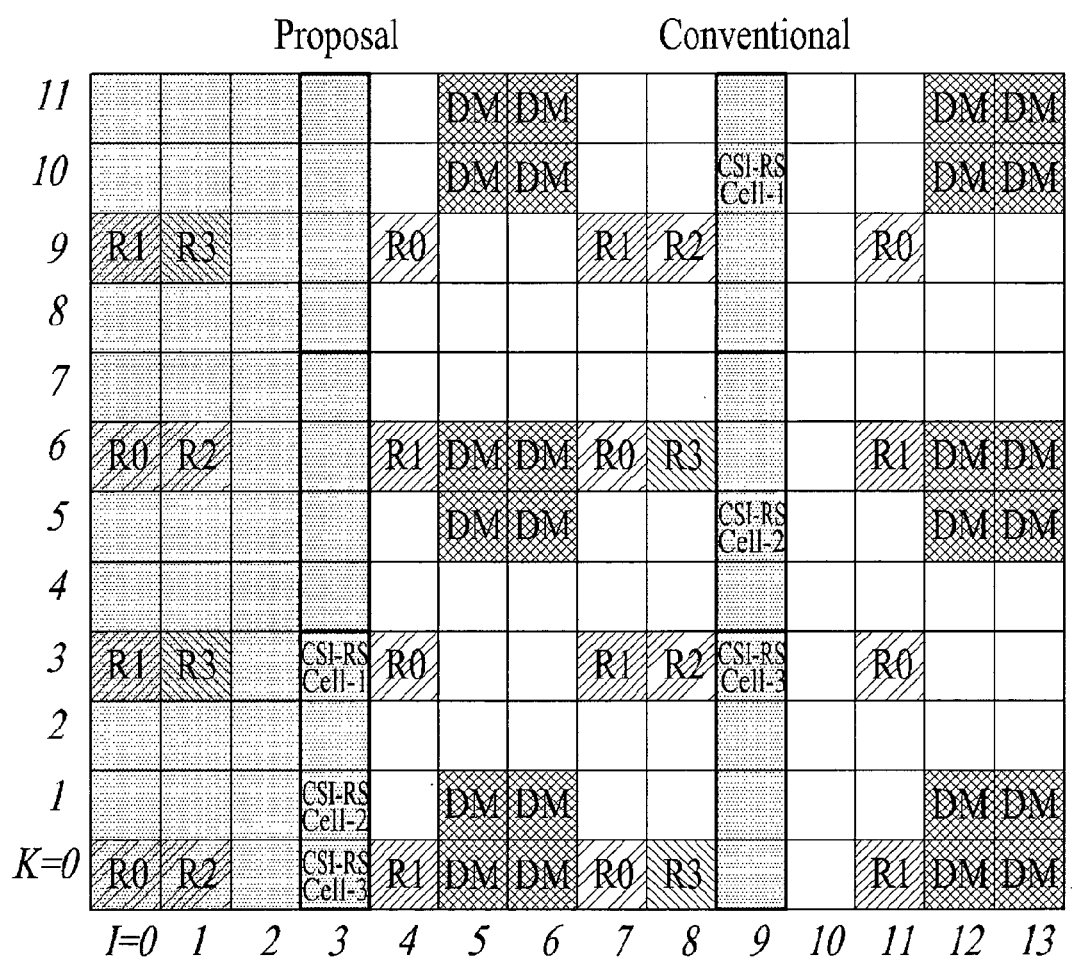
Figure 18C:
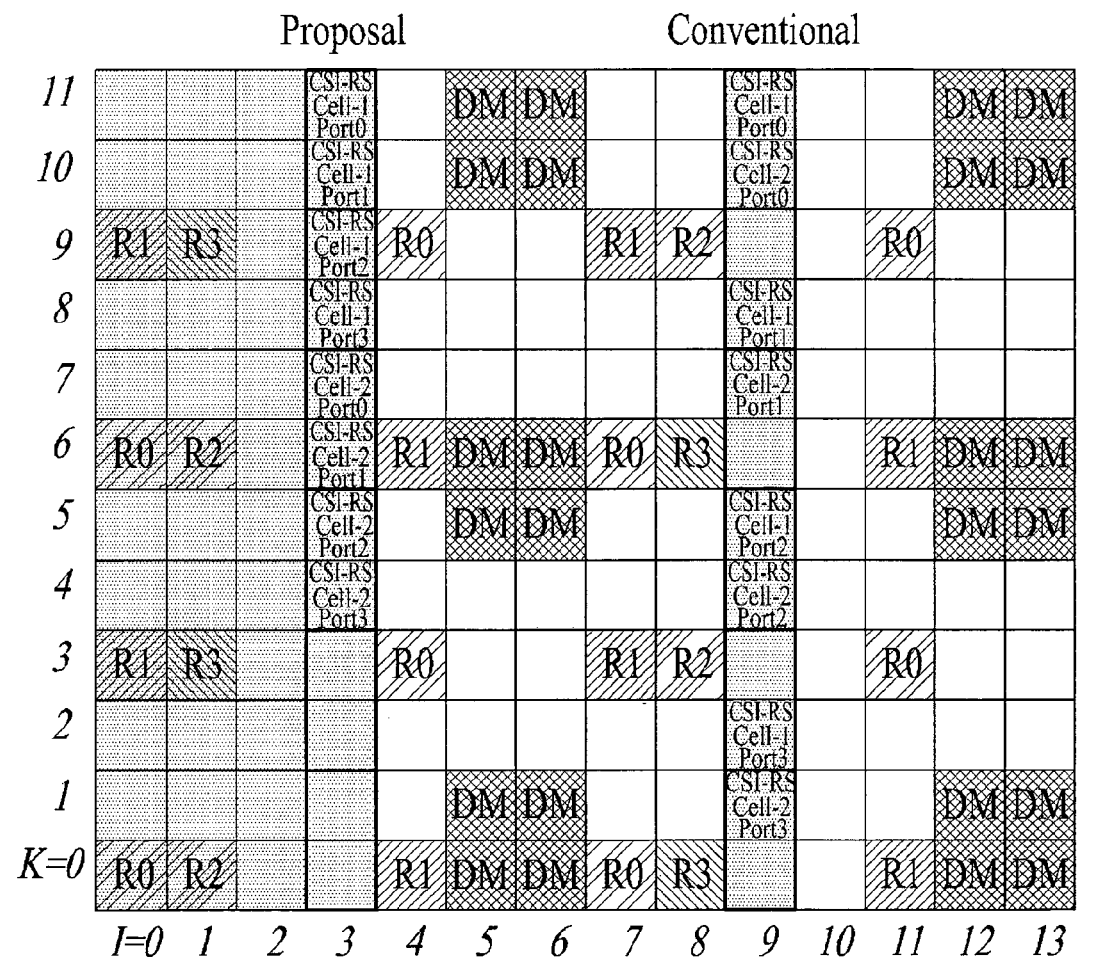
Figure 18D:
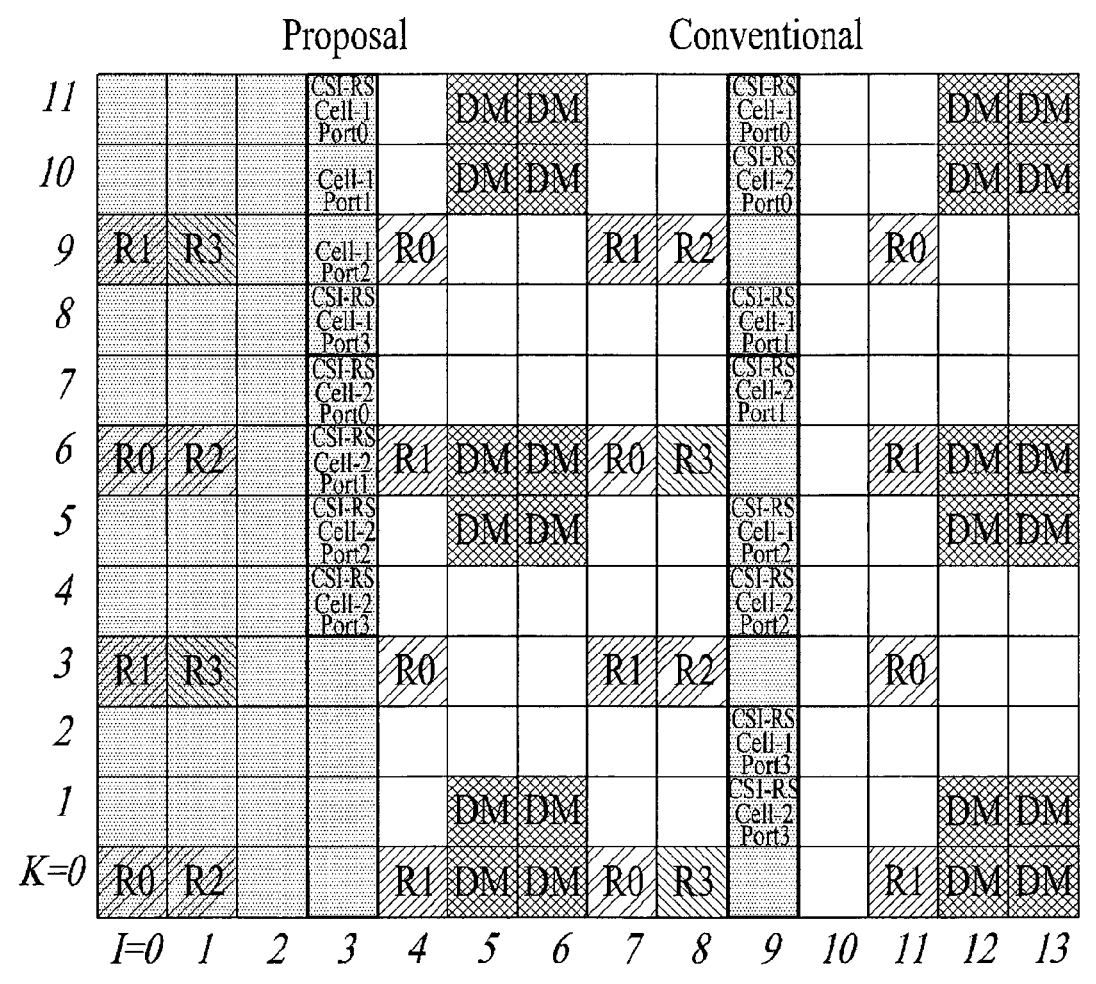

FIG. 18 is a diagram illustrating a configuration of R-REG or R-CCE according to the embodiment of the present invention;

FIG. 19 is a diagram illustrating an example of a configuration and indexing of R-REG according to the embodiment of the present invention;

FIG. 20 is a diagram illustrating another example of configuration and indexing of R-REG according to the embodiment of the present invention;

FIG. 21 is a diagram illustrating still another example of a configuration and indexing of R-REG according to the embodiment of the present invention;

FIG. 22 is a diagram illustrating an example of a position of OFDM symbols for CSI-RS in case of extended CP and R-REG indexing considering the position of OFDM symbols;

FIG. 23 is a diagram illustrating further still another example of a configuration and indexing of R-REG according to the embodiment of the present invention;

FIG. 24 is a diagram illustrating a configuration and indexing of R-REG in case of extended CP in accordance with the embodiment of the present invention;

FIG. 29 and FIG. 30 are diagrams illustrating a method for configuring R-REG considering a CSI-RS muting scheme in accordance with the embodiment of the present invention.

MODE FOR INVENTION

Figure 1:
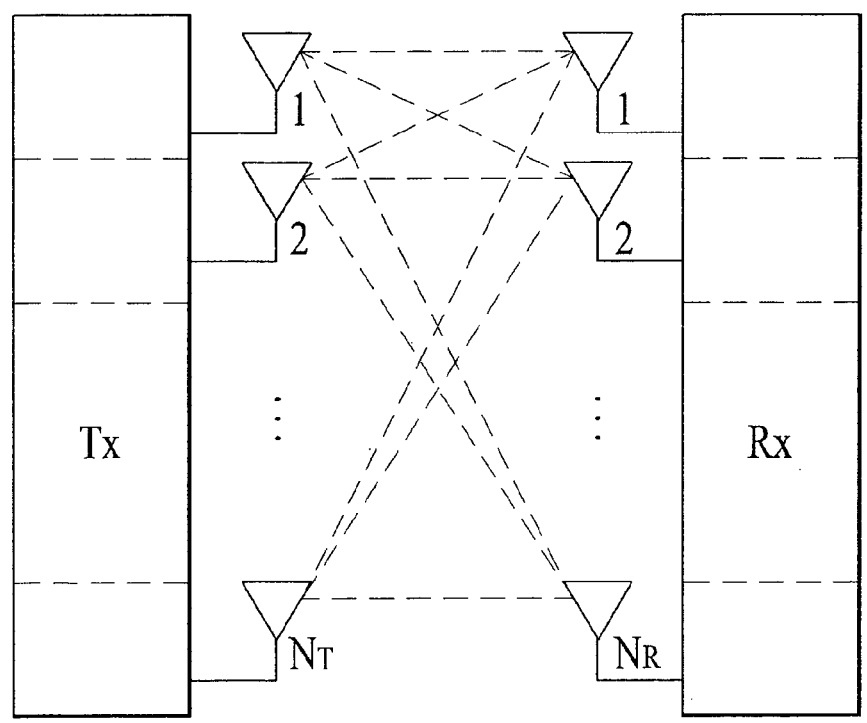
FIG. 1 is a schematic view illustrating a general MIMO communication system.

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on an LTE system and an LTE-A system, the LTE system and the LTE-A system are only exemplary and can be applied to all communication systems corresponding to the aforementioned definition. Also, although the embodiment of the present invention will herein be described based on FDD mode, the FDD mode is only exemplary, and the embodiment of the present invention may easily be applied to H-FDD mode or TDD mode through modifications.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control layer located above the physical layer via a transport channel. Data are transferred between the medium access control layer and the physical layer via the transport channel. Data are transferred between the physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC layer) above the MAC layer via logical channels. The RLC layer of the second layer supports reliable data transfer. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer (L2) performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting eNB is established at one of bandwidths of 1.25, 2.5, 5, 10, 15, and 20 Mhz and provides a downlink or uplink transmission service to several user equipments. At this time, different cells can be configured to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
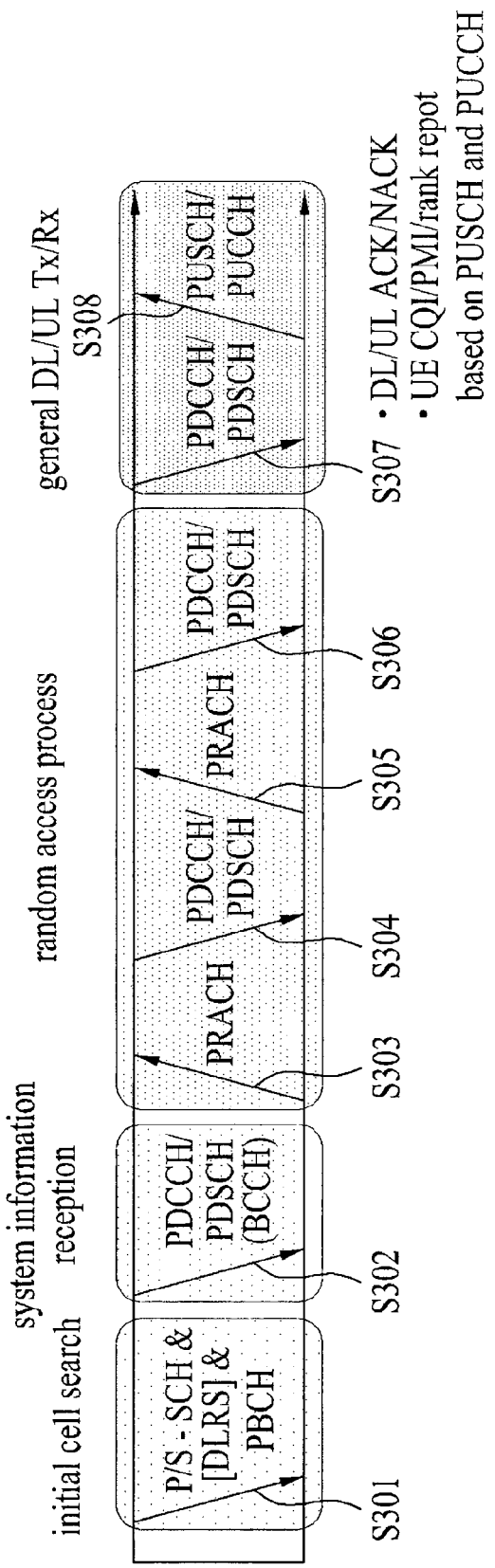
FIG. 3 is a diagram illustrating physical channels used in a 3GPP system and a method for transmitting a general signal using the physical channel.

FIG. 3 is a diagram illustrating physical channels used in a 3GPP system and a method for transmitting a general signal using the physical channels.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station. Meanwhile, the user equipment can identify the status of a downlink channel by receiving a downlink reference signal (DL RS) in the initial cell search step.

The user equipment which has finished the initial cell search can acquire more detailed system information by receiving a physical downlink control channel (PDSCH) in accordance with a physical downlink control channel (PDCCH) and information carried in the PDCCH (S302).

Meanwhile, if the user equipment initially accesses the base station, or if there is no radio resource for signal transmission, the user equipment performs a random access procedure (RACH) for the base station (S303 to S306). To this end, the user equipment transmits a preamble of a specific sequence through a random physical random access channel (PRACH) (S303 and S305), and receives a response message to the preamble through the PDCCH and a PDSCH corresponding to the PDCCH (S304 and S306). In case of a contention based RACH, a contention resolution procedure can be performed additionally.

The user equipment which has performed the aforementioned steps receives the PDCCH/PDSCH (S307) and transmits a physical uplink shared channel (PUSCH) and a physical uplink control channel (PUCCH) (S308), as general a procedure of transmitting uplink/downlink signals. In particular, the user equipment receives downlink control information (DCI) through the PDCCH. The DCI includes control information such as resource allocation information on the user equipment and has different formats depending on its purpose of use.

Meanwhile, the control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment transmits the aforementioned control information such as CQI/PMI/RI through the PUSCH and/or the PUCCH.

Figure 4:
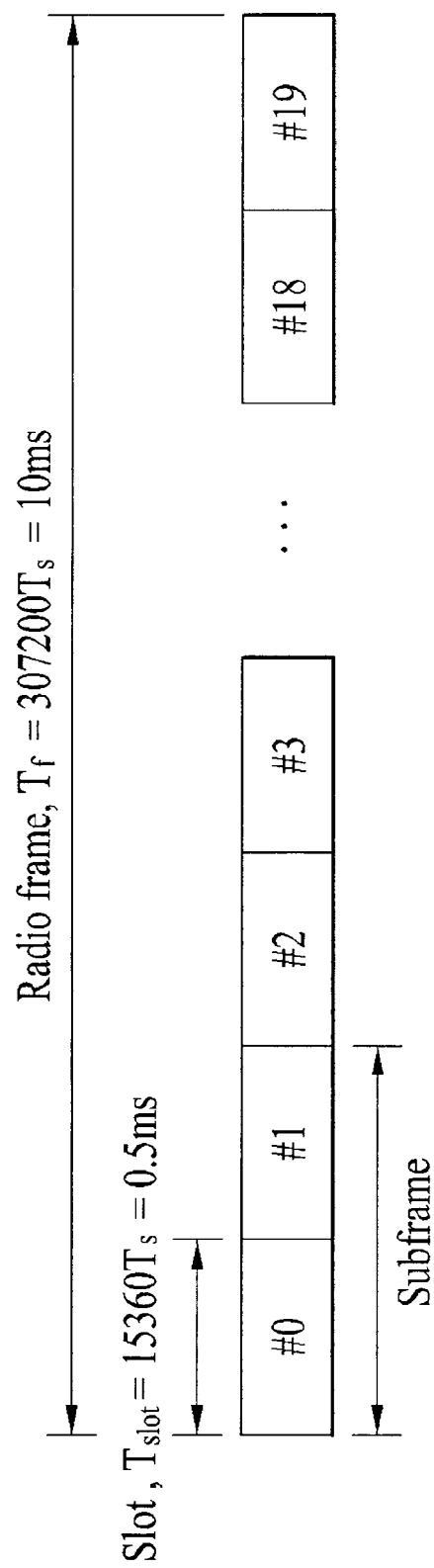
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms ($327200 \cdot T_s$) and includes 10 subframes of an equal size. Each sub frame has a length of 1 ms and includes two slots. Each slot has a length of 0.5 ms ($15360 \cdot T_s$). In this case, $T_s$ represents a sampling time, and is expressed by $T_s = 1/(15 \text{ kHz} \times 2048) = 3.2552 \times 10^{-8}$ (about 33 ns). The slot includes a plurality of OFDM symbols in a time domain, and includes a plurality of resource blocks (RBs) in a frequency domain. In the LTE system, one resource block includes twelve (12) subcarriers×seven (or six) OFDM symbols. A transmission time interval (TTI), which is a transmission unit time of data, can be determined in a unit of one or more subframes. The aforementioned structure of the radio frame is only exemplary, and various modifications can be made in the number of subframes included in the radio frame or the number of slots included in the subframe, or the number of OFDM symbols included in the slot.

Figure 5:
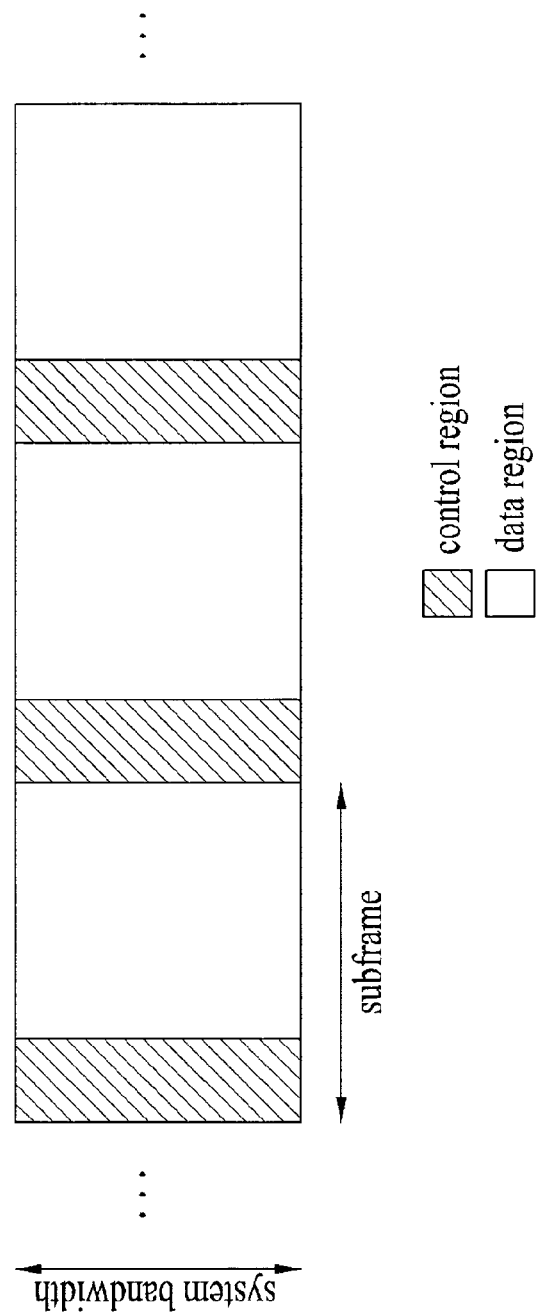
FIG. 5 is a diagram illustrating a structure of a downlink subframe used in an LTE system.

FIG. 5 is a diagram illustrating a structure of a downlink subframe used in an LTE system.

Referring to FIG. 5, the downlink radio frame includes ten subframes having an equal length. In the 3GPP LTE system, the subframes are defined in a basic time unit of packet scheduling for all downlink frequencies. Each subframe is divided into a control region for transmission of scheduling information and other control information and a data region for transmission of downlink data. The control region starts from the first OFDM symbol of the subframe and includes one or more OFDM symbols. The control region can have a size set independently per subframe. The control region is used to transmit L1/L2 (layer 1/layer 2) control signals. The data region is used to transmit downlink traffic.

Figure 6:
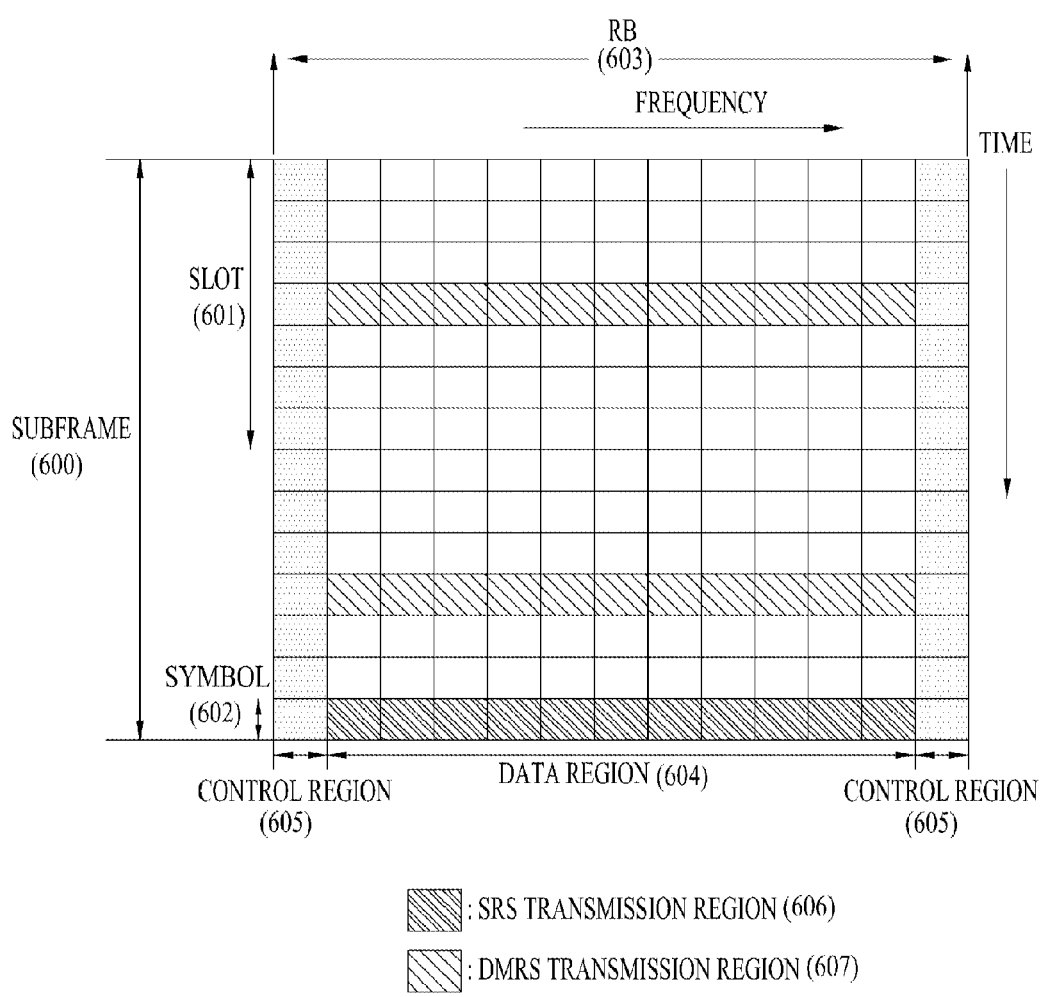
FIG. 6 is a diagram illustrating a structure of an uplink subframe used in an LTE system.

FIG. 6 is a diagram illustrating a structure of an uplink subframe used in an LTE system.

Referring to FIG. 6, a subframe 600 having a length of 1 ms, which is a basic unit of LTE uplink transmission, includes two slots 601 of 0.5 ms. In case of normal cyclic prefix (CP) length, each slot includes seven symbols 602, each of which corresponds to each SC-FDMA symbol. A resource block (RB) 603 is a resource allocation unit corresponding to twelve (12) subcarriers in a frequency domain and one slot in a time domain. A structure of an LTE uplink subframe is classified into a data region 604 and a control region 605. In this case, the data region means a series of communication resources used for transmission of data such as voice and packet transmitted to each user equipment, and corresponds to the other resources except for the control region within the subframe. The control region means a series of communication resources used for transmission of downlink channel quality report, ACK/NACK of a downlink signal, and uplink scheduling request from each user equipment.

As illustrated in FIG. 6, an interval 606 for which a sounding reference signal can be transmitted within one subframe is a duration where SC-FDMA symbol at the last location on a time axis of one subframe exists, and the sounding reference signal is transmitted through a data transmission band on a frequency axis. Sounding reference signals of several user equipments, which are transmitted to the last SC-FDMA of the same subframe, can be identified by a cyclic shift value. Also, an interval 607 for which a demodulation (DM) sounding reference signal can be transmitted within one subframe is a duration where middle SC-FDMA symbols at one slot, i.e., the fourth SC-FDMA symbol and the eleventh SC-FDMA symbol exist, and the DM sounding reference signal is transmitted through a data transmission band on a frequency axis.

Figure 7:
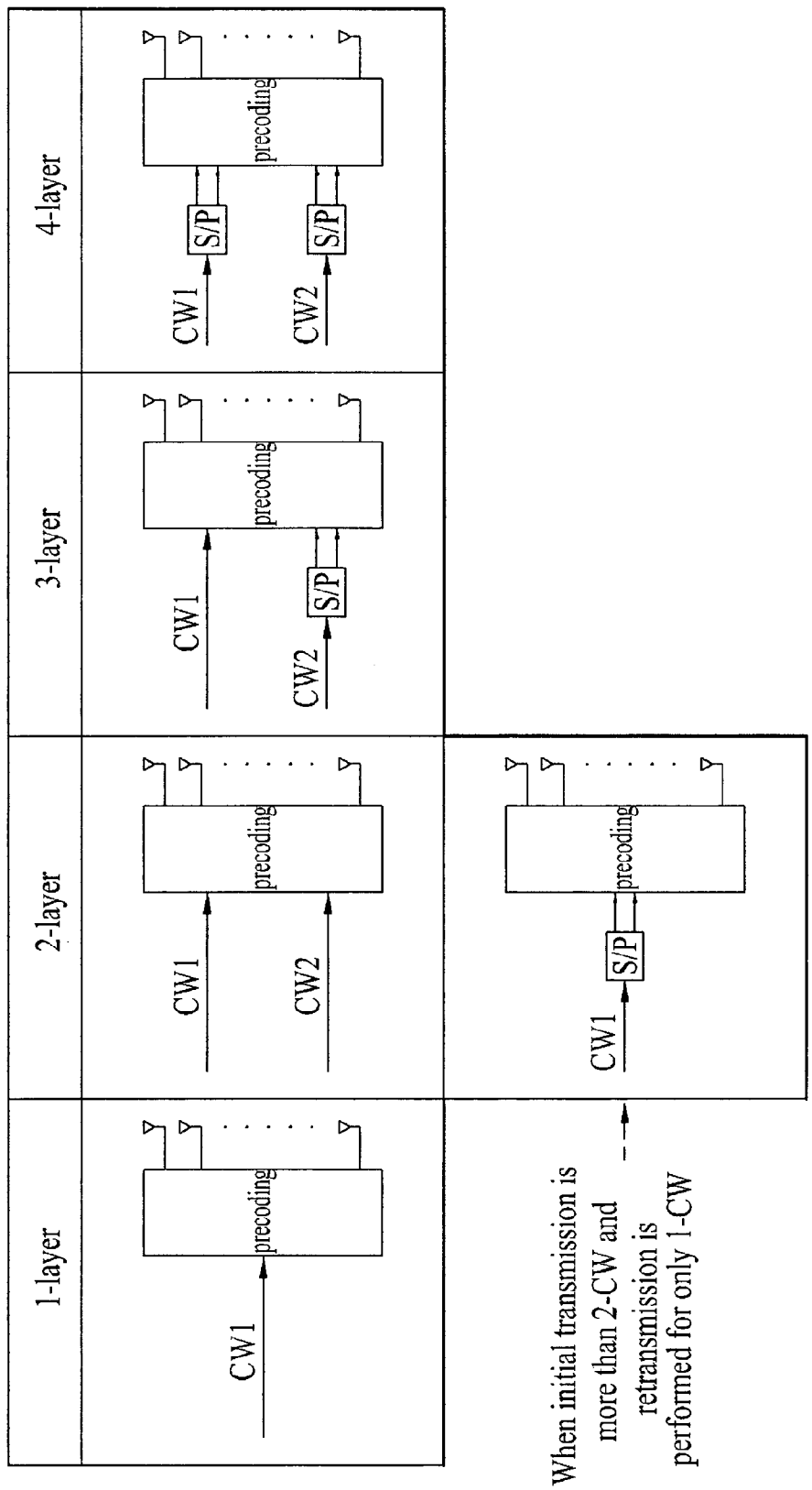
FIG. 7 is a diagram illustrating various methods of mapping a codeword into a layer.

FIG. 7 is a diagram illustrating various methods of mapping a codeword into a layer.

Referring to FIG. 7, various methods for mapping a codeword into a layer are provided. When MIMO transmission is performed, a transmitter should determine the number of codewords depending on layers. The number of codewords is determined referring to the number of data sequences and a rank of a channel, which are different from those of the number of layers. The transmitter needs to map the codewords into the layers.

Hereinafter, the reference signal will be described in more detail. In general, for channel measurement, the reference signal already known by the transmitter and the receiver is transmitted from the transmitter to the receiver together with data. The reference signal provides a modulation scheme as well as channel measurement, so that a demodulation process is performed. The reference signal is classified into a dedicated reference signal (DRS), which is a user equipment specific reference signal, for the base station and a specific user equipment, and a common reference signal (CRS) which is a cell-specific reference signal for all user equipments within a cell. Also, the cell-specific reference signal includes a reference signal for reporting CQI/PMI/RI measured by the user equipment to the base station, and is referred to as a channel state information-RS (CSI-RS).

Figure 8:
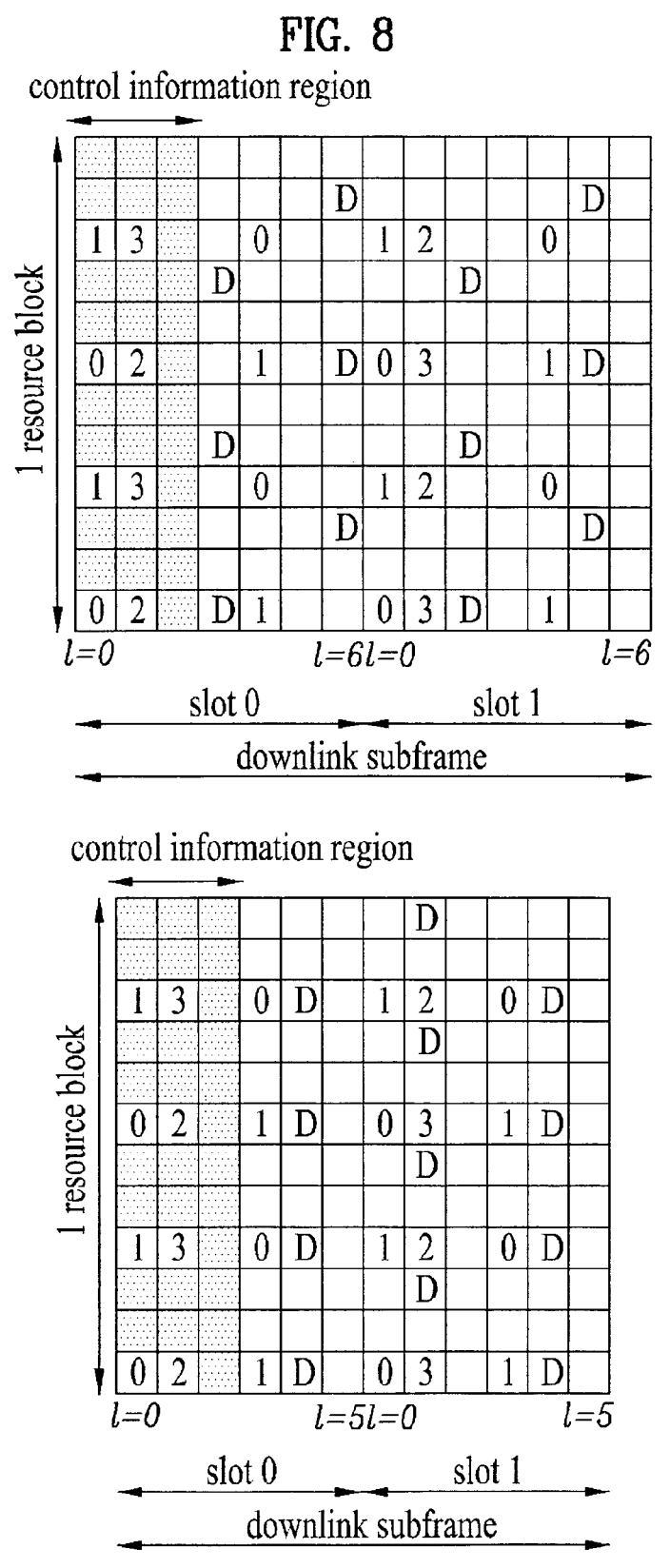

FIG. 8 is a diagram illustrating a structure of a reference signal in an LTE system that supports downlink transmission based on four antennas. In particular, (a) of FIG. 8 illustrates normal cyclic prefix, and (b) of FIG. 8 illustrates extended cyclic prefix.

Referring to FIG. 8, 0 to 3 in a latticed pattern mean common reference signals (CRS), which are cell-specific reference signals transmitted for channel measurement and data demodulation to respectively correspond to antenna ports 0 to 3. The cell-specific reference signals CRS can be transmitted to the user equipment through a control information region as well as a data information region.

Also, 'D' in the lattice pattern means a downlink demodulation RS (DM-RS), which is a user equipment specific RS, and supports single antenna port transmission through a data region, i.e. PDSCH. The user equipment is signaled, through an upper layer, as to whether the user equipment specific RS exists.

Meanwhile, an RS mapping rule into a resource block (RB) can be expressed by the following Equations 8 to 10. The following Equation 8 illustrates a CRS mapping rule. And, the Equation 9 illustrates a DRS mapping rule to which normal CP is applied, and the Equation 10 illustrates a DRS mapping rule to which extended CP is applied.

$$k = 6m + (v + v_{shift}) \bmod 6 \quad \text{[Equation 8]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l' = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

$$k = (k') \bmod N_{sc}^{RB} + N_{sc}^{RB} \cdot n_{PRB} \quad \text{[Equation 9]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 10]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In the Equations 8 to 10, k and p represent subcarrier index and antenna port, respectively. $N_{RB}^{DL}$, ns, $N_{cell}^{ID}$ represent the number of RBs allocated to a downlink, the number of slot indexes, and the number of cell IDs, respectively. The position of the RS is varied depending on a value of $V_{shift}$ in view of a frequency domain.

It is expected that the LTE-A system which is the standard of the next generation mobile communication system will support a coordinated multi point (CoMP) system, which is not supported in the existing standard, to improve a data transmission rate. In this case, the CoMP system means that a system in which two or more base stations or cells perform communication with a user equipment in cooperation with each other to improve communication throughput between a user equipment located in a shade zone and a base station (cell or sector).

The CoMP system can be classified into a CoMP-joint processing (CoMP-JP) system of cooperative MIMO type through data sharing and a CoMP-coordinated scheduling/beamforming (CoMP-CS/CB) system.

In case of the downlink, according to the CoMP-JP system, the user equipment can simultaneously receive data from each base station that performs CoMP, and can improve receiving throughput by combining signals received from each base station with one another. Unlike the CoMP-JP system, according to the CoMP-CS/CB system, the user equipment can receive data from one base station through beamforming.

In case of the uplink, according to the CoMP-JP system, each base station can simultaneously receive a PUSCH signal from the user equipment. Unlike the CoMP-JP system, according to the CoMP-CS/CB system, only one base station can receive a PUSCH. In this case, the CoMP-CS/CB system is determined by cooperative cells (or base stations).

Meanwhile, when the channel status between the base station and the user equipment is poor, a relay node (RN) is provided between the base station and the user equipment, whereby a radio channel having the more excellent channel status can be provided to the user equipment. Also, a relay node is provided in a cell edge zone having a poor channel status from the base station, whereby a data channel can be provided at higher speed, and a cell service zone can be extended. In this way, the technology of the relay node has been introduced to remove a radio wave shadow zone in a wireless communication system, and is widely used at present.

The technology of the relay node is being recently developed to more intelligent type than a function of a repeater that simply amplifies a signal and transmits the amplified signal. Moreover, the technology of the relay node reduces the extension cost for installation of base stations and the maintenance cost of a backhaul network in a next generation mobile communication system and at the same time is required to extend service coverage and improve a data processing rate. As the technology of the relay node is gradually developed, it is required that a new wireless communication system should support a relay node used in the related art wireless communication system.

In a 3rd generation partnership project long term evolution-advanced (3GPP LTE-A) system, as forwarding for link connection between the base station and the user equipment is introduced to the relay node, two types of links having different attributes are applied to each of uplink and downlink carrier frequency bands. A connection link portion established between links of the base station and the relay node will be defined as a backhaul link. Transmission of frequency division duplex (FDD) mode or time division duplex (TDD) mode based on downlink resources will be defined as a backhaul downlink, and transmission of frequency division duplex (FDD) mode or time division duplex (TDD) mode based on uplink resources will be defined as a backhaul uplink.

Figure 9:
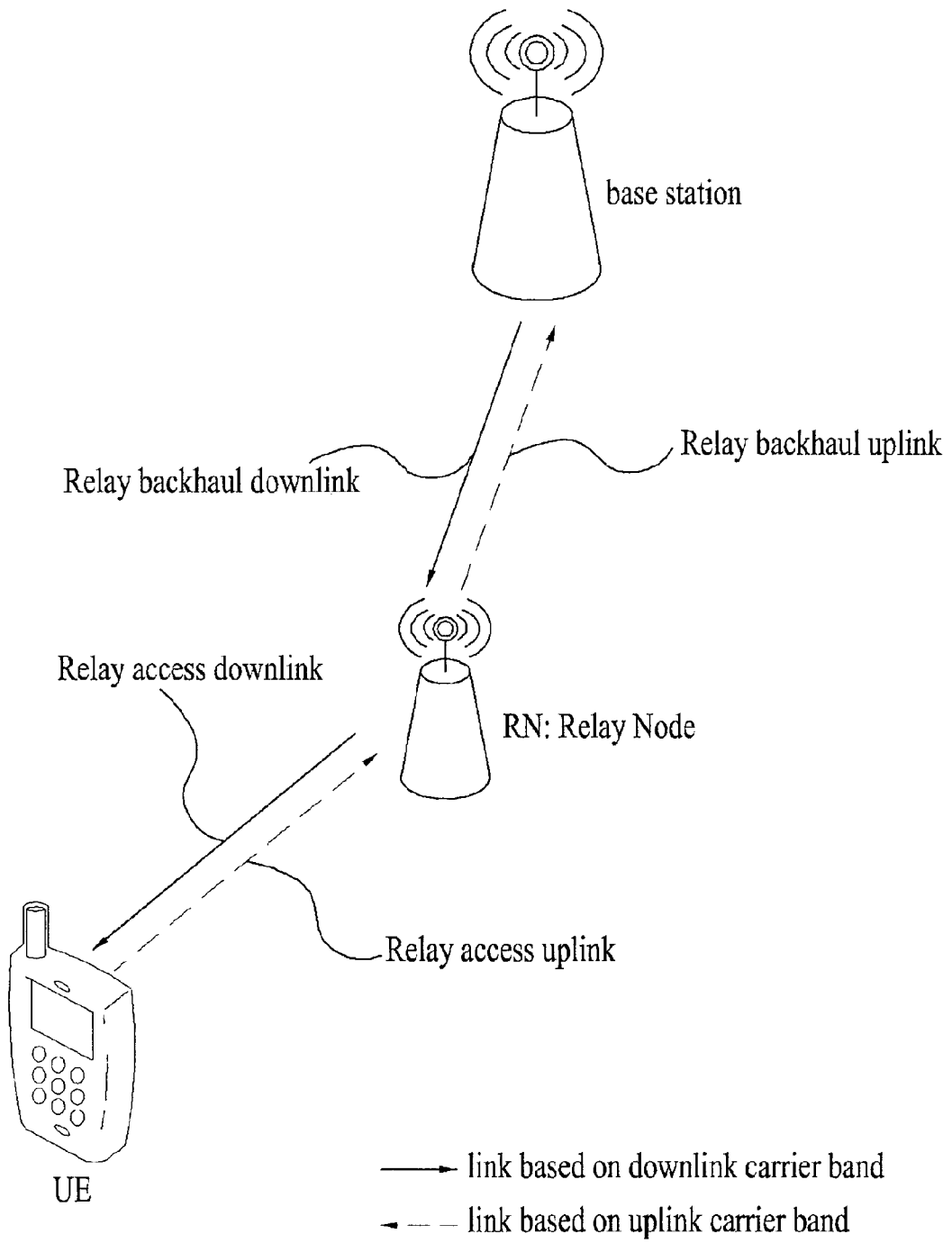
FIG. 9 is a diagram illustrating a configuration of a relay backhaul link and a relay access link in a wireless communication system.

FIG. 9 is a diagram illustrating a configuration of a relay backhaul link and a relay access link in a wireless communication system.

Referring to FIG. 9, as forwarding for link connection between the base station and the user equipment is introduced to the relay node, two types of links having different attributes are applied to each of uplink and downlink carrier frequency bands. A connection link portion established between the base station and the relay node will be defined as a backhaul link. If transmission of the backhaul link is performed using resources of downlink frequency band (in case of FDD) or resources of downlink subframe (in case of TDD), the backhaul link can be expressed as a backhaul downlink. If transmission of the backhaul link is performed using resources of uplink frequency band (in case of FDD) or resources of uplink subframe (in case of TDD), the backhaul link can be expressed as a backhaul uplink.

On the other hand, a connection link portion between the relay node and a series of user equipments will be defined as a relay access link. If transmission of the relay access link is performed using resources of downlink frequency band (in case of FDD) or resources of downlink subframe (in case of TDD), the relay access link can be expressed as an access downlink. If transmission of the relay access link is performed using resources of uplink frequency band (in case of FDD) or resources of uplink subframe (in case of TDD), the relay access link can be expressed as an access uplink.

The relay node (RN) can receive information from the base station through the relay backhaul downlink, and can transmit information to the base station through the relay backhaul uplink. Also, the relay node can transmit information to the user equipment through the relay access downlink, and can receive information from the user equipment through the relay access uplink.

Meanwhile, in respect of band (or spectrum) of the relay node, if the backhaul link is operated in the same frequency band as that of the access link, the operation will be referred to as 'in-band' operation. If the backhaul link is operated in the frequency band different from that of the access link, the operation will be referred to as 'out-band' operation. In both in-band and out-band, a user equipment (hereinafter, referred to as 'legacy user equipment') operated in accordance with the existing LTE system (for example, release-8) should access a donor cell.

The relay node can be classified into a transparent relay node and a non-transparent relay node depending on whether the user equipment recognizes the relay node. The transparent relay node means that it fails to recognize whether the user equipment performs communication with the network through the relay node. The non-transparent relay node means that it recognizes whether the user equipment performs communication with the network through the relay node.

In respect of control, the relay node can be classified into a relay node configured as a part of a donor cell and a relay node that controls a cell by itself.

Although the relay node configured as a part of a donor cell has relay node ID, it does not have its own cell identity. If at least a part of radio resource management (RRM) is controlled by a base station to which a donor cell belongs (even though the other parts of the RRM are located in the relay node), it will be referred to as a relay node configured as a part of the donor cell. Preferably, this relay node can support the legacy user equipment. For example, examples of this type relay node include smart repeaters, decode-and-forward relays, L2 (second layer) relay nodes, and type-2 relay node.

The relay node that controls a cell by itself controls one cell or several cells, and a unique physical layer cell identity is provided to each of cells controlled by the relay node. Also, the same RRM mechanism can be used for each of the cells. In view of the user equipment, there is no difference between access to a cell controlled by the relay node and access to a cell controlled by the base station. Preferably, the cell controlled by the relay node can support the legacy user equipment. For example, examples of this type relay node include a self-backhauling relay node, L3 (third layer) relay node, a type-1 relay node and a type-1a relay node.

The type-1 relay node is an in-band relay node and controls a plurality of cells, each of which is regarded as a separate cell differentiated from the donor cell in view of the user equipment. Also, the plurality of cells respectively have their physical cell ID (define din LTE release-8), and the relay node can transmit its synchronization channel, reference signal, etc. In case of single-cell operation, the user equipment directly receives scheduling information and HARQ feedback from the relay node and transmit its control channel (scheduling request (SR), CQI, ACK/NACK, etc.) to the relay node. Also, in view of the legacy user equipments (operated in accordance with the LTE release-8 system), the type-1 relay node is regarded as a legacy base station (operated in accordance with the LTE release-8 system). Namely, the type-1 relay node has backward compatibility. Meanwhile, in view of the user equipments operated in accordance with the LTE-A system, the type-1 relay node is regarded as a base station different from the legacy base station, whereby throughput improvement can be provided.

The type-1a relay node has the same features as those of the aforementioned type-1 relay node in addition to out-band operation. The type-1a relay node can be configured in such a manner that its operation is less affected or not affected by the operation of L1 (first layer) operation.

The type-2 relay node is an in-band relay node, and does not have separate physical cell ID, whereby a new cell is not formed. The type-2 relay node is transparent with respect to the legacy user equipment, and the legacy user equipment fails to recognize the type-2 relay node. Although the type-2 relay node can transmit the PDSCH, it does not transmit CRS and PDCCH.

Meanwhile, in order that the relay node is operated in accordance with in-band, some resources in time-frequency domains should be prepared for the backhaul link, and can be established so as not to be used for the access link. This will be referred to as resource partitioning.

The general principle in resource partitioning of the relay node will be described as follows. The backhaul link and the access downlink can be multiplexed on one carrier frequency in accordance with the TDM mode (namely, only one of the backhaul downlink or the access downlink is enabled for a specific time). Similarly, the backhaul uplink and the access uplink can be multiplexed on one carrier frequency in accordance with the TDM mode (namely, only one of the backhaul uplink or the access uplink is enabled for a specific time).

According to backhaul link multiplexing in the FDD mode, backhaul downlink transmission is performed in a downlink frequency band and backhaul uplink transmission is performed in an uplink frequency band. According to backhaul link multiplexing in the TDD mode, backhaul downlink transmission is performed in a downlink subframe of the base station and the relay node and backhaul uplink transmission is performed in an uplink subframe of the base station and the relay node.

In case of the in-band relay node, if backhaul downlink reception from the base station and access downlink transmission to the user equipment are performed in a predetermined frequency band at the same time, a signal transmitted from a transmitter of the relay node, can be received in a receiver of the relay node, whereby signal interference or RF jamming may occur in RF front-end of the relay node. Similarly, if access uplink reception from the user equipment and backhaul uplink transmission to the base station are performed in a predetermined frequency band at the same time, signal interference may occur in RF front-end of the relay node. Accordingly, it is difficult to perform simultaneous transmission and reception in one frequency band of the relay band unless sufficient separation (for example, a transmitting antenna and a receiving antenna are locally spaced apart from each other (for example, the transmitting antenna is installed on the ground and the receiving antenna is installed below the ground)) between the receiving signal and the transmitting signal is provided.

One solution for solving the problem of signal interference is that the relay node is operated so as not to transmit a signal to the user equipment when receiving a signal from a donor cell. In other words, a gap occurs in transmission from the relay node to the user equipment, and the user equipment (including legacy user equipment) can be configured so as not to expect any transmission from the relay node for the gap. The gap can be configured by a multicast broadcast single frequency network (MBSFN) subframe.

Figure 10:
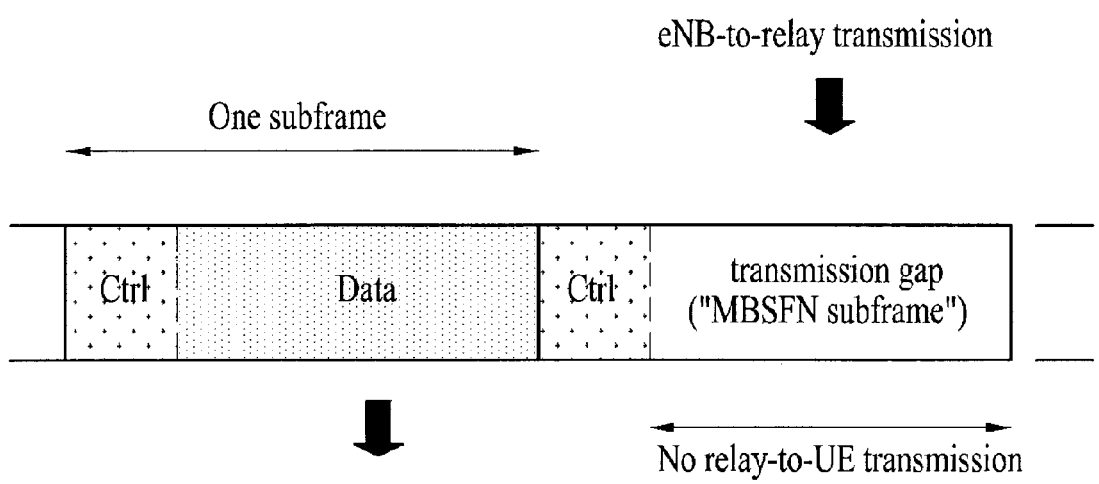
FIG. 10 is a diagram illustrating an example of resource partitioning of a relay node.

FIG. 10 is a diagram illustrating an example of resource partitioning of a relay node.

In FIG. 10, the first subframe is a general subframe, and a downlink (i.e., access downlink) control signal and data are transmitted from the relay node to the user equipment. The second subframe is an MBSFN subframe, and a control signal is transmitted from the relay node to the user equipment in a control region of a downlink subframe but no signal is transmitted from the relay node to the user equipment in other regions of the downlink subframe. Since the legacy user equipment expects transmission of a physical downlink control channel (PDCCH) from all downlink subframes (namely, since the relay node needs to support legacy user equipments in its zone to receive a PDCCH per subframe and perform a measurement function), for normal operation of the legacy user equipment, all downlink subframes need to transmit the PDCCH. Accordingly, even on a subframe (second subframe 1020) configured for downlink (i.e., backhaul downlink) transmission from the base station to the relay node, the relay node needs to perform access downlink transmission not backhaul downlink reception, for first N (N=1, 2 or 3) OFDM symbol intervals of the subframe. Since the PDCCH is transmitted from the relay node to the user equipment, backward compatibility for the legacy user equipment, which is served by the relay node, can be provided in the control region of the second subframe. The relay node can receive transmission from the base station in the other regions of the second subframe for the time when no transmission from the relay node to the user equipment is performed. Accordingly, through this resource partitioning, access downlink transmission and backhaul downlink reception cannot be performed at the same time in the in-band relay node.

The second subframe which is the MBSFN subframe will be described in more detail. The control region of the second subframe may be regarded as a relay node non-hearing interval. The relay node non-hearing interval means that the relay node does not receive a backhaul downlink signal but transmits an access downlink signal. This interval can be set to 1, 2, or 3 OFDM length as described above. For the relay node non-hearing interval, the relay node performs access downlink transmission to the user equipment, and receives backhaul downlink from the base station in the other regions. At this time, since the relay node cannot perform transmission and reception in the same frequency band at the same time, it requires time to switch a transmission mode of the relay node to a reception mode of the relay node. Accordingly, a guard time (GT) is required for first some interval of a backhaul downlink receiving zone, so that the relay node performs transmission/reception mode switching. Similarly, even in the case that the relay node is operated to receive a backhaul downlink from the base station and transmit an access downlink to the user equipment, a guard time (GT) for reception/transmission mode switching of the relay node can be set. The length of the guard time may be given by a value of a time domain. For example, the length of the guard time may be given by k (k≥1) time sample (Ts) values, or one or more OFDM symbol lengths. Also, the guard time of the last portion of the subframe may not be defined or set either if backhaul downlink subframes of the relay node are set continuously or depending on timing alignment of predetermined subframes. The guard time can be defined in a frequency domain only set for backhaul downlink subframe transmission, to maintain backward compatibility (if the guard time is set in the access downlink interval, the legacy user equipment cannot be supported). For the backhaul downlink reception interval except for the guard time, the relay node can receive the PDCCH and the PDSCH from the base station. The PDCCH and the PDSCH may be referred to as a relay-PDCCH (R-PDCCH) and a relay-PDSCH (R-PDSCH) in view of physical channels dedicated for the relay node.

A basic unit configuring R-PDCCH and interleaving several R-PDCCHs is R-REG. Although REG includes four REs in the LTE system, R-REG of backhaul downlink for the relay node can be configured in the same manner as or differently from the REG.

FIG. 11(a) is a diagram illustrating a reference signal pattern in a 3GPP release 8 system, and FIG. 11(b) is a diagram illustrating a reference signal pattern in a 3GPP release 9 system or 3GPP release 10 system.

Referring to FIG. 11(a), CRS exists for each of antenna ports 0, 1, 2, and 3. The number of REs allocated to CRS for the antenna ports 0 and 1 is different from the number of REs allocated to CRS for the antenna ports 2 and 3. In particular, many REs allocated to CRS exist in OFDM symbol indexes #0 and #1 that can be used as backhaul resources.

Although FIG. 11(b) additionally illustrates DM-RS and illustrates that symbol indexes #0 to #2 cannot be used for backhaul data transmission, the number of symbols that cannot be used can be varied.

Figure 12:
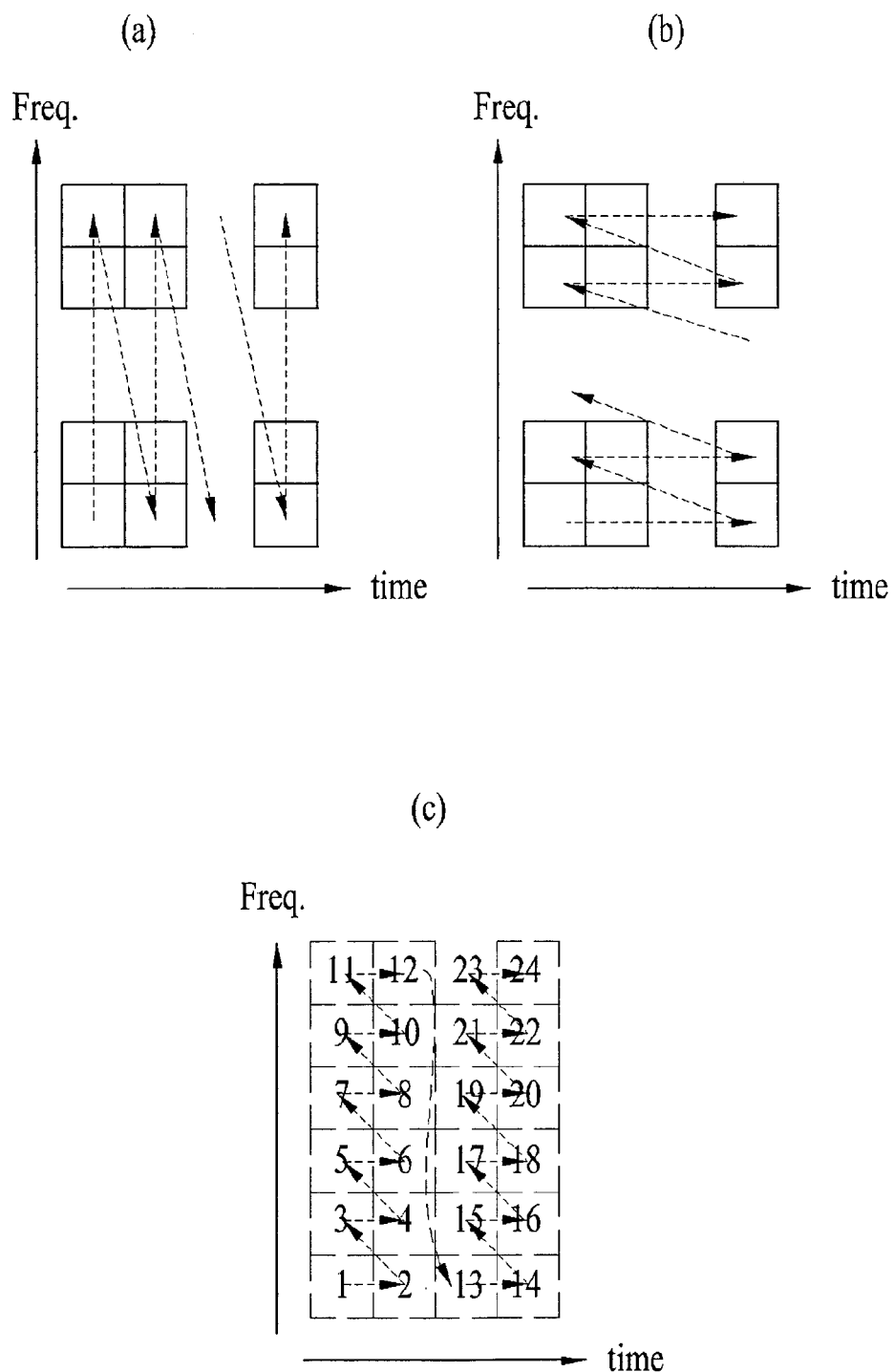
FIG. 12 is a diagram illustrating the order of general REG indexing.

FIG. 12 is a diagram illustrating the order of general REG indexing.

Referring to FIG. 12, it is general that REG indexing is performed in accordance with a time-first mode as shown in (a) or a frequency-first mode as shown in (b). As a modification example, a hybrid method may be considered, in which a specific number of symbols are grouped and then indexing is performed for the grouped symbols in accordance with a time-first mode or a frequency-first mode.

Figure 13A:
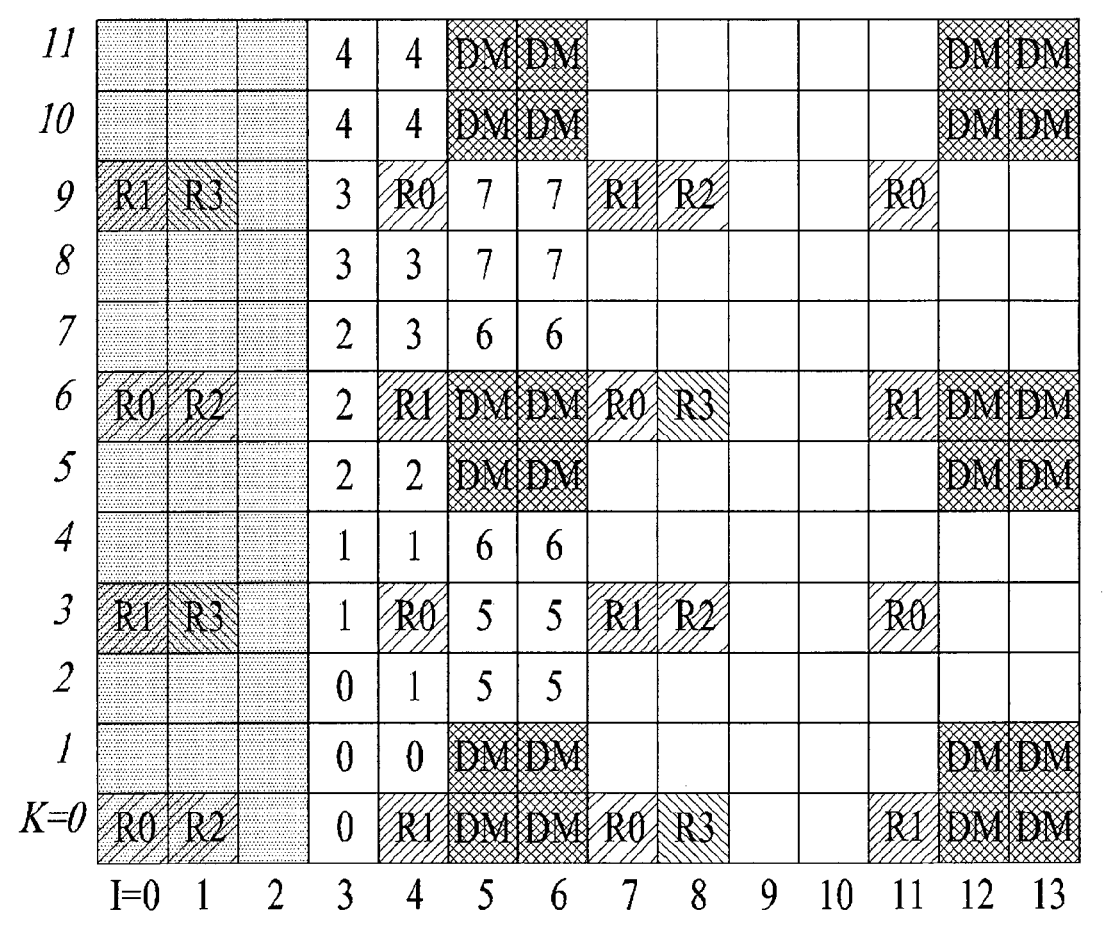
Figure 13E:
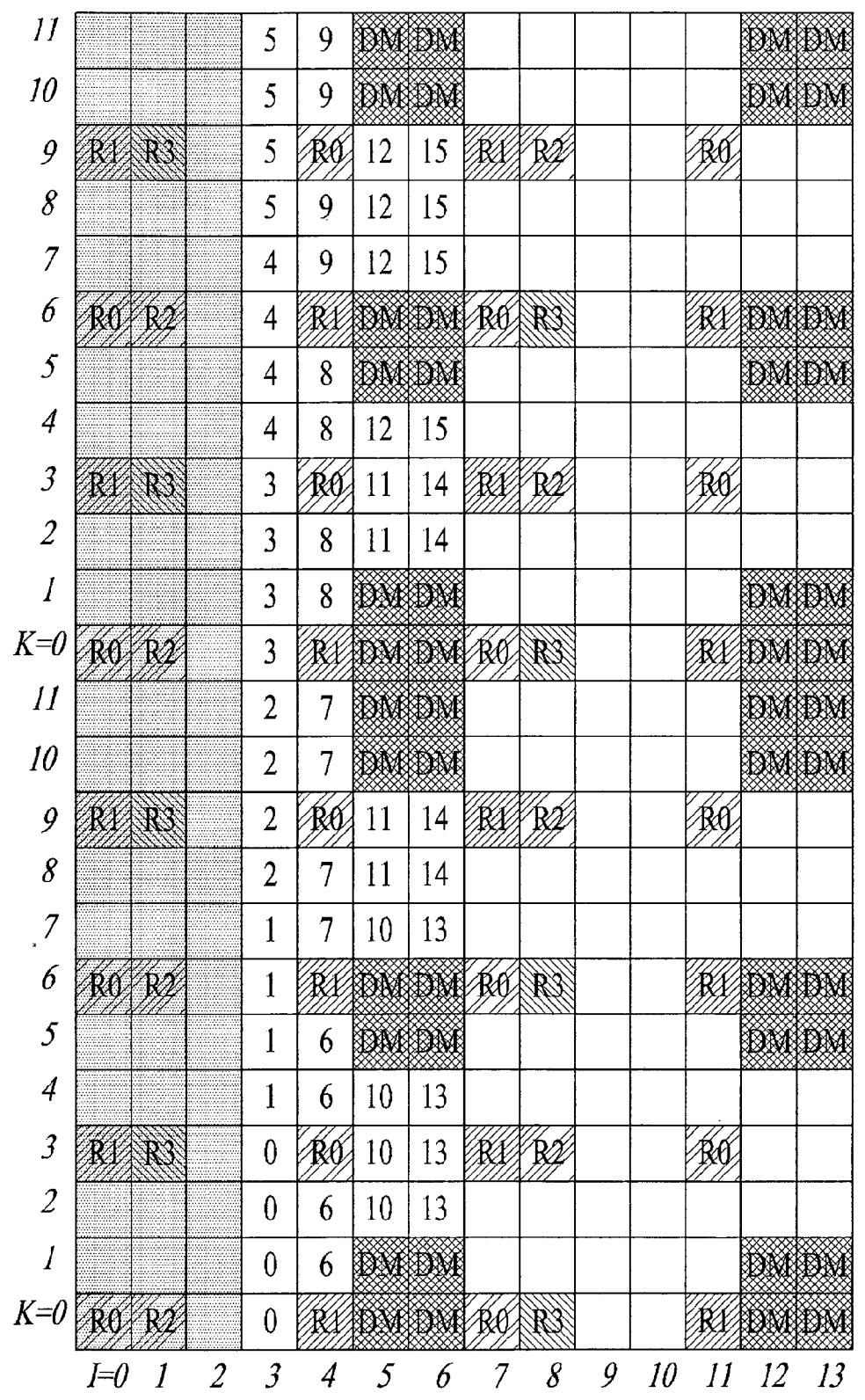

FIG. 13 is a diagram illustrating an example of R-REG indexing for R-PDCCH in accordance with the embodiment of the present invention.

In (a) of FIG. 13, both CRS and DM-RS exist, and one R-REG includes four REs. In (a) of FIG. 13, symbol indexes 3 and 4 are grouped into one, and symbol indexes 5 and 6 are grouped into one, whereby indexing is performed in the grouped indexes. In this case, symbols for a backhaul channel are usable from the symbol of the index no. 3. If usable symbol indexes are variable, symbol index to start indexing can also be varied. R-REG index is defined in such a manner that empty REs except for RS are included in R-REG group. Accordingly, pattern, location and index of R-REG may be varied depending on the number of arranged RSs. The same rule may be applied to the second slot to perform R-REG indexing. In the second symbol group (l=5, 6), indexing may be performed in the order from the higher value of k to the smaller value of k.

Although (b) of FIG. 13 illustrates that R-REG is defined in the first slot of the backhaul subframe in a unit of four REs and R-REG indexing is performed, some ports of the DM-RS are not allocated. (b) of FIG. 13 is characterized in that two unoccupied REs exist. In (b) of FIG. 13, the unoccupied REs are located at (l,k)=(5,10), (6,10). In this case, it is advantageous in that the distance between the respective four REs in R-REG can be minimized.

In (c) and (d) of FIG. 13, pairing is performed for two REs belonging to one R-REG. Namely, paring in a diagonal direction is excluded. For example, although RE located at (4, 2) in (b) of FIG. 13 belongs to R-REG#1, it belongs to R-REG#0 in (c) and (d) of FIG. 13. In this case, it is more advantageous for transmission diversity in a unit of 2 REs. In particular, (d) of FIG. 13 illustrates a small number of REs for DM-RS. In this case, the remaining 2 REs may be grouped together with neighboring RBs to configure one R-REG. If odd RBs are used or R-REG in a unit of 2 RBs is not configured, 2 REs may be used as the last index or may not be used. If the 2 REs are set to the last index, they can be used to transmit information carried in previous R-REG once again.

(e) of FIG. 13 illustrates that R-REG indexing is performed in a symbol unit in accordance with a frequency-first mode, and (f) of FIG. 13 illustrates that R-REG indexing is performed for symbols l=3,4 in accordance with a frequency-first mode and performed for symbols l=5,6, where many DM-RSs exist, in accordance with a time-first mode. Referring to (e) and (f) of FIG. 13, it is noted that R-REG can be configured more advantageously when indexing is performed in a unit of 2 RBs.

Figure 14:
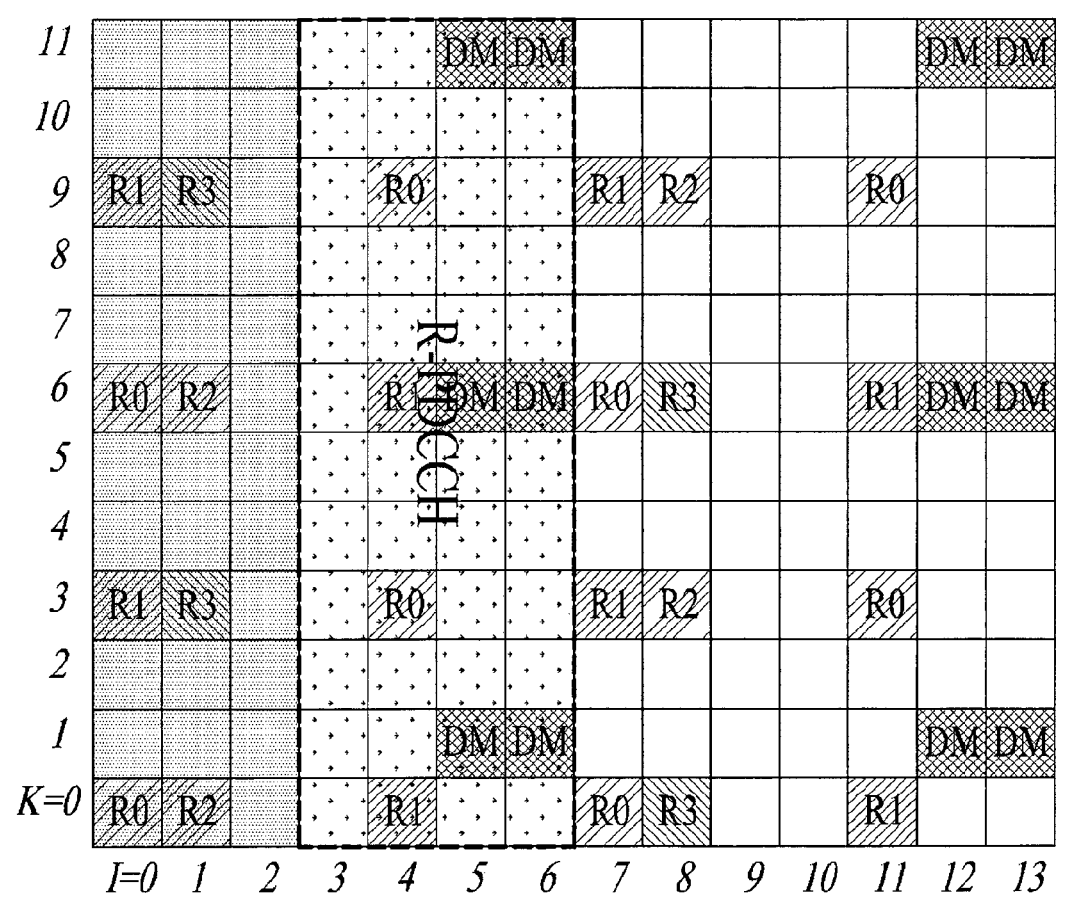

FIG. 14 is a diagram the embodiment of the present invention.

Referring to FIG. 14, it is noted that RSs existing in regions marked with dots are CRSs only for the antenna ports #0 and #1. If the R-PDCCH exists in the regions only and demodulation should be performed depending on CRSs, it is suggested that demodulation is performed for R-PDCCH using the CRSs only for the antenna ports #0 and #1. Namely, it is suggested that R-PDCCH decoding using antenna ports 0 and 1 only is performed. In this way, decoding latency can be reduced.

In this case, in a state that four CRS antenna ports are used, the following two methods limited to use CRS ports #0 and #1 only can be considered. The first method is that a transport format based on two CRS ports is used for R-PDCCH transmission, and means that a specific physical channel R-PDCCH uses a transport format to which the number of antenna ports different from those of a cell-specific physical channel is applied. The second method is that the base station uses a transport format based on four CRS ports for R-PDCCH transmission and a null signal is transmitted from CRS ports #2 and #3. The base station can notify the relay node through an upper layer signal that it uses the aforementioned transport format. The relay node decodes the R-PDCCH signal on the assumption that no signal is transmitted from the CRS ports #2 and #3.

Meanwhile, in order to perform space-frequency block coding (SFBC) scheme, R-REG should be configured by REs within one symbol if possible. The number of REs included in one R-REG can be varied depending on 2TX SFBC or 4TX SFBC.

Figure 15A:
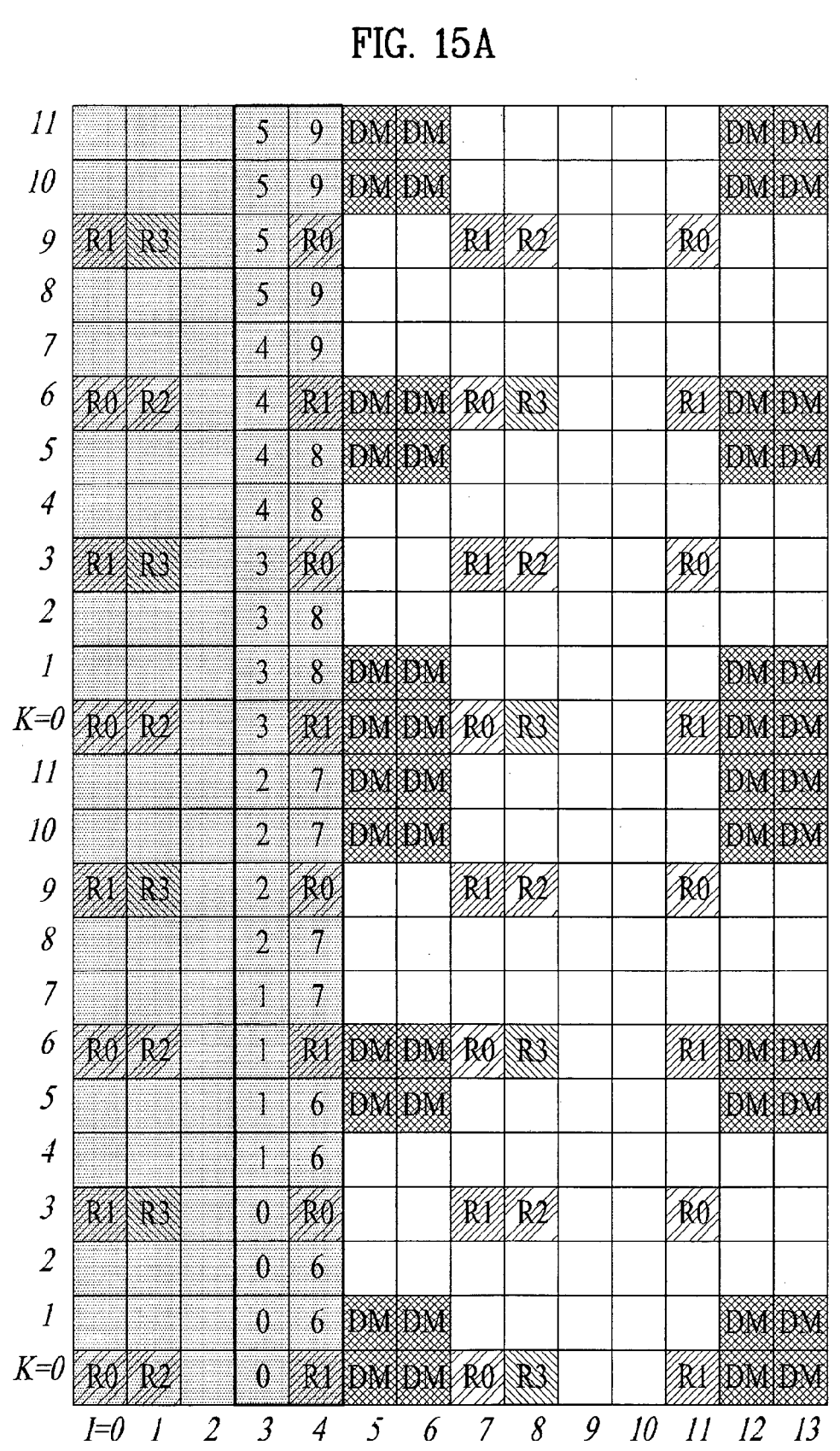
Figure 15B:
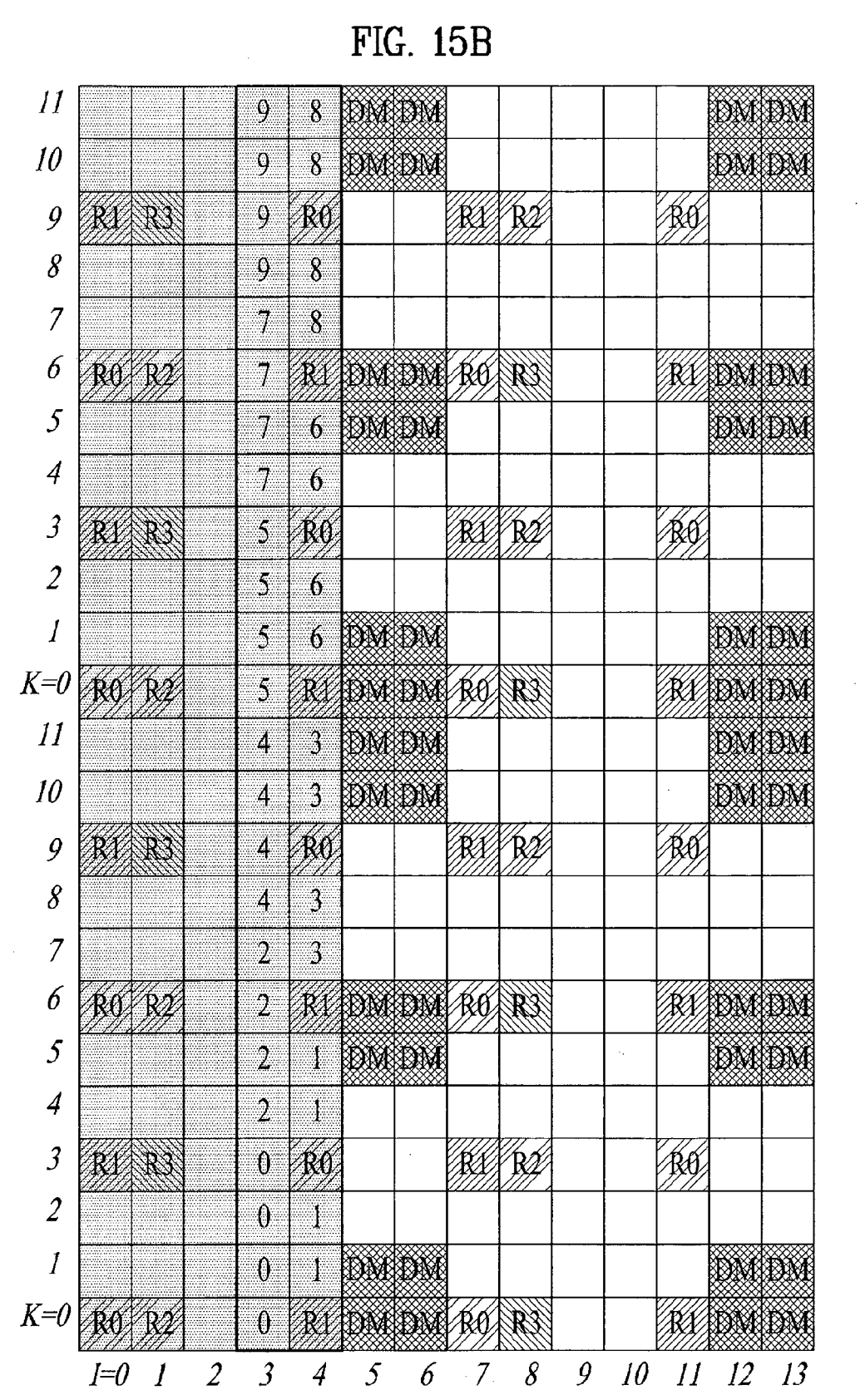

FIG. 15 is a diagram illustrating an example of R-PDCCH transmission for application of 4TX SFBC. In particular, FIG. 15 illustrates that symbol indexes l=3 and 4 are only used for R-PDCCH transmission to apply 4TX SFBC. (a) of FIG. 15 illustrates a frequency-first mode and (b) of FIG. 15 illustrates a time-first mode.

In particular, since the number of R-REGs in one RB is 5, a plurality of RBs are preferably grouped to transmit the R-PDCCH. For example, if ten R-REGs are used as a basic unit for R-PDCCH transmission, it is preferable that two RBs are allocated. Of course, in case of the backhaul channel, R-PDCCH transmission based on five R-REGs only can be performed.

Figure 16A:
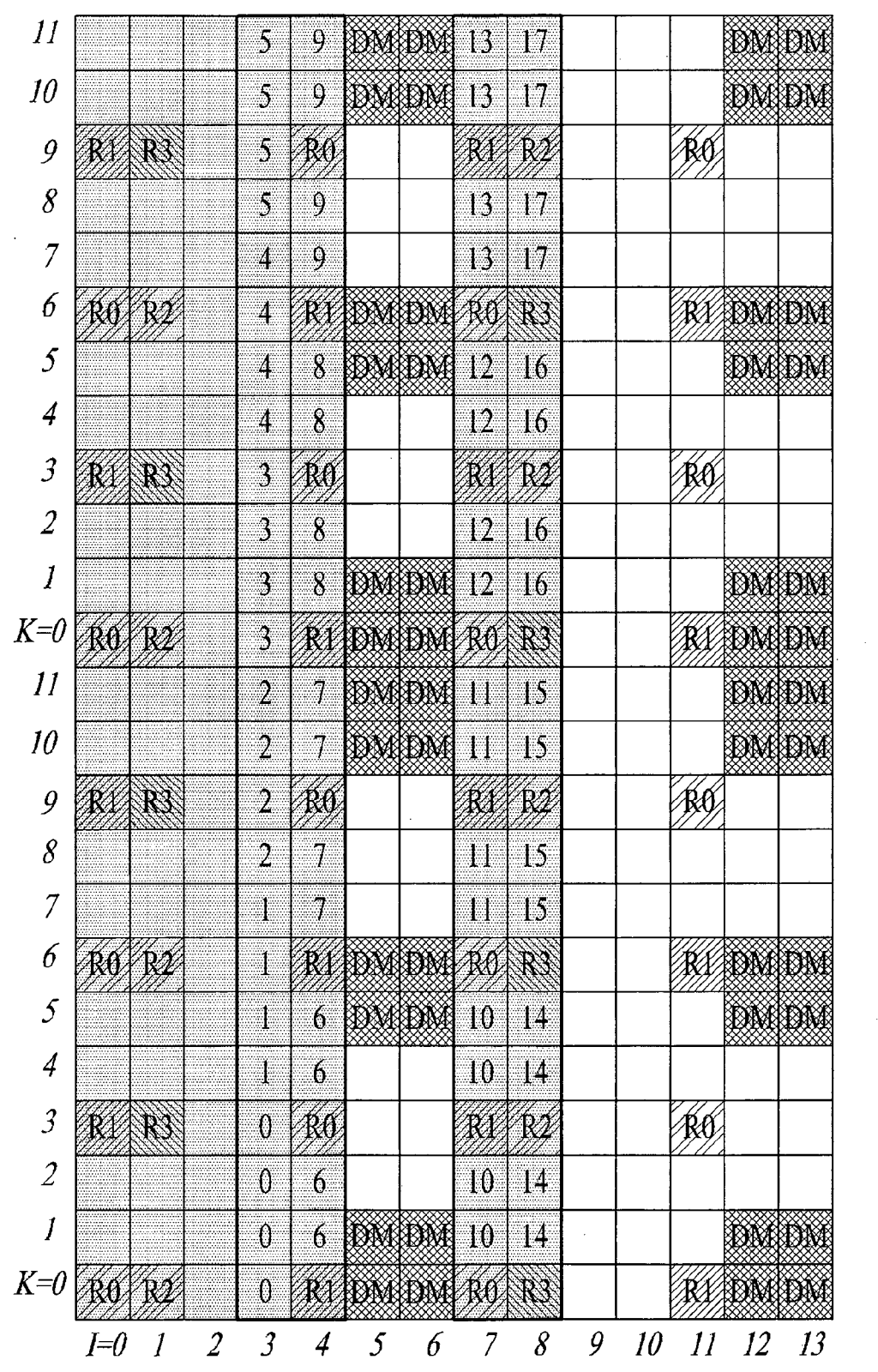
Figure 16B:
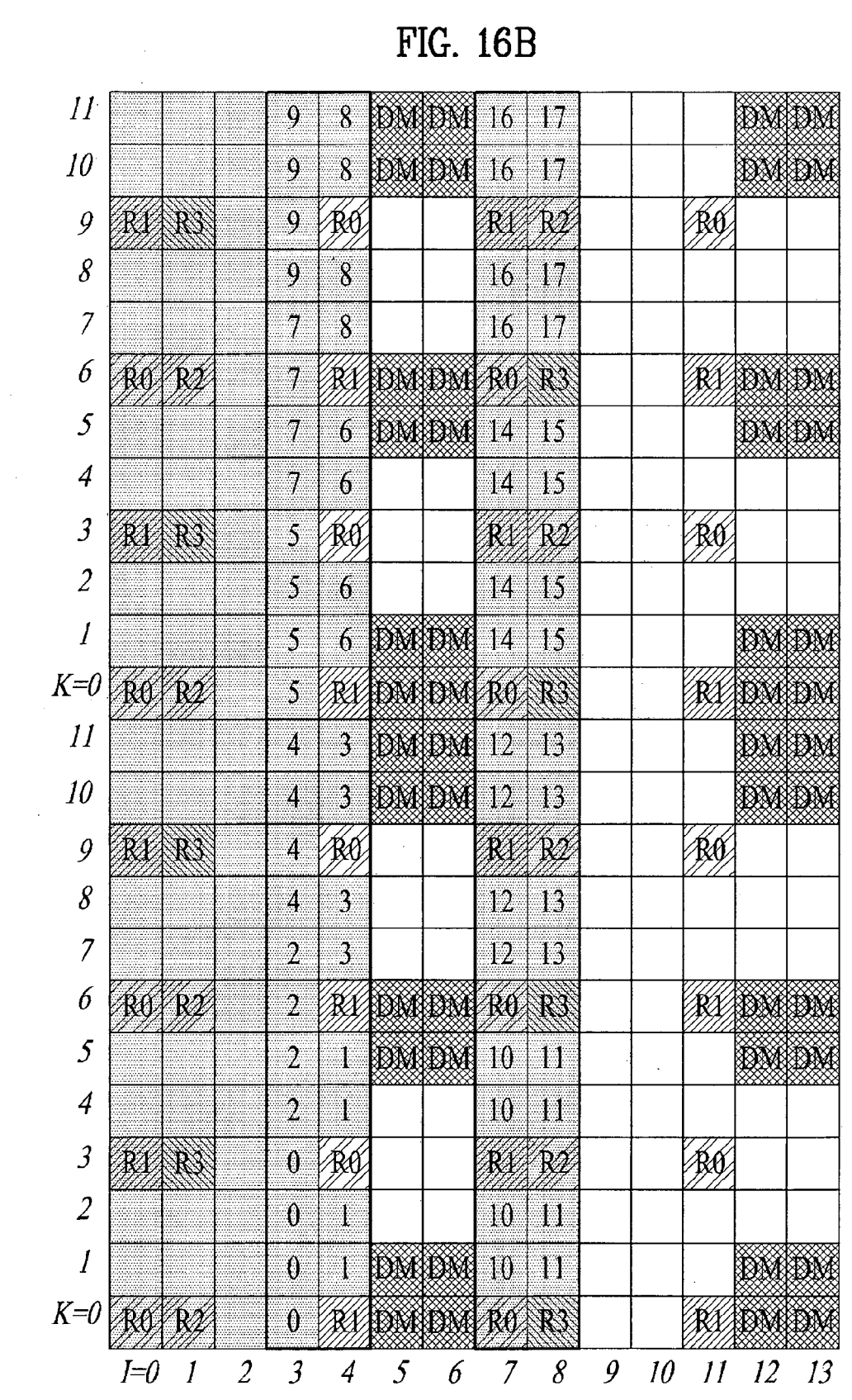

FIG. 16 is a diagram illustrating another example of R-PDCCH transmission for application of 4TX SFBC. In particular, FIG. 16 illustrates a method used for R-PDCCH transmission by selecting two symbols from a first symbol and two symbols from a second symbol (l=3, 4, 7, 8) as one of methods for solving a problem that R-REG patterns and the number of R-REGs are varied depending on the presence of DM-RS. Also, (a) of FIG. 16 illustrates a frequency-first mode and (b) of FIG. 16 illustrates a time-first mode.

In particular, since the number of R-REGs is 18, two CCEs are obtained in a unit of CCE of the existing LTE system, whereby resources wasted as R-REG group is not configured during R-PDCCH allocation can be minimized. Also, since one RB forms nine R-REGs, i.e., one CCE, the same sized CCE as that of the existing LTE can be maintained.

Figure 17A:
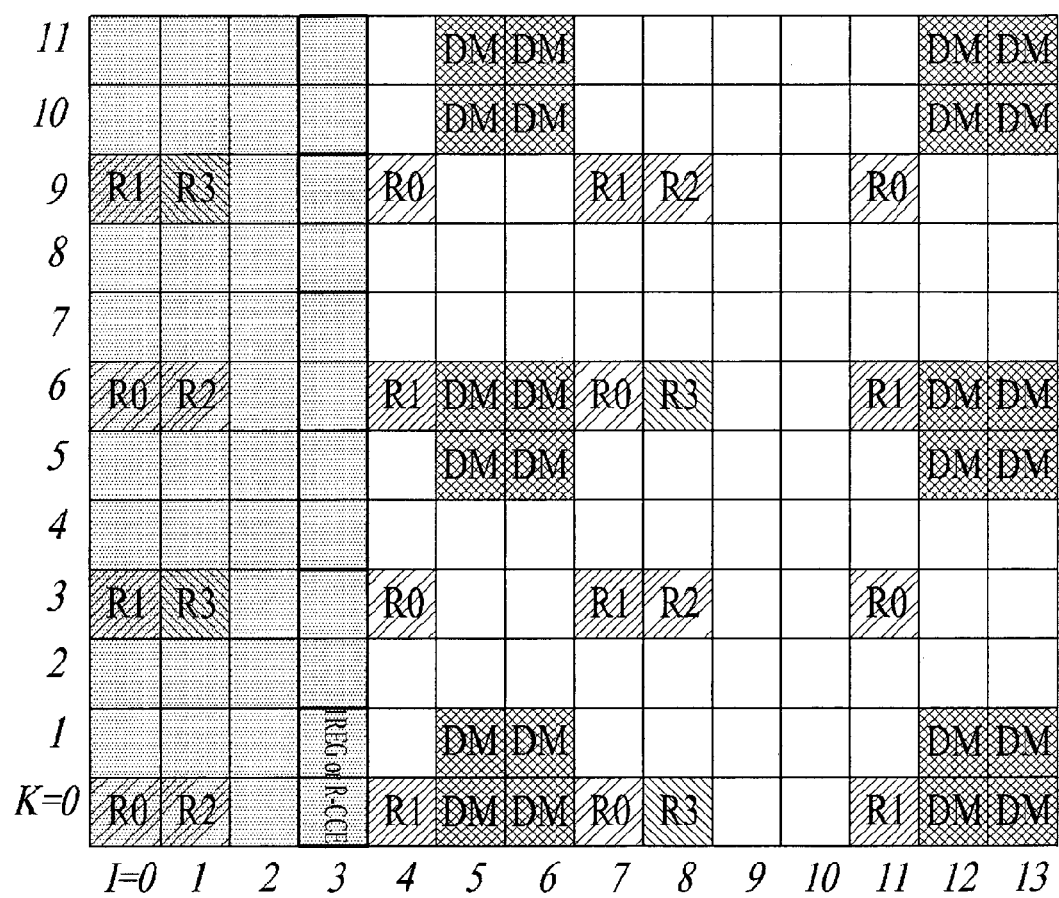
FIG. 17 is a diagram illustrating a configuration of R-REG or R-CCE.
Figure 17B:
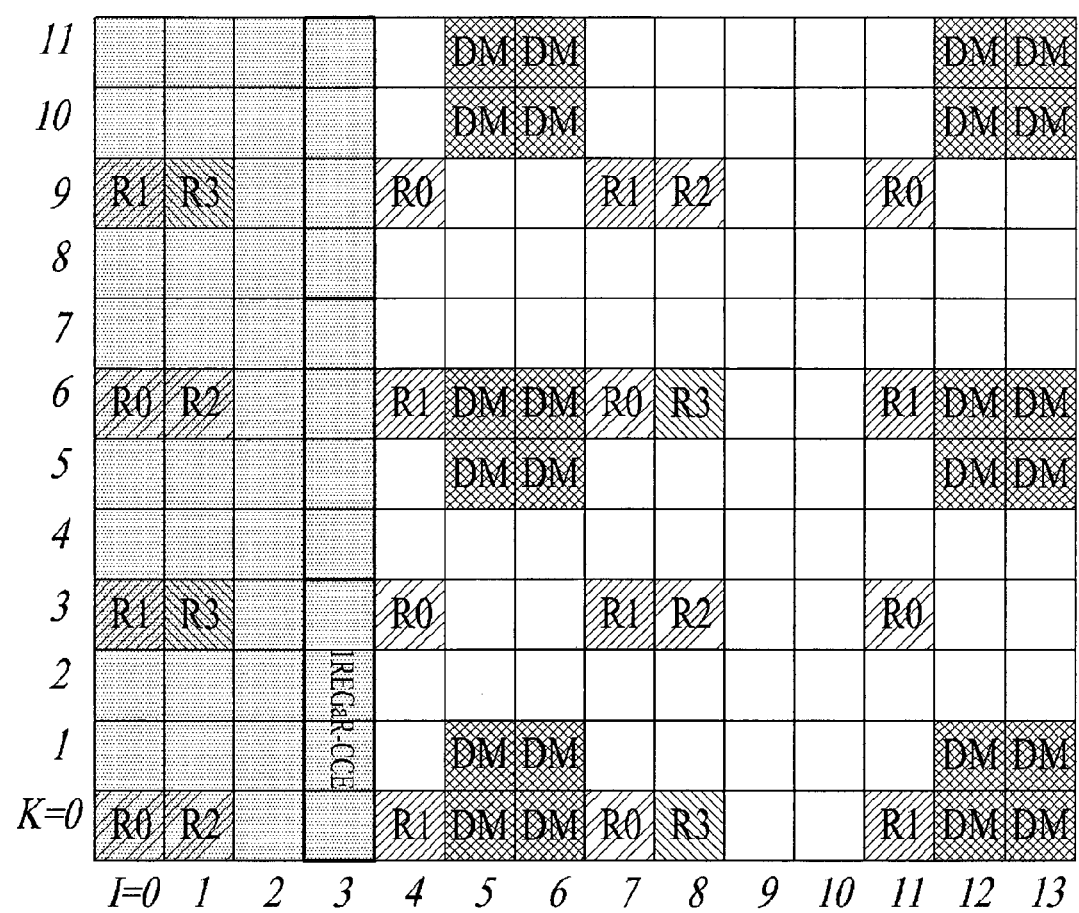

FIG. 17 is a diagram illustrating a configuration of R-REG or R-CCE. In particular, (a) of FIG. 17 illustrates that the number of REs included in one R-REG or R-CCE is 2, and (b) of FIG. 17 illustrates that the number of REs included in one R-REG or R-CCE is 4.

In general, R-REG configuration is intended for application of the technology of resource allocation in a unit of RE pairs (for example, 2 REs, 4 REs, and 8 REs) such as SFBC. When this technology is applied, if any one of REs is damaged (for example, location repetition with CSI-RS transmitted from a serving cell or location repetition with RE punctured by the serving cell to receive CSI-RS transmitted from a neighboring cell), it affects R-REG. If REs to which a signal such as CSI-RS is transmitted are located over several R-REGs, it affects all R-REGs to which corresponding REs belong (see conventional configuration of FIG. 18). In order to solve this problem, it is preferable that REG configuration is considered when location/pattern of CSR-RS is designed.

First of all, it is suggested that RE occupied by CSI-RS transmitted from one cell is designed to become RE existing in the same R-REG (or the same R-CCE). For example, if one cell uses four REs to transmit CSI-RS of four ports and one R-REG is configured by four REs as illustrated in (b) of FIG. 17, CSI-RS transmission pattern is determined such that the REs for transmission of CSI-RS become REs existing in one R-REG. This will be described in more detail with reference to the drawing.

FIG. 18 is a diagram illustrating a configuration of R-REG or R-CCE according to the embodiment of the present invention. In particular, in FIG. 18, a channel status information reference signal (CSI-RS) exists for configuration of R-REG or R-CCE. For convenience of description, the conventional configuration and the proposal configuration are illustrated in one drawing.

Even in the case that the serving cell performs puncturing for REs corresponding to CSI-RS of a neighboring cell to receive the CSI-RS of the neighboring cell, the punctured REs are designed to become REs existing in the same R-REG. Also, it is suggested that multi-cell CSI-RS sets (for example, each CSI-RS received from cell 1, cell 2 and cell 3) transmitted from several cells to support inter-cell cooperative communication such as CoMP exist in the same R-REG (or the same R-CCE) (see "proposal" of FIG. 18). In this case, if CSI-RS transmission from specific REs or puncturing according to CSI-RS transmission is performed, damage of a plurality of R-REGs can be minimized.

It is also suggested that CSI-RS transmission is performed when RE to which R-PDCCH is transmitted collides with CSI-RS. In other words, instead of the R-PDCCH, the CSI-RS is transmitted. Also, even in the case that the serving cell performs puncturing for RE to which CSI-RS of the neighboring cell is transmitted, puncturing is performed for RE used for R-PDCCH transmission. This puncturing can be performed by a previously defined rule or signaling. The receiver is notified whether the CSI-RS has been transmitted, whereby channel estimation performance can be improved.

Also, the relay node recognizes, through an upper layer signal, that the CSI-RS not the R-PDCCH is transmitted to RE of a specific R-REG, and excludes the corresponding RE from R-PDCCH decoding.

Meanwhile, since the CSI-RS is not transmitted per subframe but transmitted at a period of five subframes or another period more than five subframes depending on the channel status, all subframes are divided into subframes to which the CSI-RS is transmitted and subframes to which the CSI-RS is not transmitted. In this case, it is suggested that R-PDCCH REG configuration is varied considering the presence of the CSI-RS, or the R-PDCCH is not transmitted to the location of the CSI-RS. In other words, at the subframe set to transmit the CSI-RS, a skipping method (R-PDCCH REG level late matching) when R-PDCCH mapping is performed for R-REG repeated with the location of CSI-RS RE, which includes muted RE (RE punctured for CSI-RS of neighboring cell), or CSI-RS REG (a group of REs configured by 2, 4 and 8 ports), or a method for skipping corresponding R-REG indexing (R-PDCCH REG level puncturing) can be considered. In this case, it is to be understood that muting indicates that transmission power for transmitting corresponding RE is 0. The aforementioned operation may be performed based on the CSI-RS transmission period or through separate dedicated signaling.

FIG. 19 is a diagram illustrating an example of a configuration and indexing of R-REG according to the embodiment of the present invention. In particular, FIG. 19 illustrates that DM-RS and CRS exist when the number of antenna ports for CRS is 4 and that only CRS exists when the number of antenna ports for CRS is 4. Also, FIG. 19 illustrates that the number of REs constituting one R-REG is 4 and that the number of REs constituting one R-REG is or 2.

In (a) of FIG. 19, the number of REs constituting one R-REG is 4, and both DM-RS and CRS exist. In particular, in (a) of FIG. 19, R-REG #7 of the first slot and R-REG #14 of the second slot are configured over two symbols due to the location of the DM-RS, and REs located discontinuously constitute one R-REG in case of R-REGs #2 and #3 and R-REGs #5 and #6. Also, in (b) of FIG. 19, the number of REs constituting one R-REG is 2 and only CRS exists.

In (c) of FIG. 19, the number of REs constituting one R-REG is 2, and both DM-RS and CRS exist. In particular, in (c) of FIG. 19, R-REGs (R-REGs #7, #13, #14, and #27) configured over two symbols exist to avoid that REs located discontinuously due to the location of the DM-RS constitute one R-REG. Also, in (d) of FIG. 19, the number of REs constituting one R-REG is 2 and only CRS exists.

In (e) to (g) of FIG. 19, it is assumed that DM-RSs of four ports are all considered at the first slot whereas DM-RSs of two ports or less are used at the second slot. If one R-REG is configured by four REs as illustrated in (e) and (f) of FIG. 19, two REs remain at the second slot without belonging to R-REG.

FIG. 20 is a diagram illustrating another example of configuration and indexing of R-REG according to the embodiment of the present invention. In particular, FIG. 20 illustrates that DM-RS and CRS exist when the number of antenna ports for CRS is 1 and that only CRS exists when the number of antenna ports for CRS is 2. Also, FIG. 20 illustrates that the number of REs constituting one R-REG is 4 and that the number of REs constituting one R-REG is or 2.

Figure 21A:
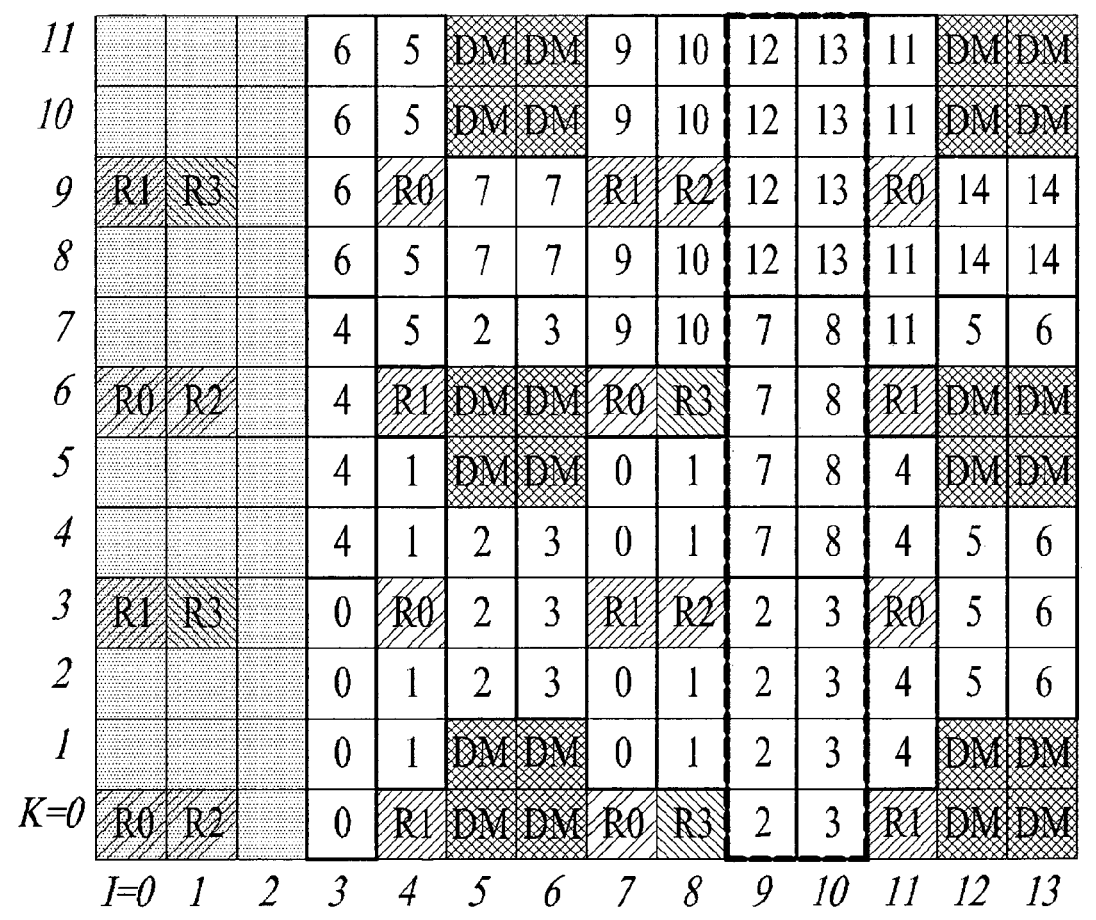

FIG. 21 is a diagram illustrating still another example of a configuration and indexing of R-REG according to the embodiment of the present invention. In particular, FIG. 21 illustrates a method for fixing dedicated OFDM symbols for CSI-RS transmission.

In (a) and (b) of FIG. 21, CSI-RS received by the relay node does not exist at the first slot. Since the number of available REs existing at the first slot is smaller than that at the second slot, if CSI-RS is arranged at the first slot, it means that the number of REs, which can be used for transmission of control information (i.e., R-PDCCH) transmitted to the first slot, is relatively reduced. Accordingly, it is suggested that the CSI-RS received by the relay node is always located at the second slot.

In particular, in case of normal CP, the ninth and tenth symbols are preferably fixed as dedicated OFDM symbols for CSI-RS transmission. In case of extended CP, the eighth symbol is preferably fixed as the dedicated OFDM symbol for CSI-RS transmission. This is because that no RS exists at the corresponding OFDM symbols, and it is preferable for arrangement of the symbols considering the number of ports for CSI-RS. In particular, the symbol used as CSI-RS even at the subframe where CSI-RS does not exist may be operated so as not to be used for R-PDCCH transmission. On the other hand, data transmitted to the relay node may use RE other than RE used by the CSI-RS even at the symbol used as the CSI-RS. In other words, a data channel performs nulling or rate matching for CSI-RS RE. In this case, it is advantageous in that the number of available REs for R-PDCCH can be maintained at the second slot uniformly if possible. It is also advantageous in that the number of available REs of the first slot can be matched with the number of available REs of the second slot. Accordingly, if a downlink grant is transmitted to the first slot and an uplink grant is transmitted to the second slot, since the number of REs occupied by the downlink grant is similar to that occupied by the uplink grant, the first slot can maintain a coding rate and cell coverage similar to those of the second slot at the channel status similar to that of the second slot.

As another method, it is considered that OFDM symbols for CSI-RS are limited to the subframe where the CSI-RS exists, as illustrated in FIG. 21, but the corresponding OFDM symbols are used for another purpose of use other than CSI-RS transmission at the subframe where the CSI-RS does not exist.

These OFDM symbols dedicated for CSI-RS are very useful for R-REG configuration and downlink control information (DCI) configuration. In (a) of FIG. 21, R-REG indexes of OFDM symbols dedicated for CSI-RS are #2, #3, #7, #8, #12, and #18. It is noted that boundaries of all R-REGs within the symbols #9 and #10 are correctly matched with the corresponding symbols. Accordingly, if resource mapping is performed in a unit of R-REG, mapping of R-REG unit can be performed even without the symbols #9 and #10. In particular, if the symbols #9 and #10 are used as OFDM symbols dedicated for CSI-RS, R-REG indexing may not be performed for the symbols #9 and #10.

However, in case of the second method that may use corresponding symbols depending on the presence of the CSI-RS at the subframe, the following design can be made. In other words, if the CSI-RS does not exist, normal R-REG indexing is performed including the symbols #9 and #10. If the CSI-RS exists, R-REG indexing is performed except for the symbols #9 and #10. Namely, two types of R-REG indexing methods are defined and automatically varied depending on CSI-RS transmission. Since the relay node knows a subframe where the CSI-RS exists, it can know when demapping and demodulation should be performed based on which R-REG indexing method. In this case, the proposal method can be used without separate signaling.

In (c) of FIG. 21, CSI-RS ports of a plurality of cells exist in one R-REG. In this case, arrangement of the CSI-RS ports may be varied depending on how many reuse factors exist. If four cells are cooperative with one another, one R-REG (=4 REs) includes CSI-RSs of four antenna ports corresponding to four cells.

In particular, if mapping is performed in a unit of R-REG, R-REG indexing performed on the assumption that OFDM symbol to which CSI-RS is allocated does not exist as illustrated in (d) of FIG. 21, and REG indexing corresponding to OFDM symbol to which CSI-RS is allocated as illustrated in (e) of FIG. 21 may be considered. In the REG indexing, considering the OFDM symbols to which the CSI-RS is allocated, the corresponding symbols may be skipped during data mapping. This mapping method may be performed even in a unit of R-REG level.

FIG. 22 is a diagram illustrating an example of a position of OFDM symbols for CSI-RS in case of extended CP and R-REG indexing considering the position of OFDM symbols. In particular, (a) of FIG. 22 illustrates that both DM-RS and CRS exist and (b) of FIG. 22 illustrates that only CRS exists. In FIG. 22, even though the eighth symbol is fixed as the symbol for CSI-RS, R-REG indexing is performed for the corresponding symbol but R-PDCCH or R-PDSCH is not mapped into the corresponding symbol. However, in case of the subframe for transmitting the symbol for CSI-RS, REG of the corresponding symbol may be skipped during R-REG indexing.

FIG. 23 is a diagram illustrating further still another example of a configuration and indexing of R-REG according to the embodiment of the present invention. FIG. 23 illustrates that OFDM symbols dedicated for CSI-RS transmission are fixed. In particular, (a) of FIG. 23 illustrates that both DM-RS and CRS exist and (b) of FIG. 23 illustrates that only CRS exists.

In FIG. 23, it is suggested that the symbol used as CSI-RS is last allocated during R-REG indexing. In this case, mapping is performed in the order of indexes regardless of the presence of the CSI-RS, and mapping for the last CSI-RS symbol can be performed by identifying the presence of the CSI-RS.

FIG. 24 is a diagram illustrating a configuration and indexing of R-REG in case of extended CP in accordance with the embodiment of the present invention. In particular, (a) of FIG. 24 illustrates that both DM-RS and CRS exist and (b) of FIG. 24 illustrates that only CRS exists.

Referring to FIG. 24, for the same R-REG configuration and R-REG indexing of the first slot regardless of the CP length, a start point of the R-PDCCH is set to the third symbol if extended CP is used. In this case, the R-REG configuration and R-REG indexing of the first slot where a downlink grant exists can be performed equally regardless of the CP length, and the downlink grant that uses the same resources regardless of the CP length can be designed.

Figure 25A:
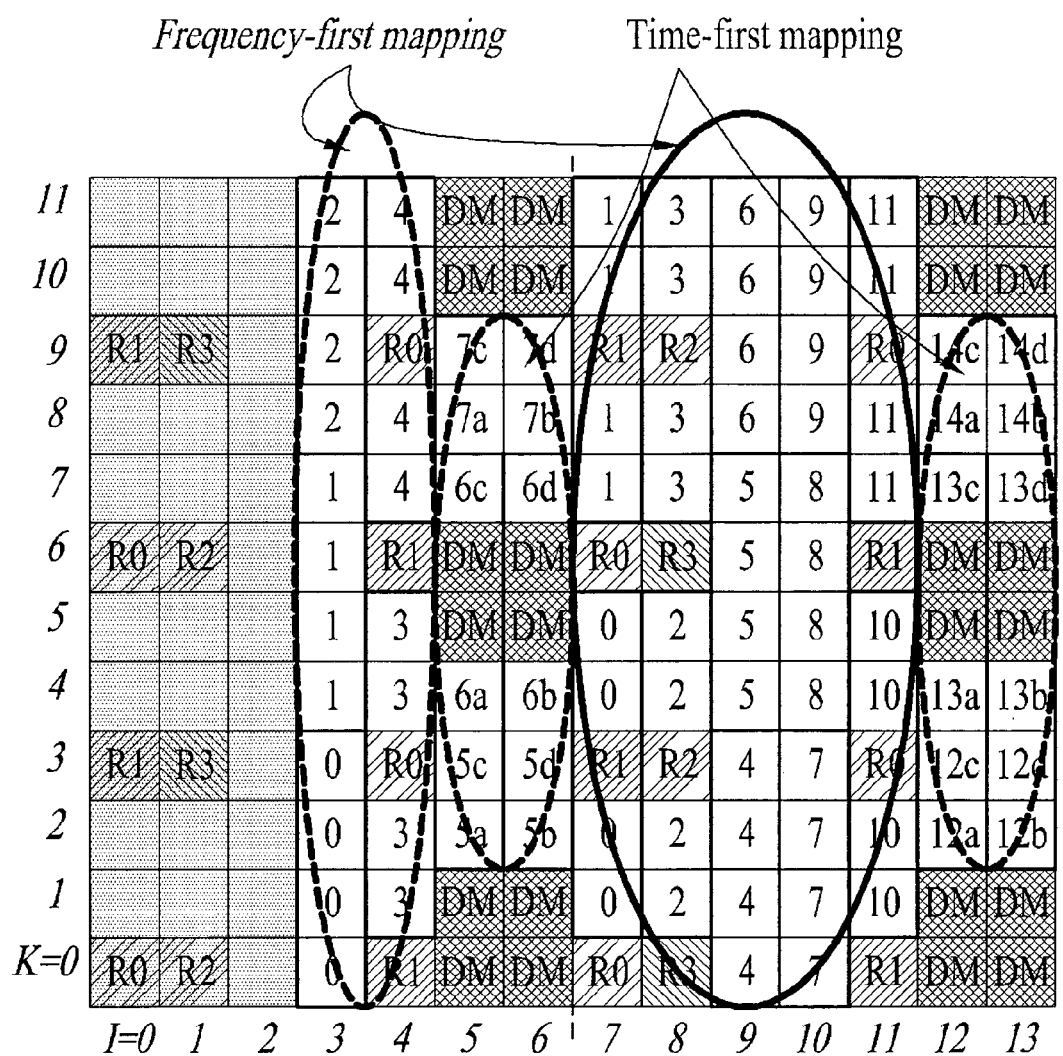
FIG. 25 and FIG. 26 are diagrams illustrating a method for maintaining power balancing between antennas in a process of configuring R-REG.
Figure 25B:
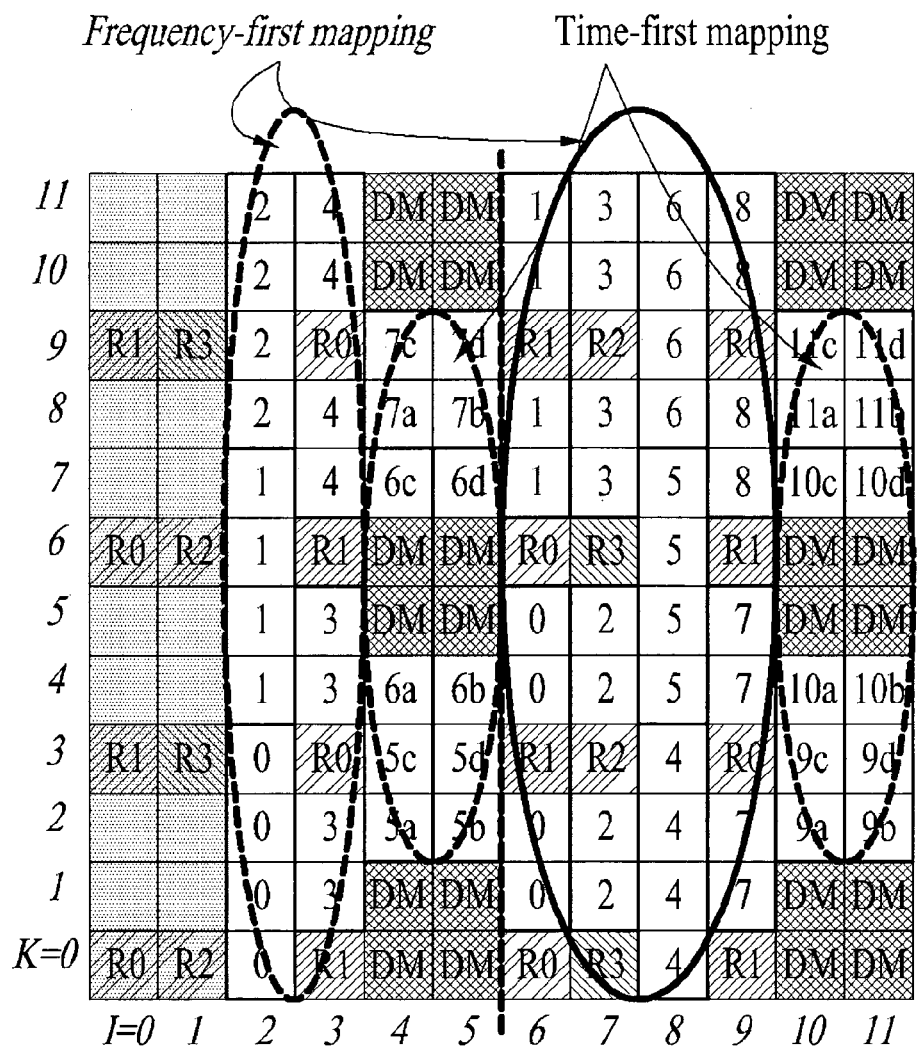
Figure 25C:
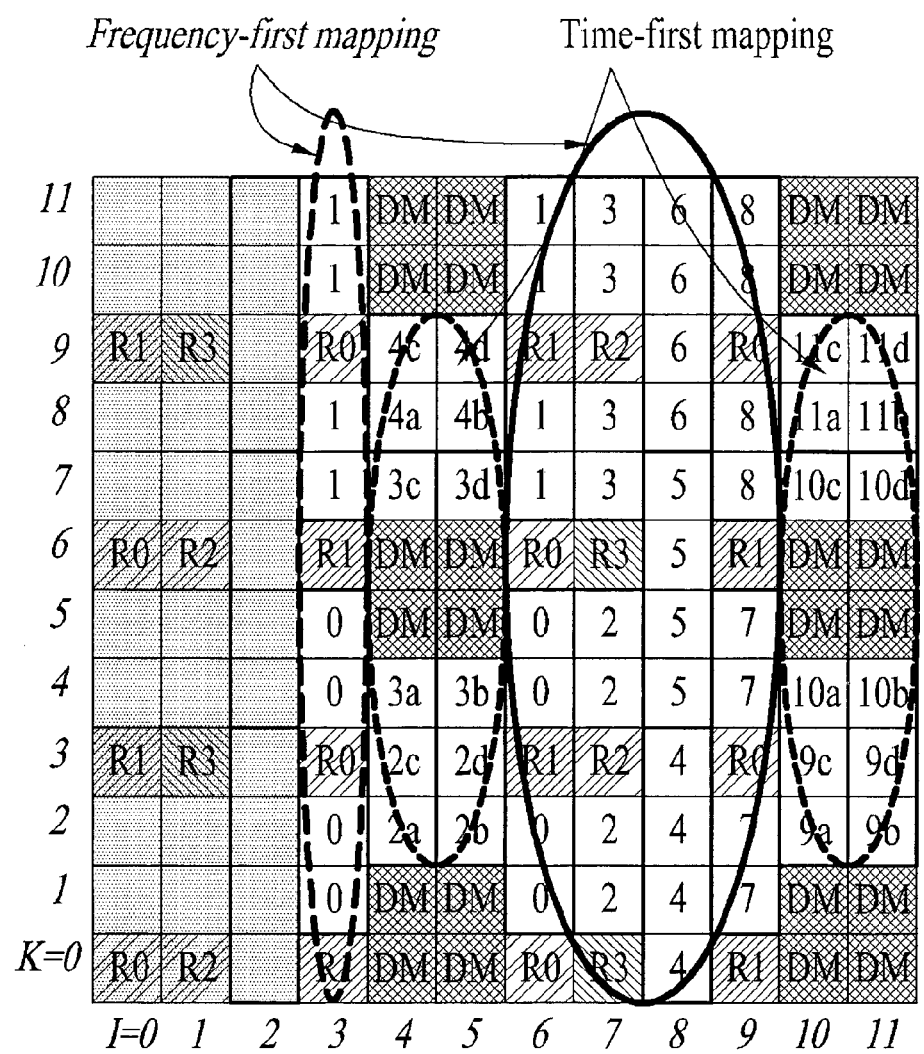
Figure 26A:
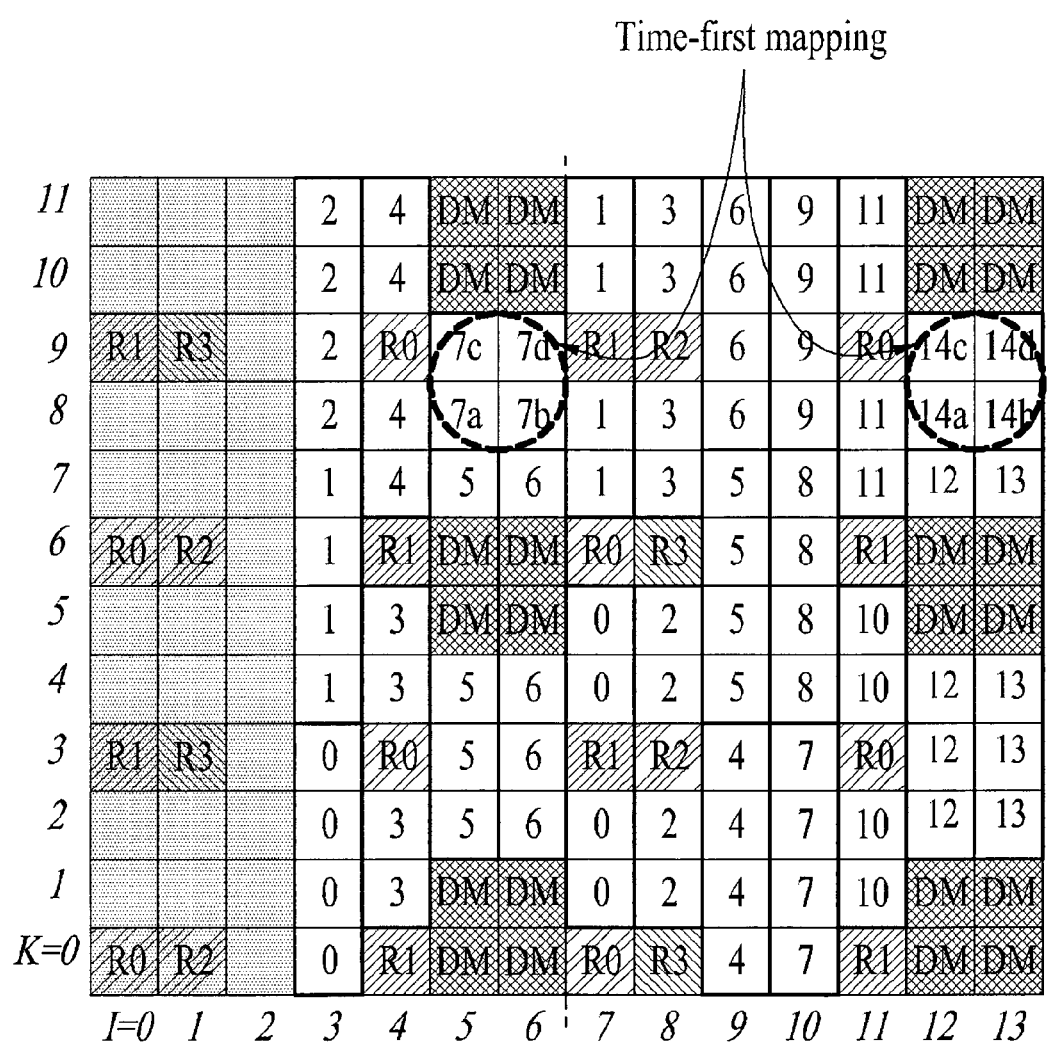
Figure 26B:
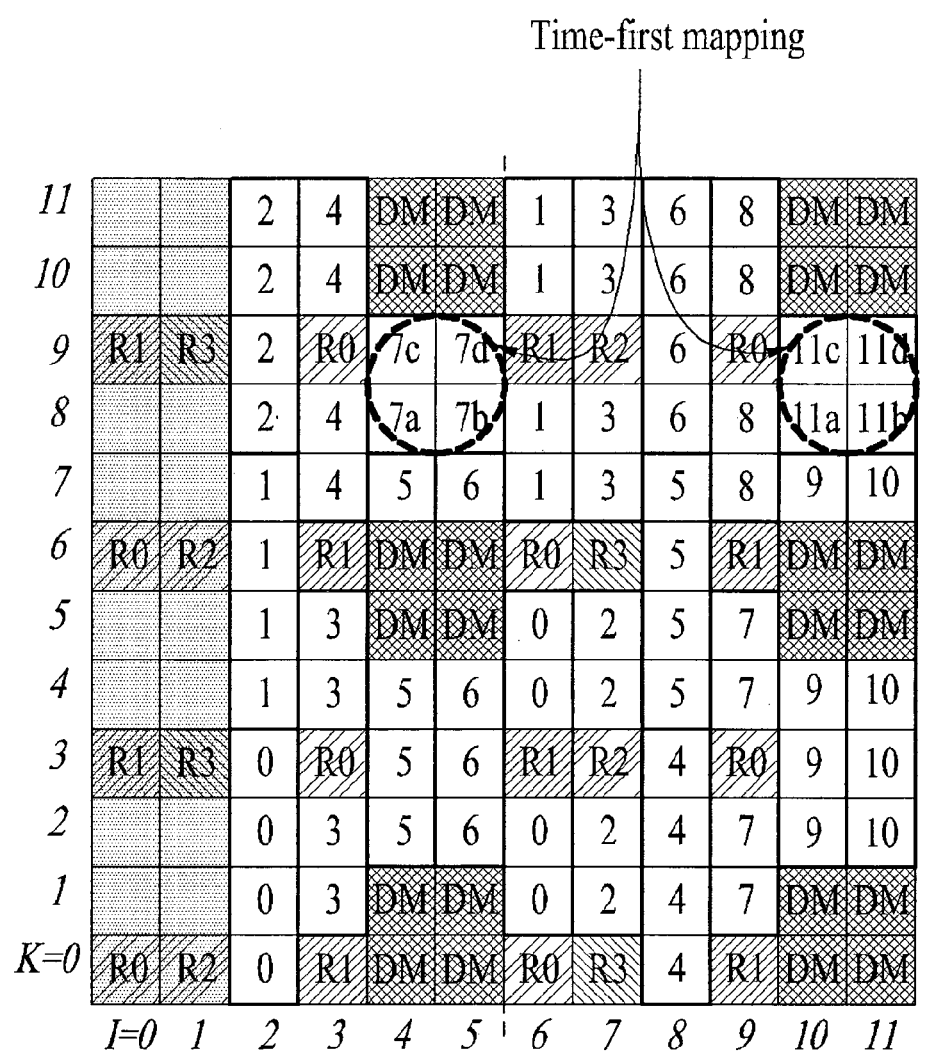
Figure 26C:
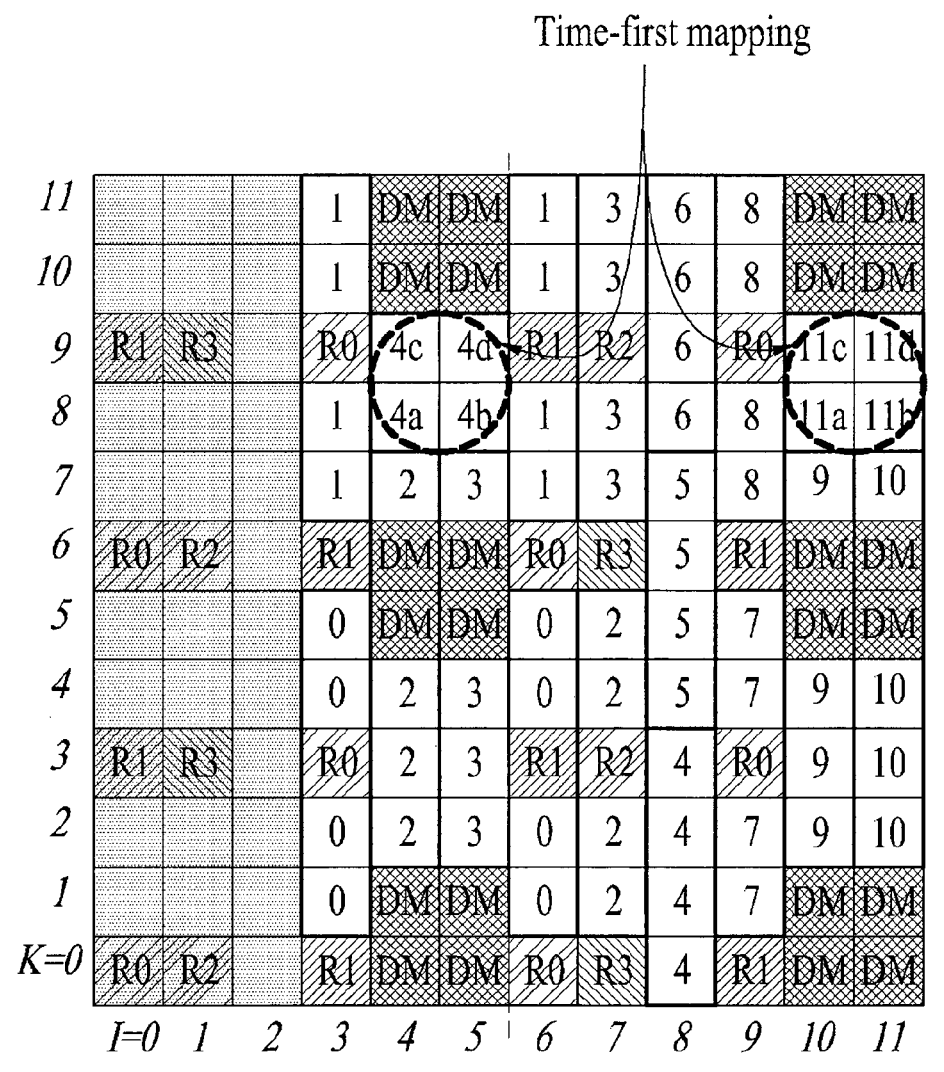

FIG. 25 and FIG. 26 are diagrams illustrating a method for maintaining power balancing between antennas in a process of configuring R-REG. It is to be understood that R-REG index in FIG. 25 and FIG. 26 is only exemplary, and the aforementioned indexing methods can be applied to the present invention.

If the base station having four antennas performs R-PDCCH transmission by using the diversity scheme of the conventional LTE system, precoding is performed in a unit of four symbols. In other words, among the outputs of the precoder, the 0th symbol and the first symbol are transmitted through the 0th antenna and the second antenna only, and the second symbol and the third symbol are transmitted through the first antenna and the third antenna only. Accordingly, it is important for power balancing between the respective antennas that four symbols, which are the input unit of the precoder, are transmitted through different frequencies at the same time.

Since it is not appropriate that frequency-first mapping is applied to R-REG that fails to obtain four REs on the frequency, it is suggested that time-first mapping is applied to the corresponding REG. Referring to (a) of FIG. 25, since REG is configured by four REs of the same OFDM symbol, frequency-first mapping is applied to R-REG index 0, whereas time-first mapping is applied to R-REG indexes #5, #6, and #7 of the first slot and R-REG indexes #12, #13, and #14 of the second slot.

FIG. 26 is a diagram illustrating a method for minimizing R-REG to which time-first mapping is applied. R-REG indexes #5 and #6 of the first slot is configured by REs of the same symbol so that the conventional frequency-first mapping is applied to thereto. However, since R-REG index #7 cannot be configured by REs of the same symbol, time-first mapping is applied to two symbols.

Figure 27:
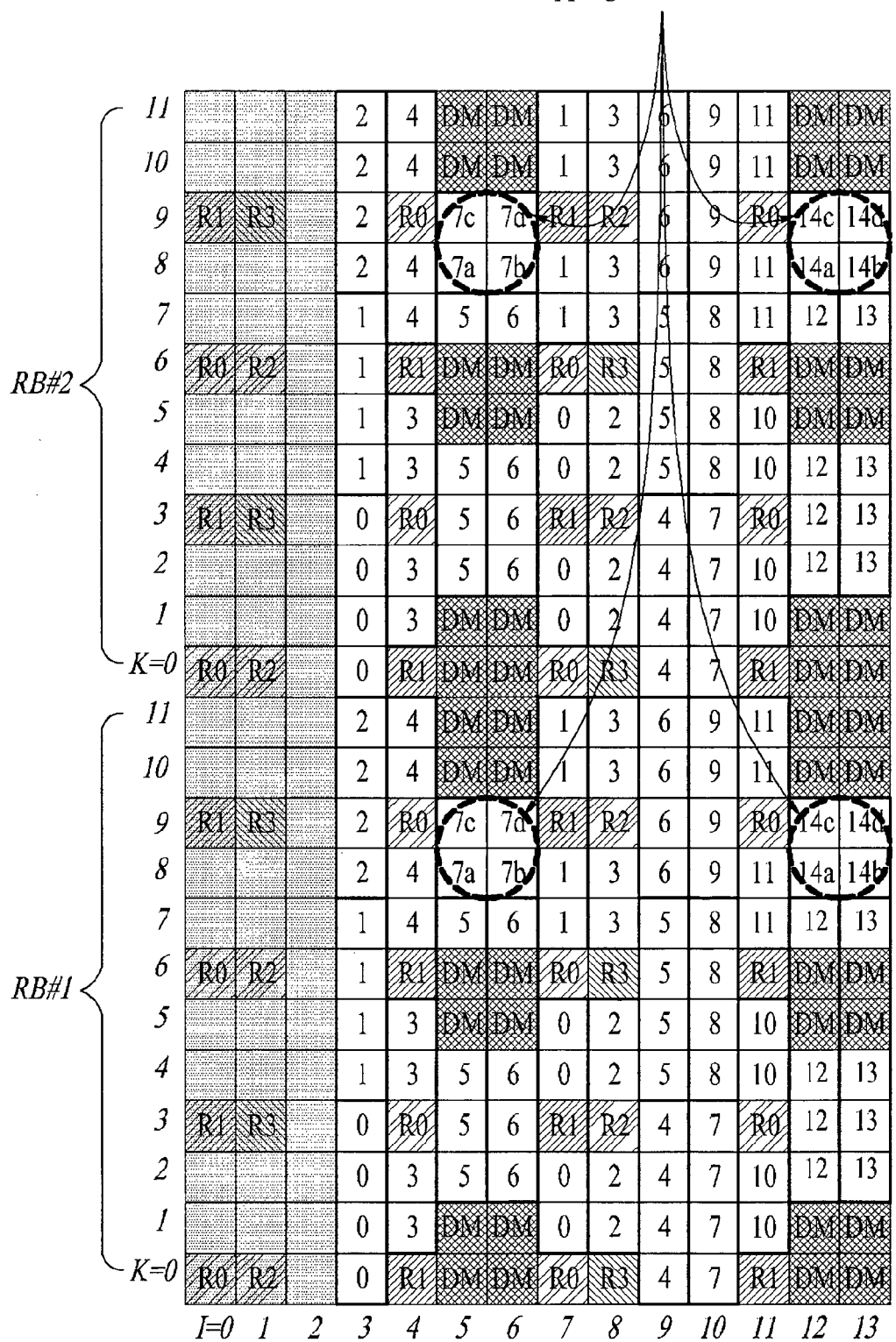
FIG. 27 is a diagram illustrating a method for maintaining power balancing between antennas even in case that all R-REGs are configured by a frequency-first mode.

FIG. 27 is a diagram illustrating a method for maintaining power balancing between antennas even in case that all R-REGs are configured by a frequency-first method.

In particular, in FIG. 27, the frequency-first method is applied to RBs in different orders to maintain power balancing between antennas. In other words, the antenna mapping order in RB#1 is set differently from the antenna mapping order in RB#2, whereby uniform power distribution per antenna can be performed.

Figure 28A:
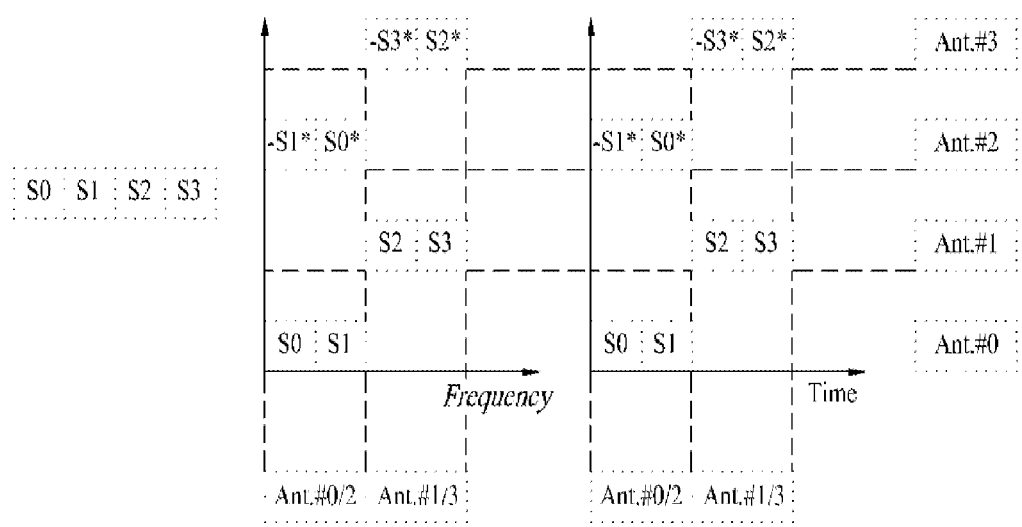
FIG. 28 is a conceptional view illustrating that concept of FIG. 25 to FIG. 27 is simplified.
Figure 28B:
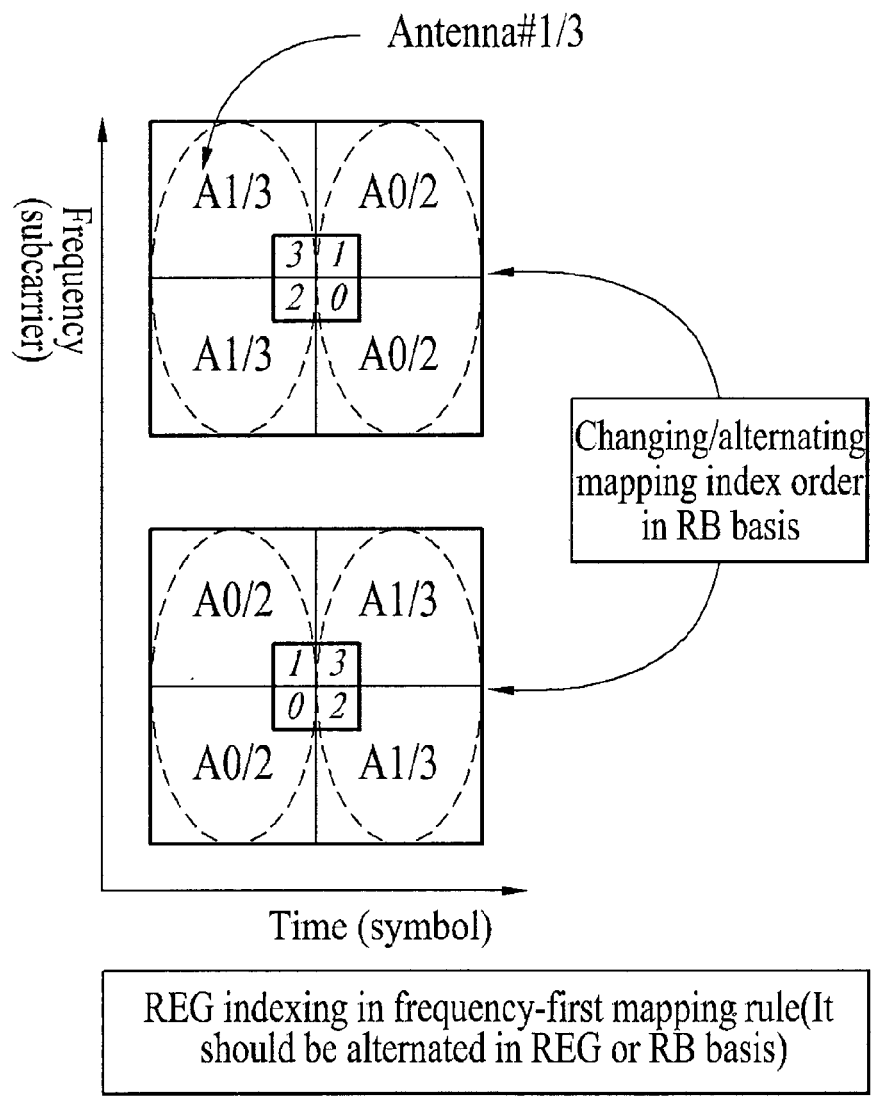
Figure 28C:
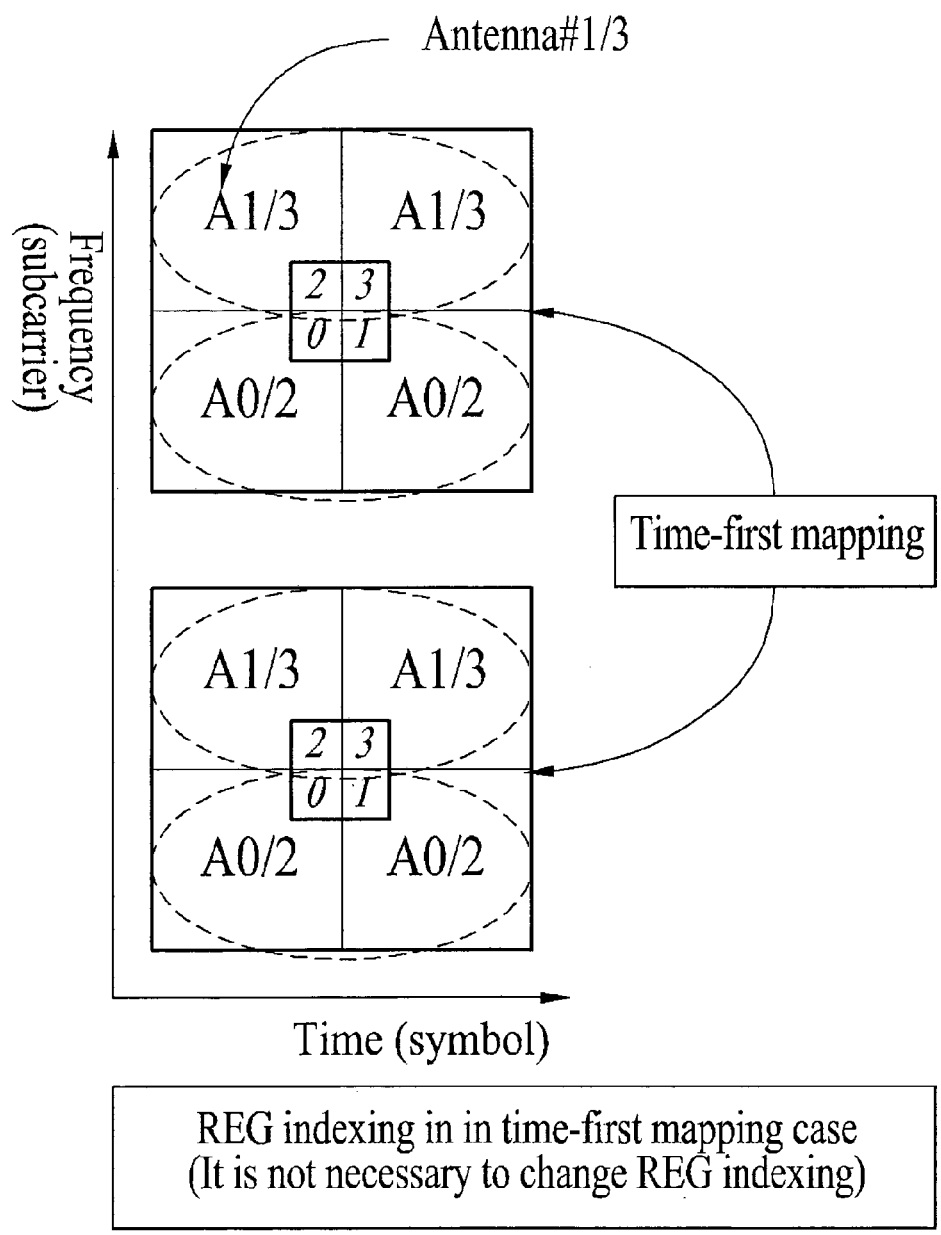

FIG. 28 is a conceptional view illustrating that concept of FIG. 25 to FIG. 27 is simplified. In particular, (a) of FIG. 28 exemplarily illustrates how antenna mapping is actually performed depending on frequency-first mapping or time-first mapping if transmission diversity is used.

(b) of FIG. 28 illustrates that the RE mapping order of R-REG should be set differently per REG as power unbalance between antennas may occur in case of frequency-first mapping. If R-REG having a problem, like R-REG #7 of FIG. 27, exists per RB, the RE mapping order should be varied depending on RB. Since power unbalance between antennas is solved in case of time-first mapping as illustrated in (c) of FIG. 28, the same RE mapping order may be maintained for R-REG that requires time-first mapping.

Figure 29:
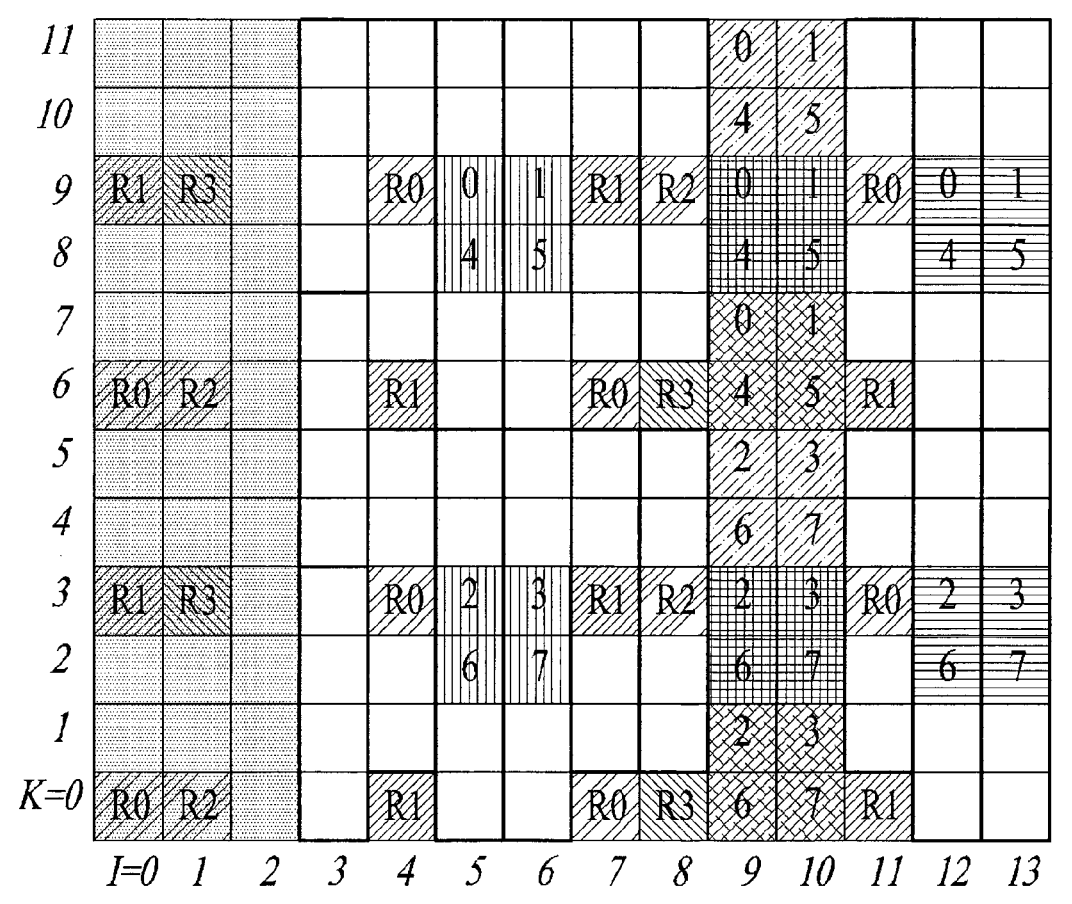
Figure 30:
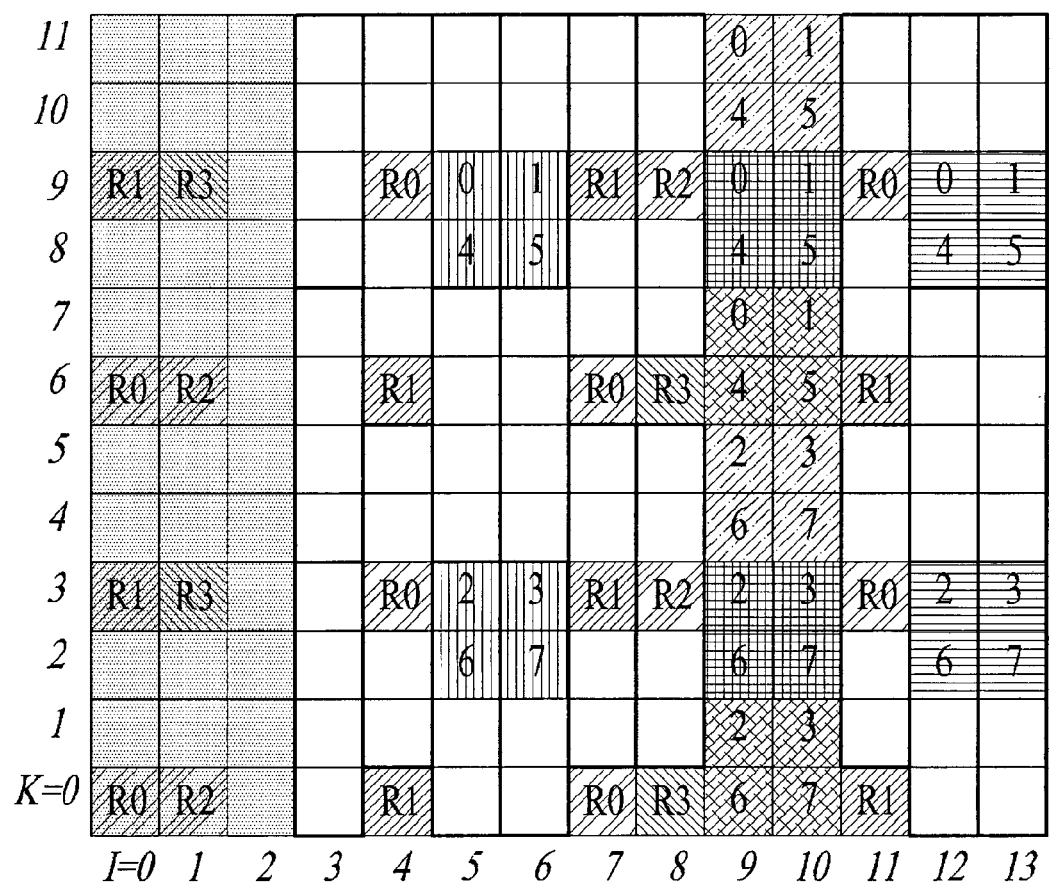

FIG. 29 and FIG. 30 are diagrams illustrating a method for configuring R-REG considering a CSI-RS muting scheme in accordance with the embodiment of the present invention. Preferably, it is to be understood that muting indicates that transmission power for transmitting corresponding RE is 0.

In particular, FIG. 29 illustrates five CSI-RS patterns (eight antenna ports, respectively). The respective antenna ports are represented by 0, 1, . . . , 7. A group of REs having the same pattern is one CSI-RS pattern, wherein antenna ports of the REs are identified by written numbers. The CSI-RS is characterized in that it is periodically transmitted based on a specific subframe. A procedure of muting CSI-RS of a neighboring cell can be performed in association with the period of the CSI-RS. For example, if five cells use five different CSI-RS patterns and have the same transmission period as illustrated in FIG. 29 and FIG. 30, none of REs of five CSI-RS patterns including CSI-RS pattern of a muted neighboring cell can transmit R-PDCCH or R-PDSCH at a specific subframe to which the CSI-RS is transmitted. Accordingly, R-REG should be designed considering the above feature.

FIG. 29 illustrates that R-REG is configured by excluding CSI-RS RE from OFDM symbol indexes #5, #6, #12, #13. At the symbol index #5, one R-REG excluding muted CSI-RS ports #0 and #4 and another one R-REG excluding muted CSI-RS ports #2 and #6 are configured. In this case, all R-REGs are configured by a total of four available REs. Also, even though one R-REG is configured by skipping CSI-RS RE, since two neighboring REs within R-REG are configured to adjoin each other, there is no problem in SFBC operation.

On the other hand, FIG. 30 illustrates that one R-REG is configured by including CSI-RS RE. For example, at the symbol index #5, three R-REGs are configured, wherein each of the first and third R-REGs is configured to include CSI-RS ports #6, #2, #4, #0. If the CSI-RS is transmitted, REG that includes the CSI-RS transmits R-REG configured by two REs only. As described above, since SFBC is configured in a unit of two neighboring subcarriers two REs on the frequency, even though two REs used as CSI-RS REs are punctured, there is no problem in demodulation. However, the relay node should define the operation of the base station to identify this status. In particular, antenna ports should be arranged for power balancing between the antennas. In other words, if antenna ports #0 and #1 are punctured at one OFDM symbol, it is preferable that the antenna ports #2 and 3 are punctured equally.

R-REG indexing may be performed based on time-first indexing of R-REG unit, or may be performed based on frequency-first indexing of R-REG unit. However, since R-PDCCH which is not interleaved exists in the R-PDSCH, frequency-first mapping is performed for the R-PDCCH in the same manner as the R-PDSCH. Accordingly, in order to maintain similarity to frequency-first mapping, frequency-first indexing is preferably performed for the R-PDCCH. Also, if some REs within one R-REG collide with the CSI-RS, it may be considered that the corresponding REs are only punctured.

Meanwhile, in order that the serving cell mutes RE for CSI-RS of a neighboring cell, the neighboring cell preferably signals pattern information of the CSI-RS to the serving cell through X2 interface. Alternatively, it may be considered that a network operator directly signals pattern information to the serving cell through an operation, administration and maintenance (OAM) server.

Figure 31:
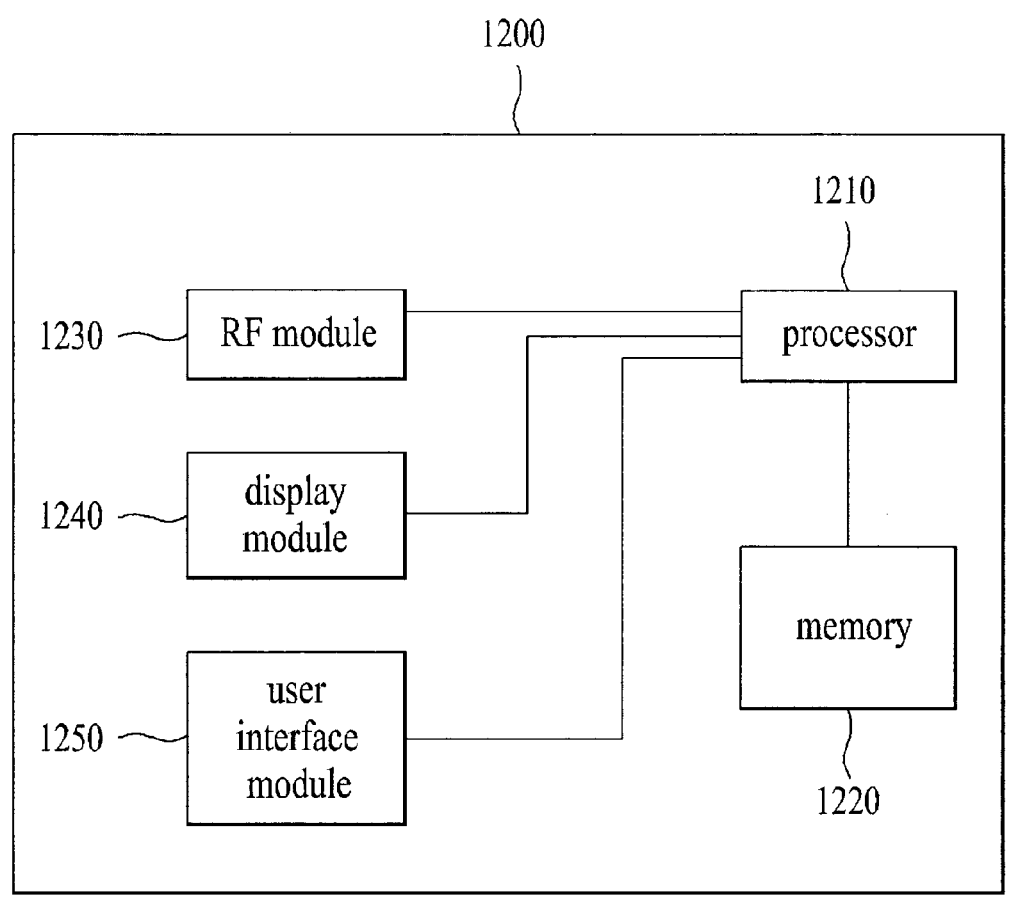
FIG. 31 is a block diagram illustrating a user equipment according to one embodiment of the present invention.

FIG. 31 is a block diagram illustrating a user equipment according to one embodiment of the present invention.

Referring to FIG. 31, the user equipment 1200 includes a processor 1210, a memory 1220, a radio frequency (RF) module 1230, a display module 1240, and a user interface module 1250.

The user equipment 1200 is illustrated for convenience of description, and some modules of the user equipment 1200 may be omitted. Also, the user equipment 1200 may further include required modules. Furthermore, some modules of the user equipment 1200 may be divided into segmented modules. The processor 1210 is configured to perform the operation according to the embodiment of the present invention, which is illustrated with reference to the accompanying drawings.

In detail, the processor 1210 can perform the operation required to multiplex a control signal and a data signal. For the detailed operation of the processor 1210, refer to the description of FIG. 1 to FIG. 30.

The memory 1220 is connected with the processor 1210 and stores an operating system, an application, a program code, data, etc. therein. The RF module 1230 is connected with the processor 1210 and converts a baseband signal to a radio signal or vice versa. To this end, the RF module 1230 performs analog conversion, amplification, filtering, frequency unlink conversion or their reverse procedures. The display module 1240 is connected with the processor 1210, and displays various kinds of information. Examples of the display module 1240 include, but not limited to, LCD (Liquid Crystal Display), LED (Light Emitting Diode), and OLED (Organic Light Emitting Diode). The user interface module 1250 is connected with the processor 1210, and can be configured by combination of well known user interfaces such as key pad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory and then may be driven by a processor. The memory may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for transmitting a control signal to a relay node at a base station in a MIMO wireless communication system and the apparatus therefor have been described based on the 3GPP LTE system, the method and the apparatus can be applied to various MIMO wireless communication systems in addition to the 3GPP LTE system.

The invention claimed is:

1. A method for receiving a relay physical downlink control channel (R-PDCCH) from a base station at a relay node in a multi-input multi-output (MIMO) wireless communication system, the method comprising:
    configuring a plurality of resource element groups (REGs) for the R-PDCCH, each of the plurality of REGs comprising four consecutively available resource elements (REs) in each orthogonal frequency division multiplexing (OFDM) symbol included in a subframe, wherein the four consecutively available REs are counted in an ascending order of subcarrier indexes;
    and
    receiving, from the base station, at least a downlink assignment included in the R-PDCCH at a first slot in the subframe or an uplink grant included in the R-PDCCH at a second slot in the subframe by monitoring each of the first slot and the second slot in a unit of CCE (Control Channel Element),
    wherein:
    the CCE comprises at least one REG for the R-PDCCH;
    a channel state information-reference signal (CSI-RS) is received through up to eight antenna ports;
    all REs corresponding to the up to eight antenna ports are unavailable for configuring the plurality of REGs for the R-PDCCH if zero power CSI-RS or non-zero power CSI-RS occurs in any RE of the all REs corresponding to the up to eight antenna ports;
    all REs included in at least one OFDM symbol for a physical downlink control channel (PDCCH) are unavailable for configuring the plurality of REGs for the R-PDCCH;
    the zero power CSI-RS is defined as a resource element pattern with zero transmission power;
    the non-zero power CSI-RS is defined as a resource element pattern with non-zero transmission power; and
    the method further comprises:
        receiving information on a resource element pattern for the zero power CSI-RS or non-zero power CSI-RS from the base station; and
        receiving the non-zero power CSI-RS in the REs indicated by the resource element pattern for the non-zero power CSI-RS if non-zero power CSI-RS occurs, wherein neither the CSI-RS nor the R-PDCCH is received in the REs indicated by the resource element pattern for the zero power CSI-RS if zero power CSI-RS occurs.

2. The method of claim 1, wherein the zero power CSI-RS is a CSI-RS of one or more neighboring base stations.

3. A relay node in a multi-input multi-output (MIMO) wireless communication system, the relay node comprising:
    a Radio Frequency (RF) module for transmitting a signal to and receiving a signal from a base station;
    a processor for:
        configuring a plurality of resource element groups (REGs) for a relay physical downlink control channel (R-PDCCH), each of the plurality of REGs comprising four consecutively available resource elements (REs) in each orthogonal frequency division multiplexing (OFDM) symbol included in a subframe, wherein the four consecutively available REs are counted in an ascending order of subcarrier indexes; and detecting at least a downlink assignment included in the R-PDCCH at a first slot in the subframe or an uplink grant included in the R-PDCCH at a second slot in the subframe by monitoring each of the first slot and the second slot in a unit of CCE (Control Channel Element), wherein:

the CCE comprises at least one REG for the R-PDCCH;

a channel state information-reference signal (CSI-RS) is received through up to eight antenna ports;

all REs corresponding to the up to eight antenna ports are unavailable for configuring the plurality of REGs for the R-PDCCH if zero power CSI-RS or non-zero power CSI-RS occurs in any RE of the all REs corresponding to the up to eight antenna ports;

all REs included in at least one OFDM symbol for a physical downlink control channel (PDCCH) are unavailable for configuring the plurality of REGs for the R-PDCCH;

the zero power CSI-RS is defined as a resource element pattern with zero transmission power;

the non-zero power CSI-RS is defined as a resource element pattern with non-zero transmission power; and the RF module is further for:

receiving information on a resource element pattern for the zero power CSI-RS or non-zero power CSI-RS from the base station; and receiving the non-zero power CSI-RS in the REs indicated by the resource element pattern for the non-zero power CSI-RS if non-zero power CSI-RS occurs, wherein neither the CSI-RS nor the R-PDCCH is received in the REs indicated by the resource element pattern for the zero power CSI-RS if zero power CSI-RS occurs.

4. The relay node of claim 3, wherein the zero power CSI-RS is a CSI-RS of one or more neighboring base stations.

* * * * *